US012033264B2

(12) United States Patent
Meadows et al.

(10) Patent No.: US 12,033,264 B2
(45) Date of Patent: Jul. 9, 2024

(54) SYSTEMS AND METHODS FOR AUTHORING AND MANAGING EXTENDED REALITY (XR) AVATARS

(71) Applicant: IDORU, INC., Claymont, DE (US)

(72) Inventors: Mark Stephen Meadows, Marina del Rey, CA (US); Mica Le John, New York, NY (US); Michael Taylor, New York, NY (US); Colin Kronholm, Mystic, CT (US); Eduardo Polidor, Buenos Aires (AR); Tiago Magalhaes, Matosinhos (PT); Indira Ardolic, Brooklyn, NY (US); Jason Jahn, Seattle, WA (US)

(73) Assignee: IDORU, INC., Claymont, DE (US)

( * ) Notice: Subject to any disclaimer, the term of this patent is extended or adjusted under 35 U.S.C. 154(b) by 102 days.

(21) Appl. No.: 17/949,191

(22) Filed: Sep. 20, 2022

(65) Prior Publication Data

US 2023/0090253 A1    Mar. 23, 2023

Related U.S. Application Data

(60) Provisional application No. 63/246,157, filed on Sep. 20, 2021.

(51) Int. Cl.
*G06T 13/40* (2011.01)
*G06T 17/20* (2006.01)
*G06T 19/00* (2011.01)

(52) U.S. Cl.
CPC .............. *G06T 13/40* (2013.01); *G06T 17/20* (2013.01); *G06T 19/006* (2013.01)

(58) Field of Classification Search
None
See application file for complete search history.

(56) References Cited

U.S. PATENT DOCUMENTS 10,270,983 B1 *  4/2019  Van Os ................. H04N 7/147
10,937,249 B2    3/2021  Lynen et al.
(Continued)

OTHER PUBLICATIONS

PCT/US2022/044164. International Search Report & Written Opinion (dated Jan. 19, 2023).

*Primary Examiner* — Patrick F Valdez
(74) *Attorney, Agent, or Firm* — LOZA & LOZA, LLP; Heidi L. Eisenhut

(57) ABSTRACT

Systems and methods for digital avatars, specifically for fashion and consumer goods, are provided. This system is useful with an identified avatar, environment, and objects that a user may author, edit, and place. A user may deploy an avatar that resembles themselves via augmented reality, virtual reality, and other types of media. These systems include a user interface, administrative interface, economic systems and means of managing assets and protecting users' data. The systems incorporate mechanisms of controlling the avatar, means of integrating physical sensor data that interoperates with the virtual, and means of predicting related trends, choices, and behavior. Various features are employed for increased efficiency, accuracy, and believability. These features include machine learning to produce avatar features, AR map directions to interact with avatars, computer vision to enable the real-time translation of physical to virtual and social structures to enable groups of people to create and license digital assets.

15 Claims, 19 Drawing Sheets

(56) References Cited

U.S. PATENT DOCUMENTS

| | | |
|---|---|---|
| 10,956,967 B2 | 3/2021 | Ayush et al. |
| 11,010,742 B2 | 5/2021 | Boncimino |
| 11,040,168 B2 | 6/2021 | Bender et al. |
| 11,055,918 B2 | 7/2021 | Arroyo Palacios et al. |
| 11,069,104 B1 | 7/2021 | Kuang et al. |
| 11,106,837 B2 | 8/2021 | Wodrich et al. |
| 11,120,266 B2 | 9/2021 | Rabinovich et al. |
| 11,144,117 B1 | 10/2021 | Choudhuri et al. |
| 11,164,351 B2 | 11/2021 | Lin et al. |
| 11,182,465 B2 | 11/2021 | Zhu |
| 11,182,944 B1 | 11/2021 | Kondoh et al. |
| 11,227,424 B2 | 1/2022 | Benditte-Klepetko |
| 11,227,445 B1 | 1/2022 | Tichenor et al. |
| 11,276,226 B2 | 3/2022 | Lim |
| 11,288,878 B2 | 3/2022 | Singh |
| 11,308,652 B2 | 4/2022 | Kurz et al. |
| 11,394,898 B2 | 7/2022 | Wang et al. |
| 2013/0027503 A1 | 1/2013 | Hildreth |
| 2014/0092130 A1* | 4/2014 | Anderson ........... G06F 3/04817 |
| | | 345/632 |
| 2020/0226848 A1 | 7/2020 | Van Os et al. |
| 2020/0234481 A1 | 7/2020 | Scapel et al. |
| 2020/0245954 A1 | 8/2020 | Kaleal et al. |
| 2020/0249819 A1 | 8/2020 | Berquam et al. |
| 2020/0302669 A1 | 9/2020 | Barlier et al. |
| 2020/0410575 A1 | 12/2020 | Grantham et al. |
| 2022/0237841 A1* | 7/2022 | Spencer ............. G06Q 30/0643 |
| 2023/0080584 A1* | 3/2023 | Zohar ..................... G06T 13/40 |
| | | 345/419 |

* cited by examiner

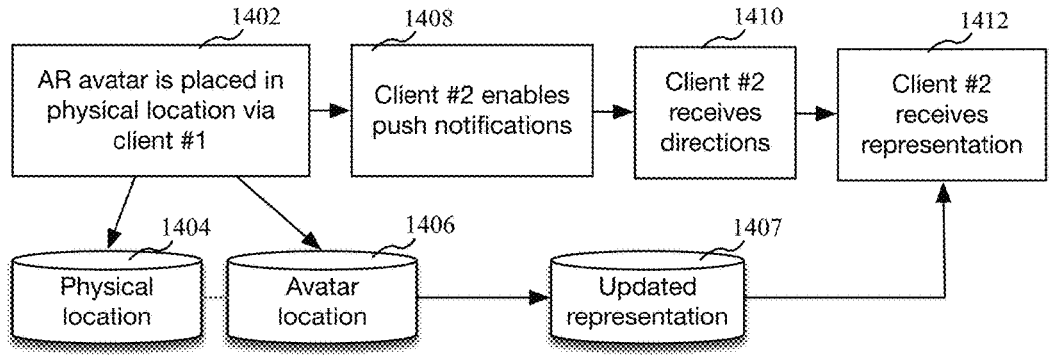
FIG. 14
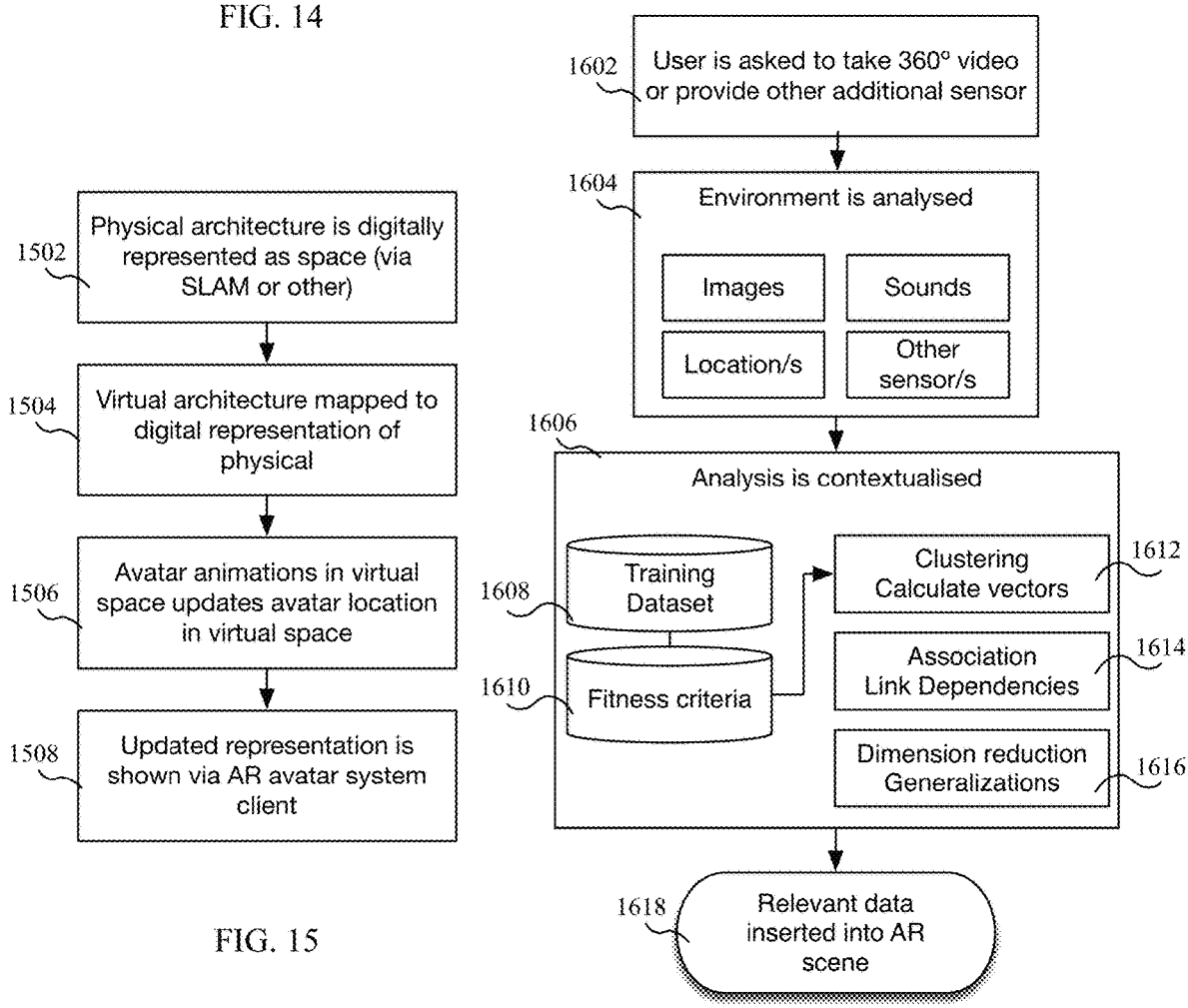
FIG. 15
FIG. 16

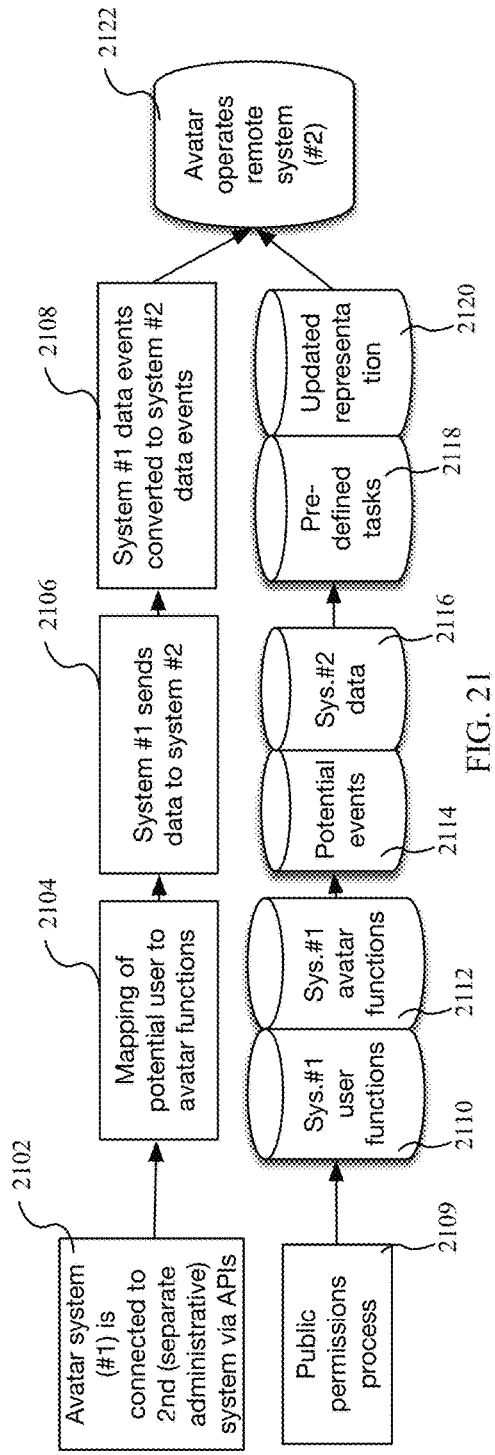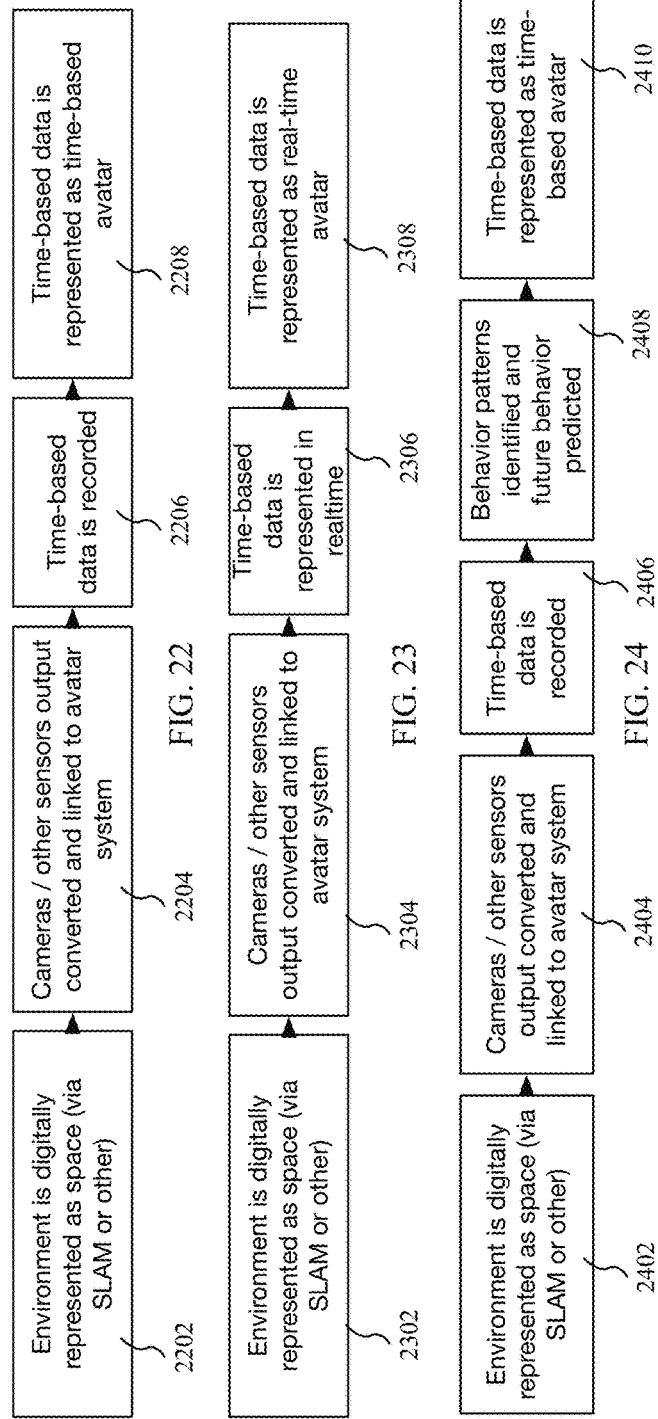

SYSTEMS AND METHODS FOR AUTHORING AND MANAGING EXTENDED REALITY (XR) AVATARS

PRIORITY CLAIM

This application claims priority to and the benefit of provisional patent application No. 63/246,157, filed in the United States Patent and Trademark Office on Sep. 20, 2021, the entire content of which is incorporated herein by reference as if fully set forth below in its entirety and for all applicable purposes.

TECHNICAL FIELD

The technology discussed below relates to avatar management, and more specifically to both increasing personal expressiveness while reducing local computational requirements for a dynamic avatar.

BACKGROUND

An avatar is a virtual representation of a character within a virtual environment. Avatars may be human in appearance; however, they are not limited to any appearance constraints. The presentation of visual identities and techniques for rendering them present an array of problems. These problems become more evident as the avatar becomes an evolution of the Selfie in games, social media, and other environments. Avatars are now a reflection of the author and an evolution of the Selfie. They are able to move, speak, behave and inhabit a range of platforms. So, the demands of improving, detailing, and stylizing the avatar presents multiple problems.

There are technical problems associated with improving, detailing, and stylizing the avatar as rendering these avatars in Extended Reality (XR) or Augmented Reality (AR), Virtual Reality (VR) or other presentation modes easily exceed the processing capabilities of a typical consumer computing device, especially mobile devices. The limited computational capabilities of these devices are compounded by the imaginations, wit, and individuality of the millions of people using avatars today.

There are also artistic problems associated with improving, detailing, and stylizing the avatar. To build a Selfie that is as impactful, poignant, and detailed as a common, unskilled user would desire is very difficult today. Expressive fidelity is highly difficult to achieve at any acceptable framerate (especially such fidelities as those seen in photorealism or of cinematic quality). The limited expressive capabilities of avatar authoring systems are compounded by the range of different technical platforms and individuals using them.

There are also identification problems associated with improving, detailing, and stylizing the avatar because avatars—like our own faces—are an expression of ourselves. They are often carefully guarded representations and may be both precious and expensive (such as Twitter avatars sold for millions of dollars via blockchain NFTs). The limited security and authentication of avatar data, when considered as a valuable asset, must be considered in the light of DeepFakes, phishing, and other identity fraud. Especially if the avatar, when automated to complete user tasks (such as a telephone answering machine), can be maliciously compromised, resulting in losses of identity, finances and much more.

There are also problems of representation associated with improving, detailing, and stylizing the avatar. For example, a user might not want the avatar to look like themselves or might not want the avatar to sound like themselves and customization and styling abilities are limited, if existent, in avatar authoring systems today.

These problems grow as online cultures and digital media become increasingly visual. Therefore, there is an urgent need to provide the means to author, edit, authenticate, own, and manage the core capabilities of a graphical, 3D avatar in extended reality (XR), Virtual Reality (VR), games, selfies and other forms of expression.

SUMMARY

The following presents a summary of one or more aspects of the present disclosure, in order to provide a basic understanding of such aspects. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in a form as a prelude to the more detailed description that is presented later.

According to one feature, a method for authoring and managing an avatar system is provided. The method includes presenting an avatar mesh of an avatar on a display of a mobile device, the avatar mesh including first frames of a preview video data captured by a forward-facing camera of the mobile device, the first frames of the preview video data including the video data of a user in a physical, real-world environment; presenting the preview video of the avatar on the display of the mobile device, in which the avatar is a reflection of the user; receiving, by one or more processors of the mobile device, a first user input to apply a virtual effect on the avatar to a user interface allowing the user to edit detailed features of the avatar presented on the display of the mobile device, the detailed features including style, appearance, and behavior of the avatar; editing, by the one or more processors of the mobile device, the detailed features of the avatar; capturing, by external and third-party hardware sensors, (1) visual-based data, (2) audio-based data, and (3) time-based data, relevant to the avatar system; integrating, by one or more processors of the mobile device and networked computers, the captured sensor data to generate and improve avatar system data; registering, by a network computer system, the avatar and associated assets with a unique identification string allowing multiple parties to sell, license and/or exchange the associated assets of the avatar; accessing, by the networked computer system, automatically associated data related to fashion accessories, product goods, and user interface features; and associating, by the one or more processors of the mobile device, the avatar system data, with the user, the avatar system data including customized or altered avatar data.

According to one aspect, the identification string allows the multiple parties to author, edit and identify the avatar and author(s) while the data assets may also be redistributed and subdivided.

According to another aspect, the method further comprises capturing, by the external and third-party hardware sensors and the one or more processors of the mobile device, user appearance, and sounds.

According to yet another aspect, the method further comprises automating the avatar's ability to learn from examples and tagged references, by the one or more processors of the mobile device and one or more processors of the networked computer system, provided by the user in both physical and virtual spaces; and representing the user behavior such that the avatar may operate autonomously, by the one or more processors of the mobile device and the external and third-party hardware sensors connected by the one or more processors of the networked computer system.

According to yet another aspect, the method further comprises representing the user allowing the avatar to record, replay, and predict user behavior to a high level of precision to include certification procedures.

According to yet another aspect, the avatar records the behavioral data collected via the mobile device and the external and third-party hardware sensors.

According to yet another aspect, the avatar system replays historic data, mirrors real time data, and predict future user behavior data, using the one or more processors of the mobile device and the external and third-party hardware sensors.

According to yet another aspect, the method further comprises building an economic model, the economic model comprises allowing agreements of sale and licensing as conducted via a networked computer system.

According to yet another aspect, the unique identification string is used for a for reputational rating and ranking; and wherein the unique identification string controls and monitors an avatar-driven economy via the one or more processors of the mobile device and the one or more processors of the networked computer system.

According to yet another aspect, the method further comprises collecting economic indicators of individuals and groups using the one or more processors of the mobile device and the external and third-party hardware sensors; analyzing and predicting probable outcomes using the networked computer system; operating with multiple currencies; predicting economic trends, analyzing, and predicting probable outcomes, processing the data via a networked computer system; and displaying the results on the mobile device.

According to yet another aspect, the multiple currencies are selected from fiat, decentralized, and blockchain systems; and wherein the multiple currencies are both private and public and accessed by the networked computer system.

According to yet another aspect, the method further comprises evaluating the avatar data and analyzing the user behavior data with a medical professional by utilizing the one or more processors of the mobile device and the external and third-party hardware sensors.

According to yet another aspect, the method further comprises generating data for new content; extracting the new content from existing content both manually and automatically; and applying filters and stylistic effects, by a user interface on the mobile device, using the one or more processors of the mobile device and the external and third-party hardware sensors which are networked with additional sensors and processors.

According to yet another aspect, the method further comprises managing the avatar system and associated data at an administrative level for users, objects, and environments using the one or more processors of the mobile device and the external and third-party hardware sensors which are networked with additional sensors and processors; collecting user behavior and data asset functionality based on unique identifiers, using the one or more processors of the mobile device and the external and third-party hardware sensors which are networked with additional sensors and processors; predicting both user behavior and data asset functions based upon past behaviors with a unique identifier; and managing identity security to obfuscate, bar, block, and migrate the avatars, objects and environments, using the one or more processors of the mobile device and the external and third-party hardware sensors which are networked with additional sensors and processors.

According to yet another aspect, the method further comprises conducting, via the avatar system administrative layer, means of using salted data, watermarking, whitespace data, reverse lookups and other methods may be used to avoid deepfakes and phishing attacks, man-in-the-middle and other identity attacks, each of which may utilize the one or more sensors and processors of the mobile device which is networked with additional sensors and processors.

According to yet another aspect, the method further comprises confirming, via the Avatar System, the authenticated, and potentially certified, identity of the user or avatar, using the one or more sensors and processors of the mobile device which is networked with additional sensors and processors.

According to yet another aspect, the method further comprises predicting both user behavior and data asset functions based upon past behaviors and other data with a unique identifier may include methods of predictive weather models, utilizing the one or more sensors and processors of the mobile device which is networked with additional sensors and processors.

According to yet another aspect, wherein re-biasing large datasets applicable to machine learning with outlier data and subsequent usage of that data, as a part of other data, utilizing the one or more sensors and processors of the mobile device which is networked with additional sensors and processors.

According to yet another aspect, wherein the avatar automatically mirrors the user behavior to such fidelity that identity and certification procedures may be accomplished, also using the one or more processors of the mobile device and multiple hardware sensors connected via computer networks, without the end user manually driving the avatar nor Avatar System.

BRIEF DESCRIPTION OF THE DRAWINGS

Various features, nature, and advantages may become apparent from the detailed description set forth below when taken in conjunction with the drawings in which like reference characters identify correspondingly throughout.

FIG. 14 is a flow diagram illustrating an exemplary method for placing an avatar in a physical space, according to one embodiment.

FIG. 15 is a flow diagram illustrating an exemplary method for associating an avatar to a physical location (virtual presence), according to one embodiment.

FIG. 16 is a flow diagram illustrating an exemplary method for collecting data via physical sensors associated with the AR avatar, according to one embodiment.

FIG. 21 is a flow diagram illustrating an exemplary method of an avatar operating 3rd-party software on behalf of the owner or human operator, according to one embodiment.

FIG. 22 is a flow diagram illustrating an exemplary method of an avatar operating as a historic doppelganger to record data, according to one embodiment.

FIG. 23 is a flow diagram illustrating an exemplary method of an avatar operating as real-time doppelgängers, according to one embodiment.

FIG. 24 is a flow diagram illustrating an exemplary method of an avatar operating as a future doppelganger, according to one embodiment.

DETAILED DESCRIPTION

Figure 1:
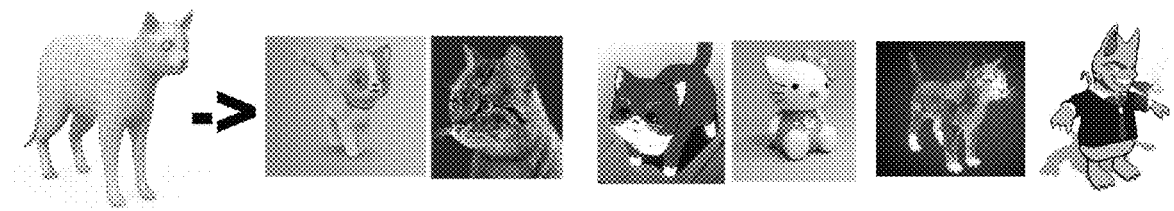
FIGS. 1 and 2 illustrates visual examples of applying different visual styles to an avatar.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts. As used herein, a reference to an element in the singular contemplates the reference to the element in the plural.

Terms and Definitions

The term "avatar" as used herein refers to an identity represented in computer graphics. While usually representing a person, an avatar may also represent a group of people, an animal or imaginary being. The computer graphics often employ three-dimensional, interactive models for use in Augmented Reality, Virtual Reality, mixed versions as well. Additionally, avatars may appear as 2D non-interactive graphics and even in many cases simply as a string of text to create a proper noun.

The term "object" as used herein is a collection of computer-generated information which represents a geometry smaller than the avatar. The object has a relationship with the avatar. Like the avatar, the object may represent real or fictional goods or properties and may also represent abstract functions, such as animations, in text, 2D, or interactive 3D graphics.

The term "environment" as used herein is a collection of computer-generated information which represents a geometry larger than the avatar. The environment has a relationship with the avatar. Like the avatar, the environment may represent a real or fictional place or space and may also represent abstract artifacts, such as transportation or time, in text, 2D, or interactive 3D graphics.

The terminology "avatar system" as used herein is the aggregate whole of the avatar, object, environment, and other component parts such as interactivity, importing, exporting, editing, and engaging with other software systems.

Sensors are a unit or collection of simple systems which employs mechanical, digital, electrical, magnetic, or electromechanical means to collect data. These are common engineering industry terms. This data is then converted into a transmissible set of information such as a signal. Usually digital in nature this signal may be used to identify differences, changes and other changes in from a core or default state. Sensors may include, but are not limited to, light (CV, Radar, Lidar, IR, etc.), sound (Speech recognition, sound detection, etc), biometrics (Fingerprint, Face, Voice, etc), air (Quality, Weather, Temperature, Humidity, Barometric pressure, etc), time (Local, Deltas, Duration, Timers, etc.), network (WiFi, BlueTooth, WAN, LAN, NFC, etc.), location (GPS, Timestamps, Geofencing, Vector, Acceleration, Speed, etc.), personal emotional detection and affect (NLP, ASR+vocal stress, CV+facial movement, etc.), and many other common hardware sensors (IMUs, Accelerometer, Barometer, Gyroscope, Compass, etc.), and others. Non-digital signals may include any means of identifying a difference. Examples include but are not limited to a compass, barometer, thermometer, and others. Synchronized sensors provide context and increased precision through redundant data and comparative analysis.

Generative Adversarial Networks (or GANs) are a subset of machine learning (ML) frameworks for the statistical generation of new data. Photographs, sounds, animations, abstract tokens, and other data may be generated by GANs to such accuracy that humans are unable to determine if the data was generated by the GAN or sampled (such as from a photograph or audio recording of the physical world). Unsupervised machine learning provides a resultant outcome to be later tuned and potentially normalized by a human participant. For those knowledgeable in the art, a training set of data produced by a "Generator" is provided to a "Discriminator." The Generator infers probable candidate data from a latent data space and the Discriminator evaluates these candidates based upon a base truth data distribution. The systems are adversarial in that the final data outcome is a result of the Discriminator being unable to determine that synthesized data was a function of the truth data distribution model.

Genetic Algorithms (GAs) or Genetic Engineering are a method of determining best-case solutions to complicated problem sets. To those knowledgeable in the art, a large set of potential solutions, often randomly generated, are presented to a system which must determine the optimal solution. Categorization and classification may be included in these sets to help initiate a rapid solution the system may determine. Fitness criteria, or fitness functions, are provided and as a systematic sampling of a solution is evaluated, the fitness is measured. The opposite may also be used (attractors vs detractors, also sometimes known as repulsors). Fitness criteria allow reduction of the potential solution set, and a second pass is made, often generating "parent" solutions and "child" solutions. When variables are included, sometimes generated with near-random functions, heuristics or stochastic methods may improve outcomes and overall efficiency. A final outcome is determined and that solution—and its means of generation—may be applied to later, similar processes.

The term "Photoreal" and variations of the term, such as "photo-real", and "photoreal", refers to the detailed representation of data with an intention to emulate a commonly perceived experience. These common engineering industry terms commonly require a high level of technical capability to simulate, including details that might be overlooked at a distance or spectral detailing that includes specularity, reflection, subsurface scattering and a formal or geometric equivalent to the source image.

Vector space models or Latent Space Vector Models provide a mathematical model for representing informational objects within a volumetric space. These common engineering industry terms are used as a means of ranking relevance, context, meaning and the similarity or difference between multiple sets of data. Algebraic formulae are used to determine specific and generalized vector spaces, commonly but not necessarily in Euclidian spatial models, for analysis, classification indexing and retrieval. Commonly used for natural language processing these models are used in the following concepts for similar functions of relative ranking. This may include any set of relational data, which may include, but are not limited to, lexical, spatial, temporal and other relative rankings.

Extended Reality (XR), Virtual Reality (VR), Augmented Reality, Mixed Reality (MR), and Cross Reality (also XR) refer to the associated computer operation plugins, modules, APIs and other methods that rely on the real time input, processing, and interpretation, and rendering of 3D geometry and other computer graphics imagery and effects. In the cases of AR, MR, and XR, the integration of physical/analog world geometries and other sets of associated data which the individual user may experience is visually integrated into a shared computer screen with the virtual/digital world geometries and other sets of associated data which are commonly experienced without digital technologies. Commonly, VR uses a headset or individual portal into a rendering experience without integrating physical world information. Commonly, AR or XR integrates both the individual portal rendering experience and integrates physical world information.

Foundational Concepts

In the present disclosure, the foundation of Authoring and Managing Extended Reality (XR) Avatars is a collection of user-driven tasks which, first, generate the image and associated of the avatar, objects, and architectures and, second, manages variable factors such as details of the image, interaction, and contextual location of the avatar via applicable modules, plugins, APIs, and other information. The foundation includes three primary concepts, as described below.

The first concept is a mobile application and user interface (UI) for generating avatars, objects, and architecture. Methods include user-generated, edited, and placed avatars and associated data via user interface on a computational (commonly mobile) device. Manual and automated geometric manipulation of a detailed avatar face, body, clothing, and associated information which relies on a combination of precise-control UI elements, user attention direction, contextual adjustment limits, a UI organization system, modules, plugins, APIs and other assets and functions.

The second concept is enhanced editing and detailing of avatars, objects, and architectures. Contextual and high-detail inference for increased visual fidelity. Image capture of a high detail avatar from a low detail AR scene using a mobile device, achieved through deferred and "desktop" or high-fidelity grade visual rendering; scene-specific lighting and reflection inference; discreet substitution of low, medium, and high detail assets, etc.

The third concept is automation of real time location-based interactions. An AR avatar may respond attentively and affectively to a person in physical space. Contextual interaction between a location-persistent avatar and a user-controlled avatar, enabled by observing proximity, angle of approach, scale, cultural cues, user-set "personality" traits, etc.

Differentiators

There are two main forms of differentiation relied upon in these methods, multimodality, and correlation of the present disclosure. These methods, when applied to traditional data and informatics, may indicate similarity or difference, and therefor used to derive additional information.

Multimodality

Multimodal methods are relied on for building context and improving quality among other uses to improve both the quality of processes and probability of prediction and the validation of past state/s. The validation of data (such as base truth data in ML models), the definition of meaning, or state verification (such as lexical meaning in latent space and vector models), and the confidence ranking (also for latent space vectors used for prediction and definition) must often include process monitoring, analysis, and subsequent control. Various applications of multimodality and multimodal application may include, but not be limited, to the following:
 (1) Multimodal data distribution: a statistical analysis of the distribution of values. These values may be minimums or maximums depending on the desired indicators and types of data.
 (2) Multimodal human-machine or computer-human interaction (HMI or CHI): multiple modes of input or output may be applied to determine both past interactions, state and predict future variabilities.

(3) Multimodal variance: a method of determining modes of interaction, data transmission, data transformation, and specifying which modality was used to most effectively achieve a given result.

(4) Multimodal transmission: this may include state changes across different modes. The use of several modalities for the altered state or definition of a single artifact, object, or class (each having potential existence as physical or digital states). Note that a lack of transmissibility may also be used for derivative conclusions and alternate data analysis.

(5) Non-modality (a state, class, characteristic, or other data that does not relate to a commonly occurrent set of information) may also provide occasional service, when identifiable In some cases a lack of multimodality may be flagged and used in the opposite manner, identifying, via a lack of multimodality, that a distribution, interaction, variation or definition does not exist, hence helping to avoid false-positive. For example, a fish that has no smell may not be a fish.

Correlation

Correlations emerge when two or more sets of information share reciprocal, potentially recurring, shared set of information. This information may be of a second- or third-order in which immediate reciprocity is not evident. Correlations may provide a third set of data more important than either of the correlating information and may be derived from them (i.e., depth perception from two eyes). Correlational measurements may indicate the relationship or connection between two or more measures. Correlational variances may indicate a temporal value which may be applied to both historic and predictive measures. Correlational interdependence of variable quantities may show a predilection or dominance of one set of data over another, especially when sampled over a period of time.

Non-correlation may indicate the identification of a state, class, characteristic, or other data that does not connect or reciprocate to a commonly linked set of information. This may be useful in identifying, via a lack of interaction, that a presupposed state does not exist. Non-correlation may help to avoid false-positives and to establish a set of data that does not exist. For example, an image seen with only one eye may not exist.

Avatar Creation, Editing, Placement

Avatars, as a likeness of a person, may be created using a computer program and associated network. The avatar created may be altered to appear as similar to an individual person as technically and artistically possible such that others may not be able to tell the difference between the avatar and the person. This representation of the person may appear and interact in many different ways and multiple media types may be used to create the avatar.

Authoring, Editing, and Placing Using ML Methods (AVATAR.1)

1. Photo-Generation of Likeness

A photograph may be used to determine the inferred geometry of a person's face and subsequent inference of their body. The process of capturing a person's likeness may result in rendering the avatar in detailed and photo-realistic style of a face and body. This quantity of graphical maths performed requires a powerful graphics processing unit which may be accessed via a remote, high-capacity server connected via a wide-area network, computer, or telephone network. Additionally, for manual composition and detailed attention, a suite of tools may be provided which may include sliders, menus carousels, buttons, and other user interface conventions. For example, Sarah holds her mobile device to her face, waits a moment, looks at her phone, and sees an image that resembles her head, hair, complexion, and expression she was using. Her facial geometry, shape, skin color, texture, eyebrows (shape and color), and other features are detailed down to the freckles and pimples level-of-detail.

To capture the image, various visual or audio captures may be used, including but not limited to, integration of lidar, IR, and photo. A collection of data sets (IR, photo, sonic, etc.) may be obtained so that majority comparisons may be built as well as the generation of models for comparisons. Additionally, congruencies and differences may be analyzed to remove inaccurate data. The generation of comparative models may also be analyzed to remove inaccurate data. Multiple data sets may be cleaned and normalized to facilitate comparison. These may include polygons, nurbs, voxels, or other methods of 3D representation. They may also be derived from simultaneous localization and mapping (SLAM) like methods. Other methods of analyzing to remove inaccurate data include positive comparison results (minimum of 2) that are separated into a category for generative second-order creation and negative comparison results that are abandoned but saved for later comparisons of negative space models.

The systems and methods of the present disclosure may use a machine learning system to generate statistically appropriate face geometry and categorize the facial data. The probabilistic comparison of correlational data is generated from the models with positive comparison results. Averages, fuzzy comparisons, inclusions, or exclusions may be built when necessary. These results are then used to build the numeric basis of the final model and may also be used to generate a category of type (for example, types might include ectomorph, endomorph, or many others both manually and/or automatically generated). A final model is then generated with appropriate data type and cleaned according to specifications to be integrated with the larger system. In advanced implementations of this system, the formerly captured negative comparison results may be used to confirm that no false positives have been captured. If a false-positive is identified, the system returns to generating statistically appropriate face geometry with alternative methods of increasingly precise measurements or the entry is flagged for manual review.

The systems and methods of the present disclosure may generate an associated body type by referencing a library that correlates common facial features with common bodily features (for example, a category might be endomorph in which a face type that is both round and short is correlated with a body type that is both round and short.) Many types and correlations may be made, both manually and automatically, such that billions of correlations may be included as well as correlations of individual parts or features were non-intuitive correlations present emergent patterns or predictive potential. After an appropriate correlation is identified, a body model is integrated with the larger system.

The systems and methods of the present disclosure may then confirm the associated body type when possible and sorted for later use. In the same manner that a face may be scanned, a body may be scanned as well as sub-set data such as hands, feet, ears, eyes, freckles, and other information inferred from base data. To capture the image, various visual or audio captures may be used, including but not limited to, integration of lidar, IR, and photo. Next, congruencies and differences are analyzed to remove inaccurate data.

The systems and methods of the present disclosure may use a machine learning system to generate statistically appropriate bodily geometry and categorize the somatic data. An associated data type (such base data drawn from inferences as hands, feet, ears, eyes, freckles, and others) may then be generated.

2. Cloud-Detailing

APIs and cloud services may be used to build detailed versions and resolve imperfections or inaccuracies in the scanning or image capture process. The inferred features of a face which were not captured may be included via ML systems. This may be a detailed surface element, such as freckles or a detailed sub-surface element coloring or scattering of light, surface reflection, or other effects. Poorly captured geometric forms such as the bridge of the nose, formation of the chin, etc. may be detailed for AR, VR, and XR, and other purposes including printing and hardware output for robotics applications. For example, Sarah is only able to present a photograph of her face, in ¾ view, and would like a volumetric representation of her entire head. She provides the avatar system with the photo as input and a 3D model of her head is provided as output. Her facial geometry, shape, skin color, texture, eyebrows (shape and color), and other features are detailed down to the freckles and pimples level of detail.

Figure 9:
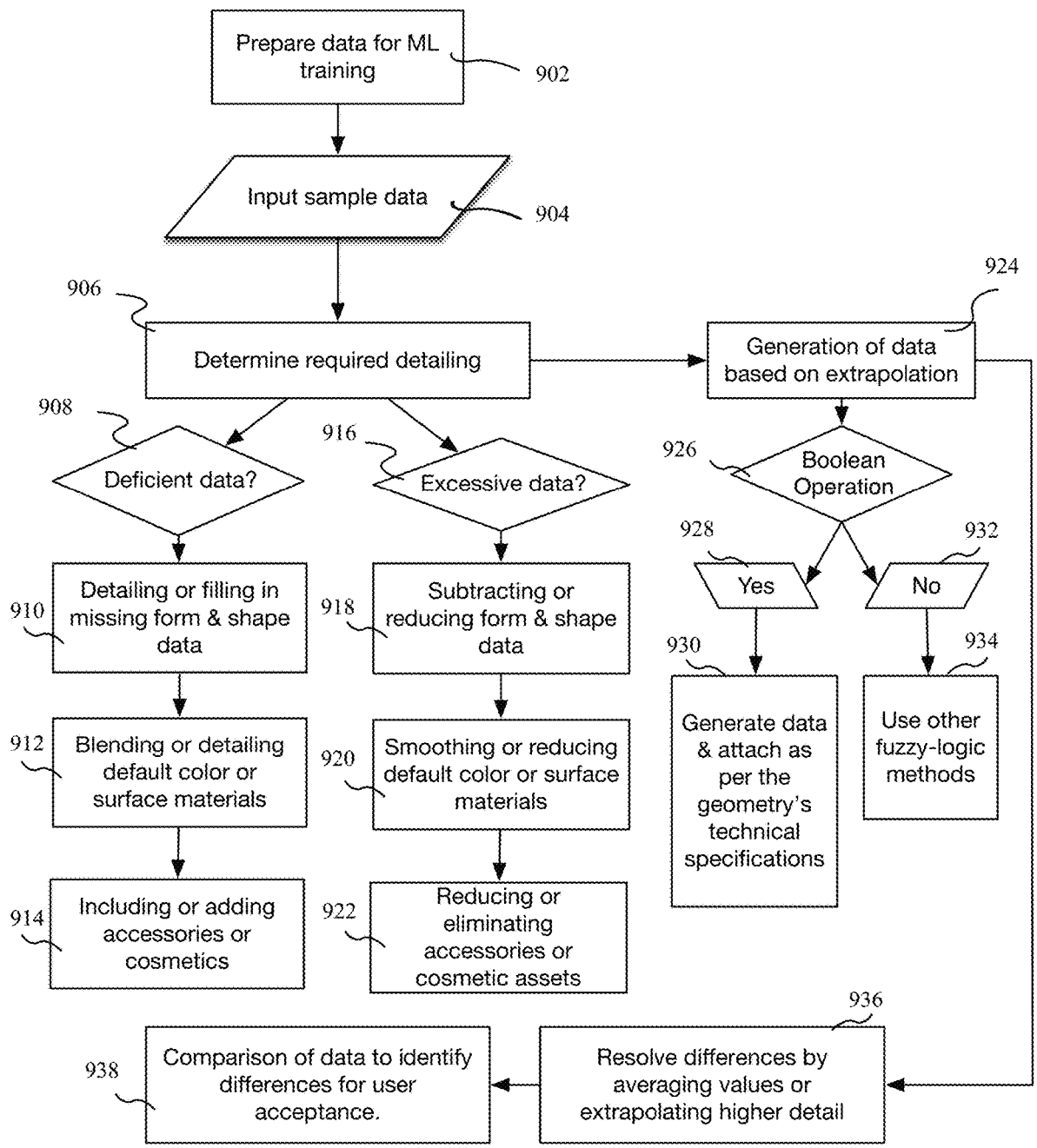
FIG. 9 is a flow diagram illustrating an exemplary method for building detailed versions and resolve imperfections or inaccuracies in the scanning or image capture process, according to one embodiment.

FIG. 9 is a flow diagram illustrating an exemplary method for building detailed versions and resolve imperfections or inaccuracies in the scanning or image capture process, according to one embodiment. First, the data for training is prepared 902. Next, sample data which has been established for training models is input 904 and an analysis of available data and missing data is generated. A determination as to what detailing is required is then made 906. First, a determination is made as to whether the data is deficient 908 by detailing or filling in missing form and shape data (e.g., the side of a head is missing) 910, blending or detailing default color or surface materials 912 (freckles are missing) and including or adding accessories or cosmetic assets (e.g., eyelashes or hair are too short) 914.

Next, a determination is made as to whether the data is excessive 916 by subtracting or reducing form and shape data (e.g., the side of a head is too large) 918, smoothing reducing default color or surface materials (e.g., freckles are numerous) 920 and reducing or eliminating accessories or cosmetic assets (e.g., eyelashes or hair are too long) 922.

Next, generation of data based on extrapolation occurs 924. If this is a Boolean operation 926 in which edges and positives/negatives are clear 928, then data is generated and attached as per the geometry's technical specifications 930. If this is a non-Boolean operation 932 or one in which less clear data is provided (such as a blurred photo or a series of photos with an estimated average to be derived), then other fuzzy-logic methods may be used 934. The differences are resolved by averaging values or extrapolating higher detail 936 and finally a comparison of data to identify differences for user acceptance occurs 938.

3. Universally Unique Identifiers (UUIDs) for Avatars, Object, and Architectures Assets in an avatar system may have a unique ID and there is a need for a low latency, distributed, uncoordinated, and time-based identity system within the larger Avatar Administration System. This is to be used for a range of functions, from ownership to analytics, from editing to economics. An avatar may be deployed with either an alpha-numeric ID or a unique identification number (128-bit) across the various media types and virtual environments, game worlds, apps, networks, and channels. Similarly, objects and architectures may be deployed with either an alpha-numeric ID or with a 64-bit identification. The IDs need to serve three primary functions, which include (but are not limited to) a potential 3rd-party injection with required registration strings, a timestamp, and an identity string. This string may be used, encrypted or otherwise, for tracking existence, user ownership, avatar ownership (such as avatar clothes, accessories, etc.) state changes, behavioral changes, updates, and deletions or other administrative events. This series of transactions may be recorded to both an editable, centralized database, on a permanent, decentralized blockchain, or other hybrids or variations not listed here. For example, Sarah opens an app and is presented with an avatar which she has never edited. Behind the scenes, without her knowing or seeing what happens, the avatar is assigned by the administrative system a 128-bit string or Universal, Unique Identifier UUID). It might look similar to a string such as 7c0cef7feba97b7cde4f49faf199baa1 in the alpha-numeric example or 797218265074245867 in the 128-bit example and additional metadata, QR Codes and other identifiers may be linked to it.

A UUID may be created for an avatar. For example, an alpha-numeric or 128-bit UUID is generated and assigned to the avatar or, in exceptional circumstances, a group of avatars. The 128-UUID is hashed with co-reference to avatar owner. Encrypted and dual-pair keys are automatically generated and may be provided upon avatar owner's (or person's) request.

UUIDs may also be created for objects. For example, an alpha-numeric or 128 or 64-bit UUID is generated and assigned to the object, accessory, vehicle, or other data asset. The 128-UUID is hashed with coreference to avatar owner. Encrypted and dual-pair key are automatically generated and may be provided upon avatar owner's (or person's) request.

UUIDs may also be generated for architectures and environments. An alpha-numeric or 128 or 64-bit UUID is generated and assigned to the building, environment, weather system, time period, circumstance, cause-effect series, or other data asset.

Similarly, UUIDs may be utilized for collections of data and specific circumstances, such as identifying a particular hour at a virtual (or even a physical) disco party which would, therefor, include a group of avatars, assets, locations, animations, songs, lights and, of course, a disco ball.

4. Multi-Party Creation

Multiple parties may create, author, edit, and place this avatar as well as assets such as accessories, environments, or circumstances. Multiple parties may interact to create, edit, and place avatars, objects, and environments. In this potentially commercial interaction, different parties are responsible for different aspects of the shared and divided labor. For example, one party may author the face, another the body, and a third party the colors, textures, and animations. Accessories or other objects may be authored in this way. A communications interface is provided, such as a text-based, voice based, video-based or other. When the decisions are agreed on by all parties (commonly unanimously, in some cases via majority or occasionally preferential rights voting and other decision-flow structures) a function allows this new avatar to be built under a separate UUID with that date noted as the instantiation time.

As an example, Sarah and Jojo both like their avatar, but agree that Jojo has cooler curves and Sarah a stronger jaw, so they agree to collaborate and integrate the preferred features into a third avatar. Simultaneously, on both mobile devices within their respective apps, they indicate the avatars they each wish to lend and then are presented with an avatar that is default (or a blend of both value sets of each avatar) and a series of menus in which there are nonidentical data sets. For example, Sarah's block-shaped jaw is presented next to Jojo's pear-shaped jaw. Sarah's avatar's jaw is selected and agreed upon by both parties and the next decision is provided. Jojo's slinky and curved body is presented next to Sarah's block of a body. Again, they tap their selection and when both agree then they continue towards the final step of completing the avatar features. Just before finishing, Jojo suggests they fine-tune the body shape to a slight degree. On both agreeing they are finished the avatar is instantiated and assigned a new UUID.

With multiparty creation, two or more mobile clients communicate to exchange resources and assets for a shared experience providing an access to the same file with shared timestamps (via 'Operational Transformations,' web frameworks or concurrency access resolution). First, a default avatar, and potential accessories, are presented that are neither interactive nor dynamic and have no surrounding architectures or environments. Multiple choices (differences) are shown as icons or other interface elements. These may come from previously generated avatars or may come from an initial build process.

Next, a user chooses one of the options and this is displayed on all clients while other users make similar choices. If two changes that are different are submitted in the same 2-second timeframe, a submenu notifies of the conflict and highlights this decision. If two assets are presented with an intention to be combined into an averaged representation, such as two walking styles, or two similar t-shirts, the relevant parameters are averaged, and machine learning (ML) may be used to extend and iterate on this design. Next, discussions may be carried out to determine the qualifications and reasoning and when a button (such as, for example, a green button inscribed with the word "Accept Change") is clicked, other users are notified. The "Accept Change" selection may be de-selected at any moment. When all decisions are accepted and agreed upon (as according to decision-making protocol) that decision state is saved. Synchronization of data across multiple clients is confirmed and the avatar, or other asset, is assigned a UUID and stored on the server.

5. Multi-Party Interaction

Multiple parties may drive the avatar and determine how it interacts. Multiple parties may interact to operate and interact with avatars, objects, and environments. In this potentially commercial interaction, different parties are responsible for different aspects of the shared and divided labor and a communications interface is provided, such as a text-based, voice based, video-based, allowing the parties to communicate. As an example, Jojo has been working in the application building various assets: specifically detailed work around the head and face including smiles, grins, laugh animations and other cycled animations such as walking and waving. Jojo is proud of the work but not necessarily wanting to use it on their avatar, meanwhile, Sarah has also been building on walk cycles, and has been building a series of interactive accessory objects that aren't the avatar, such as a three-point pirate hat, a parrot on the shoulder, and a component in which the parrot interacts differently with different people based on past interactions that Sarah has provided.

Two or more mobile clients communicate to exchange resources and assets for a shared experience providing access to the same file with shared timestamps (via 'Operational Transformations,' web frameworks or concurrency access resolution). A default avatar is then presented allowing for the presentation of avatars (and potential accessories) that are interactive and dynamic with environments. Next, multiple choices (differences) are shown as icons or other interface elements. These icons or other interface elements may come from previously generated avatars or may come from an initial build process and include, but are not limited to, poses, animations, tasks, knowledge, processes, transformations, predicted behaviors, generated data, and other changes.

Figure 2:
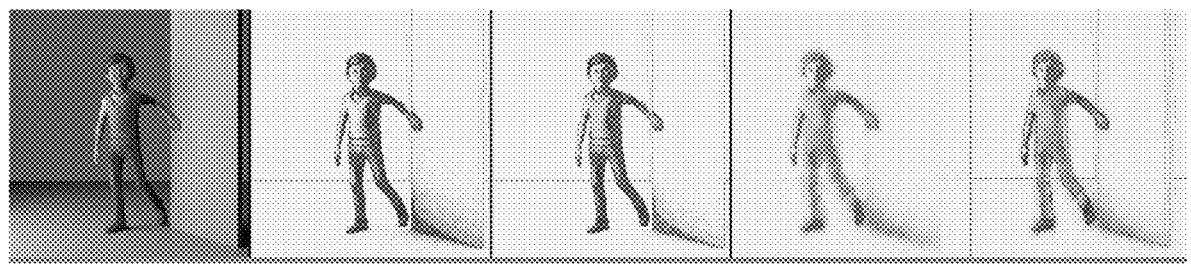

A user then chooses one of the options and this choice is simultaneously displayed on all clients. Other users make similar choices and if two changes which are different are submitted in the same 2-second timeframe, a submenu notifies of the conflict and highlights this decision. If two assets are presented with an intention to be combined into an averaged representation, such as two walking styles, or two similar t-shirts, the relevant parameters are averaged, and ML may be used to extend and iterate on this design. Discussions may then be carried out to determine the qualifications and reasoning. When a button (such as, for example, a green button inscribed with the word "Accept Change") is clicked other users are notified. The "Accept Change" selection may be de-selected at any moment. If only a single asset is offered (for example there is no alternative sets of data or multiple choices to pick from) the same interface of accepting or rejecting the choice is presented. If the object is rejected it is simply not used in the avatar. When all decisions are accepted and agreed upon (as according to decision-making protocol) that decision state is saved and synchronization of data across multiple clients is confirmed. The avatar (or another asset) is then assigned a UUID and stored on the server 6. Style Application Different visual styles may be selected by a group of two or more and different visual styles may be employed. An avatar's geometry, after being captured with the above data capture process, may be represented in many visual styles, such as toon shading, photoreal, line art, shadow, inversions and other impressions and styles. For example, after Sarah and Jojo have decided that they like their avatar, movements, and means of interaction there are some final style filters they wanted to explore together in much the same way as the other collaborative decisions. Avatars, accessories, or other assets are selected for style application and styles are presented in a separate interface which show common rendering options (toon, sepia, anime, etc.) prepared and provided in the AR avatar system's client UI. The client can then edit the AR rendering options available, displays updated appearance (toon). FIGS. 1 and 2 illustrates visual examples of applying different visual styles to an avatar.

7. Sensor Improvement

Alternative sensors, such as cameras, may improve and change the appearance, movements, and sounds of the AR avatar system. Multiple cameras may gradually improve the geometry, textures, and color of an avatar. With visual data (video or photographic or other means of acquiring visual data including but not limited to sonar and others) input depth perception camera, photographs, and other visual data inputs. Both repeating and exceptional information may be separated and compared to allow an increasingly high fidelity of image. Similarly, to the Core Concept Enhanced detailing of avatars, the image capture of a high-detail avatar from a low-detail AR scene may employ various sensors to increase fidelity.

For example, Sarah sent Jojo a hat, but the hat that Jojo received was defective. It was unable to be used at a high resolution for printing and for a virtual world that Jojo wanted to enter and so Jojo needed to find ways to improve the hat. Jojo starts the "Improve Fidelity" feature of the application and selects the hat. The application provides Jojo with a range of options to improve (based on the core characteristics of the hat, such that it is visual, therefor has a shape and color or texture). Jojo can then select "Texture" and takes a photo of the fabric on the paisley sofa in the living room. The virtual hat, after an approved acceptance from Jojo, is updated with the new texture.

The AR avatar system is placed/exported to a physical location as a final file and a 3rd-party camera is given read/write (RW) permissions to the avatar system's assets. Alternatively, the user may be asked to rotate and take a 360° video of the surrounding area. The image is then analyzed for light properties (types, directions, colors, etc.) as well as sound properties (type, volumes, affects, etc.). Other analyses may be conducted based on data obtained from other sensors. Alternatively, physical, or virtual architecture may be mapped out via simultaneous localization and mapping (SLAM) or other known means of generating a spatial representation. This may also be used to locate the device within a physical or virtual map.

Example Device Architecture

Figure 6:
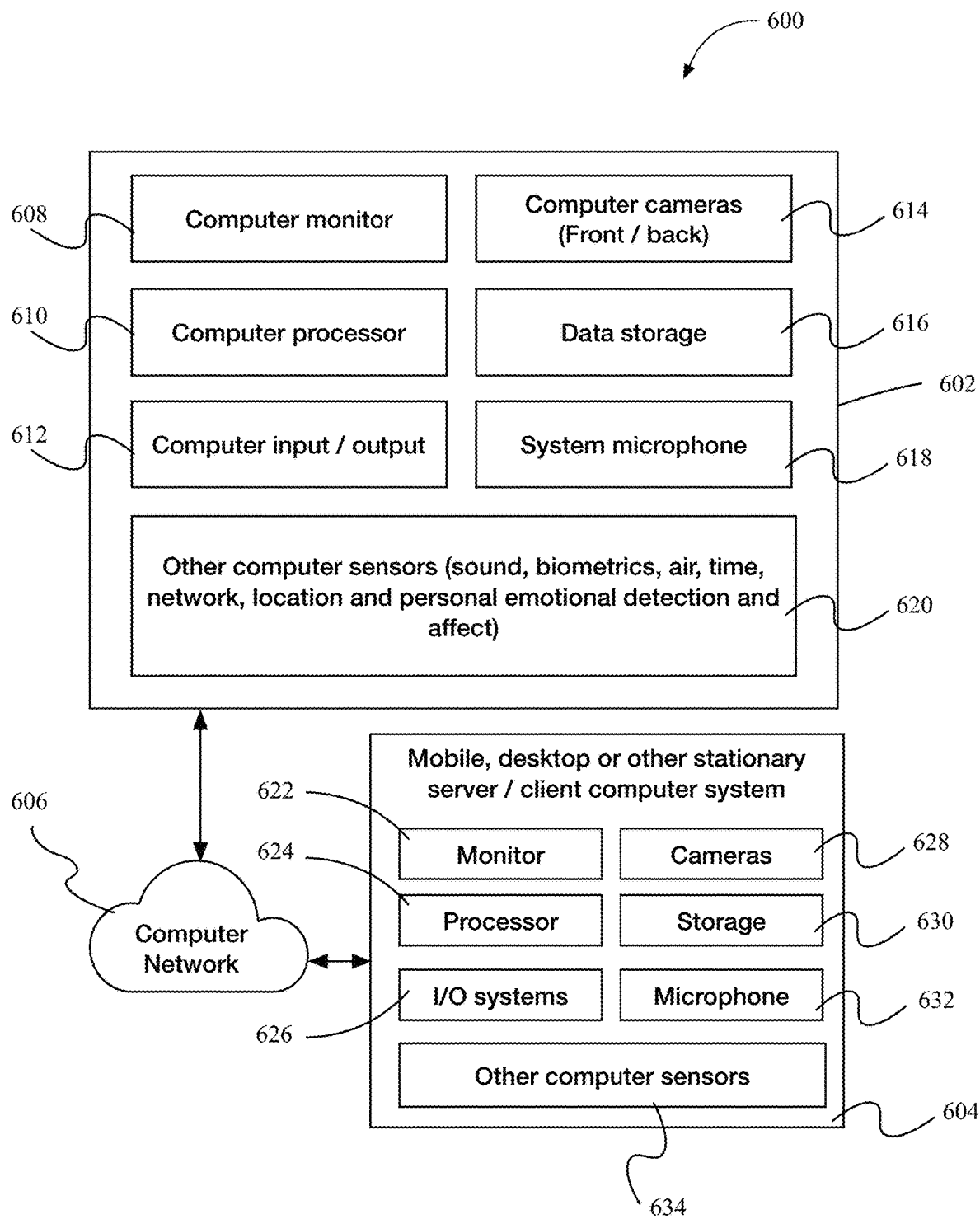
FIG. 6 illustrates a device architecture for implementing the features and processes described herein, according to one embodiment.

FIG. 6 illustrates a device architecture 600 for implementing the features and processes described herein, according to one embodiment. Communication between any or all of the apparatus, devices, systems, functions, modules, and services and servers described herein may be made through one or more wired and/or wireless communication/computer network(s) 606. Examples of communication network(s) 606 include a public switched telephone network (PSTN), a wide area network (WAN), a local area network (LAN), a TCP/IP data network such as the Internet, and a wireless network such as the 3G, 4G, LTE, and 5G networks promulgated by the Third Generation Partnership Project (3GPP). The communication networks(s) 606 may be any one or combination of two or more communication networks such as, but not limited to, the just-mentioned communication networks.

As shown, the communication/computer network 606 connects a first computer system 602 to a second computer system 604. The first computer system 602 may be a mobile, desktop or other stationary server/client computer system. Additionally, the second computer system 604 may also be a mobile, desktop or other stationary server/client computer system, where the first and second computer systems 602, 604 may be the same or different. The various components in architecture 600 can be coupled by one or more communication buses or signal lines.

In accordance with at least some embodiments, the first computer system 602 may comprise a monitor 608, a processor 610, an input/output (I/O) subsystem 612 to perform input/output operations associated with access to the Internet and perform, for example, methods described herein, cameras (front/back) 614, local data storage 616, microphone 618, as well as other computer sensors 620 such as sensors for sound, biometrics, air, time, network, location, and personal emotional detection and affect.

In accordance with at least some embodiments, the second computer system 604 may comprise a monitory 622, processor 624, an input/output (I/O) subsystem 626 to perform input/output operations associated with access to the Internet and perform, for example, methods described herein, cameras 618, data storage 630, microphone 632, as well as other computer sensors 634 such as sensors for sound, biometrics, air, time, network, location, and personal emotional detection and affect.

Method of Sensor Improvement

Figure 7:
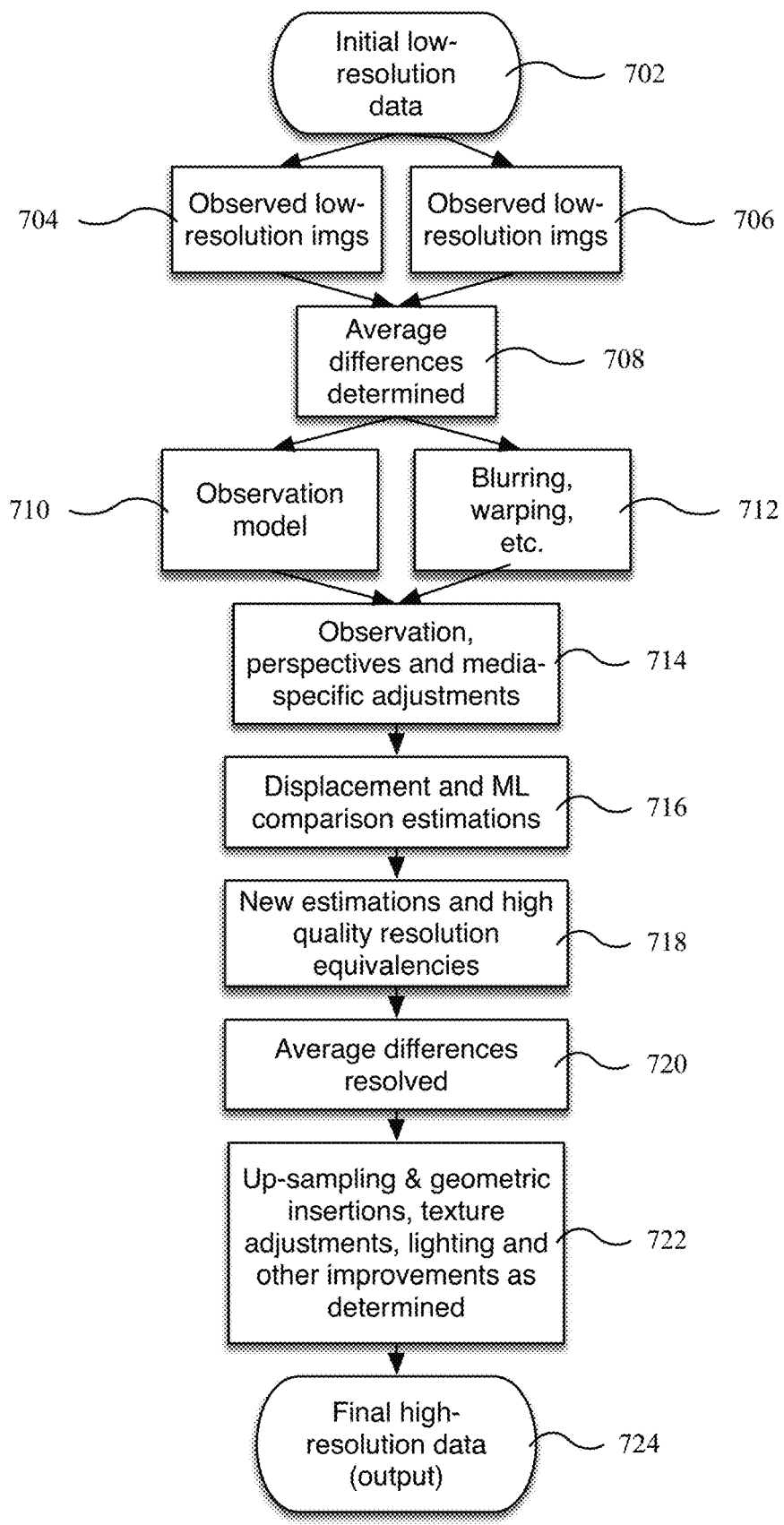
FIG. 7 is a flow diagram illustrating an exemplary method of sensor improvement, according to an exemplary embodiment.
Figure 8A:
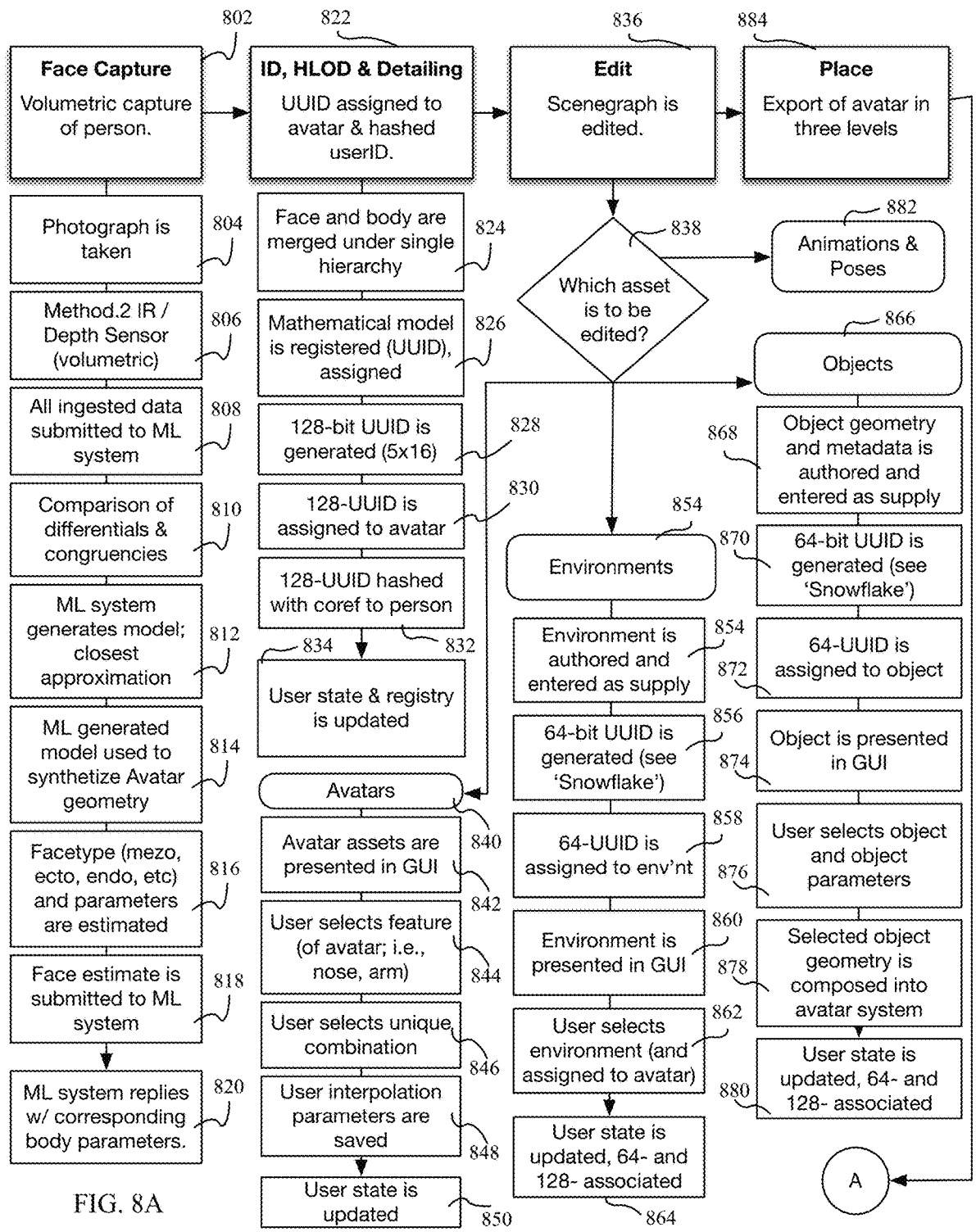
FIGS. 8A, 8B, and 8C is a flow diagram illustrating an exemplary method of accommodating asynchronous, local, and future interactions, according to one embodiment.
Figure 8B:
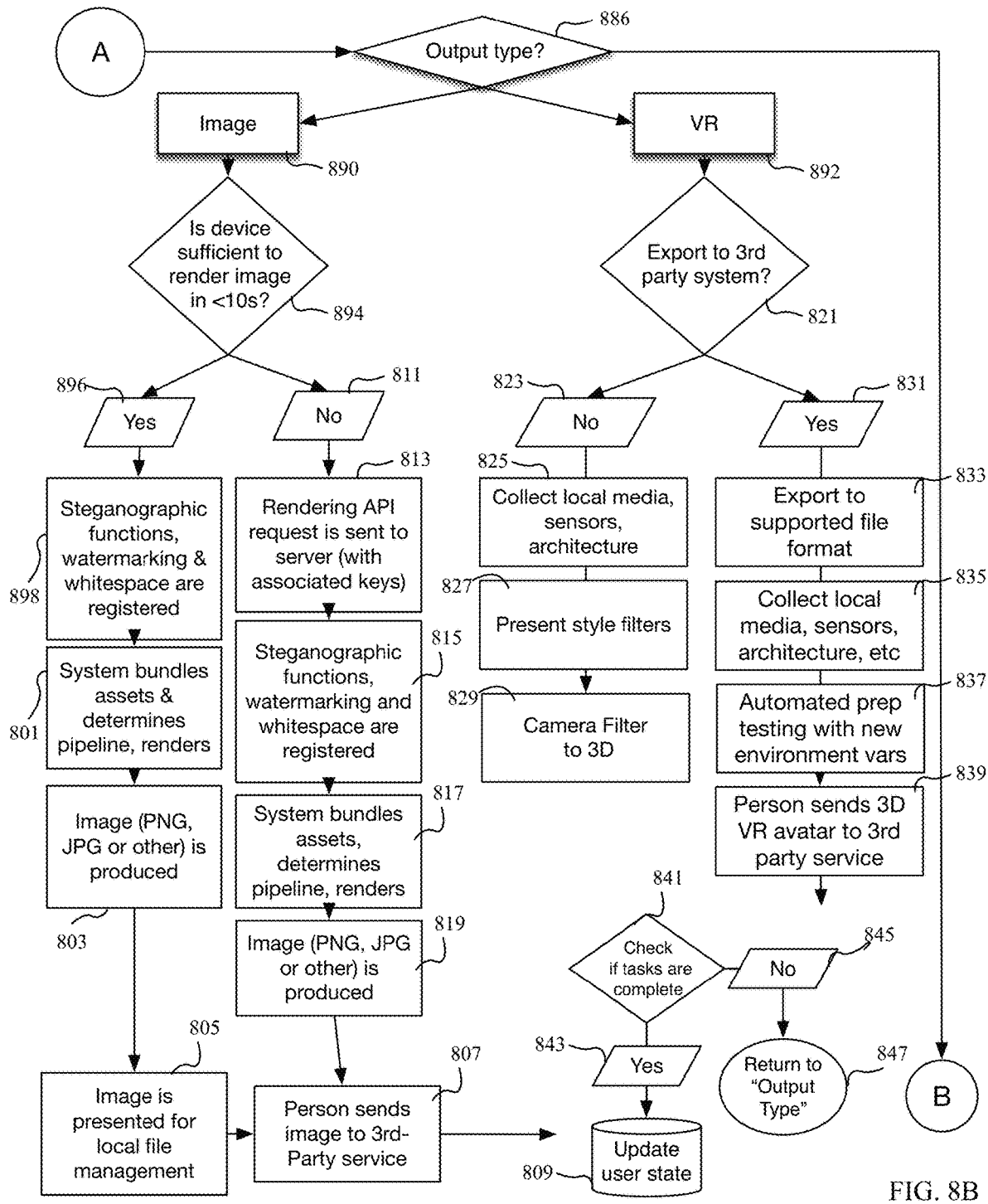
Figure 8C:
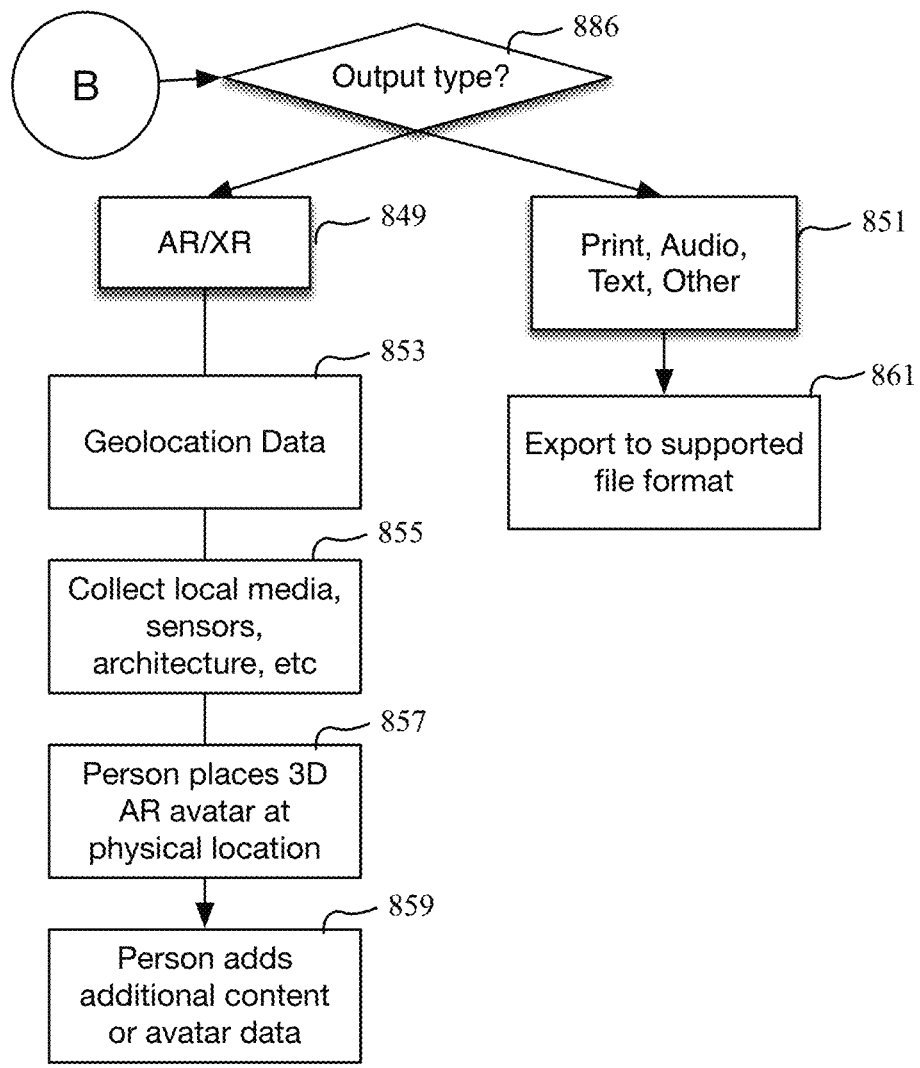

FIG. 7 is a flow diagram illustrating an exemplary method of sensor improvement, according to an exemplary embodiment. First, initial low-resolution data is input or received 702. For example, a 3rd-party camera may take contextually relevant photos (such as avatar owner's paisley shirt texture) 704, 706. The multiple low-resolution images are compared, and the average differences between the low-resolution images are determined 708. Next, using the differences, an observation model 710 is generated which shows the differences such as blurring, warping, etc. 712. From the observation model, observation, perspectives, and media specific adjustments may be made 714 and the differences resolved via displacement models and ML comparisons 716. Next, new estimations and high-quality resolution equivalencies are viewed 718 and the averages of the differences is resolved 720. Up sampling and geometric insertions, texture adjustments, lighting and other improvements needed are determined 722. The 3rd party client may then append photographic data to the avatar system's assets (converting former shirt into paisley) 724.

8. Avatar Migration

The avatar may be moved to different physical and virtual systems. That is, the avatar may be migrated and instantiated across both computational and physical systems. In physical systems, the avatar may appear as a 3D printed character, being printed to a polymer, styrene or printer of other material automatically printing from the 3D computer file. Or as an assemblage of material parts such as hat, shirt, and a mask the person wearing their face. An additional implementation would be one in which a computer/animated drawing for other implementation such as a robotic arm, editing or authoring a physical surface be a plastic paper clay or other physical media. In virtual systems, the avatar may be migrated to other computational or virtual environments. These digital environments may be represented by a screen, hologram, auditory interface, or other computational platform. In this method, a transom may be established to build a core identification of the avatar and the core characteristics of appearance, such as shape and color, are transmitted and then, as near as technically possible to a different computing system or virtual world or media environment that also displays shapes and colors. Application programming interfaces (APIs) may allow the subdivision or reduction of polygons according to the system environment requirements. In a similar fashion, all other characteristics of the avatar may be expressed across the systems and the core identity transom preserved via private, public, open, local, distributed or other verified data management methods. Some information such as texture map details, efficiency of model, specific colors and other features will probably to be lost. Re-exporting (or exporting from the 3rd-party system back into the avatar application system) may be partially achieved by visual data collection methods as known in the art.

For example, Sarah makes an avatar in her mobile app and wants to take the work she has done and the precise detail into Fortnite and other gaming systems she frequents. Already having an account on the 3rd-party system, she exports the avatar from the mobile app and then waits while the receiving system confirms the new avatar. She is then presented with the new look, approves (or disapproves) and then logs in to drive the new version of her old avatar.

With avatar migration, an avatar ID is first established and associated with user. The ID transom is provided to a 3rd-party virtual world or other avatar systems. The system specifications and definitions are detailed including, not limited to, mesh or geometry type definition, polygon (or triangles or nurbs, voxel or other geometry type) definitions, skeletal rigging definitions, morph and other animation definitions, scale and measurements (global and local), other details including filters, time treatments, etc., and ID is referenced to the 3rd-party system via API or other interface.

9. Appearance and Sound Integration

Visual features of other avatar systems may be collected from one source and integrated into a target avatar system. For example, appearances, looks, sounds, and noises from objects, places and people may be measured, collected, stored, and integrated into other avatar systems. Polynomial information, such as facial feature size, position, shape, proportion or symmetry or asymmetry may be integrated into another avatar. This method may provide means of editing or generating an instance of a mouth, nose, eyes, chin, or other features. Objects and architectures may be provided and similarly treated. Likewise, auditory integration, for sound, may be similarly handled such that features, and characteristics of tone, volume, tempo, tenor, pitch, and other numeric data may be duplicated and copied for integration into another avatar system. This method may also be useful when one avatar system is used as a source and the appearance and sound is then integrated into the second, target avatar system.

Source data (appearance, animation, sound, and lighting model) is identified, measured, and stored. The corresponding target avatar system data is measured and edited, in some cases via built-in UI component and the features of source data applied to target avatar system's equivalent dataset and displayed in the client.

As an example, Jojo made a set of green eyes that emit purple light, blink, and generate a clap track, snapping sound when blinking. Sarah would like to integrate Jojo's eyes into her own avatar's face, and she connects with Jojo as a friend, asks permission, and Jojo's eye shapes are added to Sarah's existing library of eye shapes.

10. Behavior Integration

The behavior of other avatars, as well as the animations of other avatars, may be integrated. Polynomial information such as rotation, transformation, frequency, and range information may be integrated into an avatar's movements as animations. For example, movement styles such as dancing, walking, standing, or waving would be possible. This includes, but is not limited to the integration of a gait, posture, or gesture. Source data (appearance or sound) is identified, measured, and stored. Corresponding target avatar system data is measured and edited, in some cases via built-in UI component and features of source data applied to target avatar system's equivalent dataset and displayed in client.

As an example, Sarah would like to integrate Jojo's gait into her own avatar's walk and she connects with Jojo as a friend, asks permission, and Jojo's posture, timing, and manner of walking are added to Sarah's existing library of animations. After some discussion, Sarah learns from Jojo that the walking animations were derived from a set of dance animations Jojo had made years earlier—so these are also added to Sarah's animations library.

11. Iterations and Syntheses

New examples and innovative models via ML may be derived from the normalization (or derivation of an atomic, representational element of data) and recombination of different styles. The avatar, object, or environment may be equipped with various technical flags or extensions which may generate iterations and new extensions. These extensions may include additional functionality, shapes, colors, or sounds that allow increased use and value to both the end-user and administrative system, or other stakeholders. As collections of functionalities accumulate, GANs and other machine learning methods may analyze the function of these systems and, as in the case of finding similarities and differences in fashion, may find similarities and differences in function. The use of GANs and other machine learning methods may allow the analysis and atomization of the style or styles of an avatar, object, or environment. It may also allow identification of similarities and differences of visual styles and other complex presentations.

For example, the ML analysis of The Jackson Five's specific style may reveal that their style's atomic parts (bell-bottom pants, broad-collar vests, and tight afro hairstyle each have a close proximity to the style of Earth, Wind and Fire (bell-bottom pants, broad-collar vests, and tight afro hairstyle). ML methods may also allow identification of differences and note that the style of the two is different. For example, that the Jackson Five commonly wore long, flowing sleeves, and Earth Wind and Fire often wore sleeveless shirts. Note that recombined variations and combination of the two styles as defined by a neural net or GAN may create something similar to each, but with unique properties.

Multiple examples of subtle style variations among avatars may be collected. Prepare data for (supervised or unsupervised). Fitness functions to evaluate output are established which reflects the chosen library and in particular the areas of innovation that most need to be evolved. Dual sets of ML models are then prepared such that the feature extraction used to prepare the training dataset is stored for later use as a comparative factor to the fitness function(s). New examples are then generated that are nominally outside of the vector space parameters according to suggested influence or additional vector values. Features that were extracted are then recombined after processing and then reviewed manually for quality. These events are recorded, stored, and later used as ML training data.

Figures 10, 11:
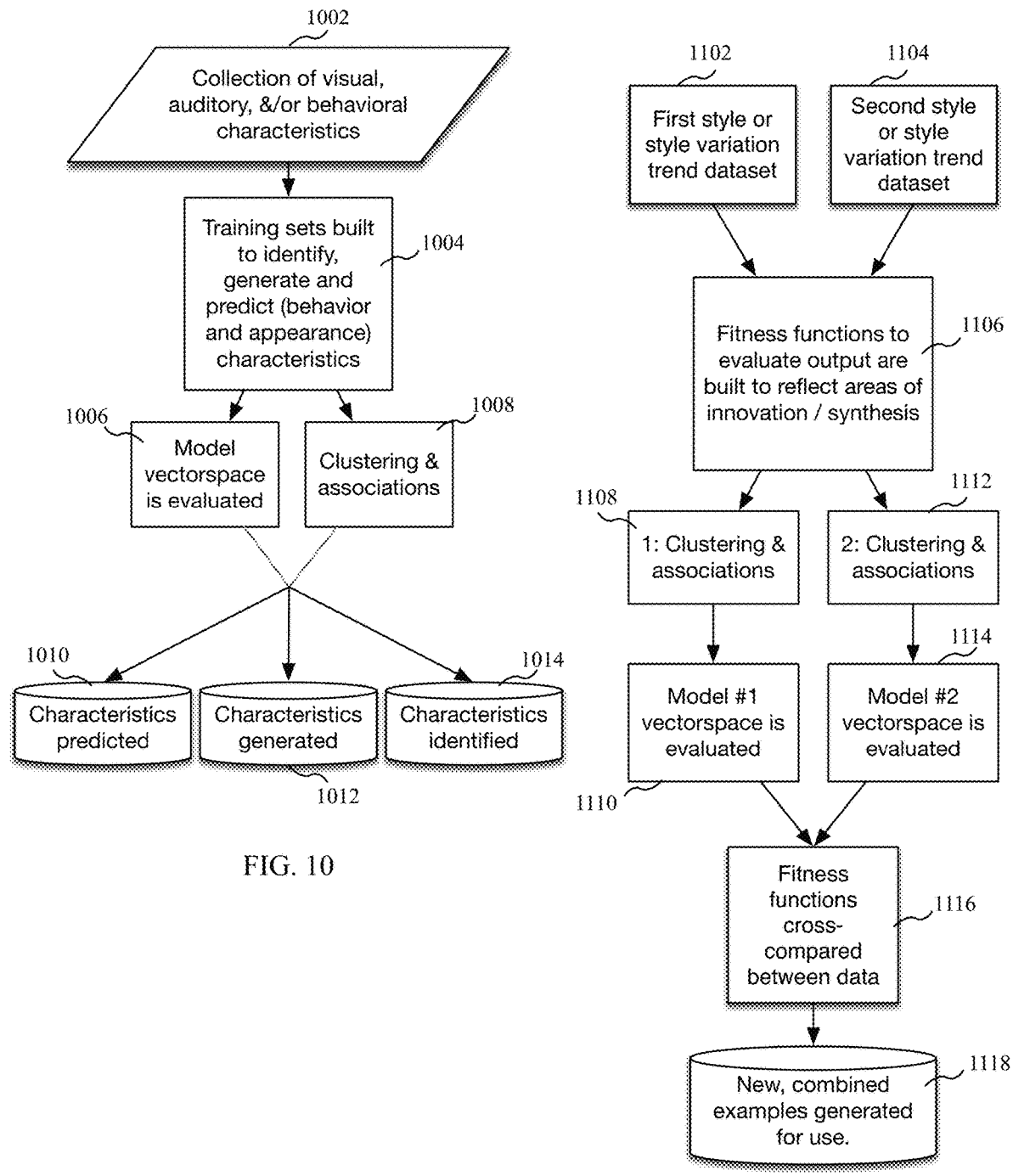
FIG. 10 is a flow diagram illustrating analytics identifying a range of characteristics of an avatar system, according to one aspect.
FIG. 11 is a flow diagram illustrating collecting subtle style variations among avatar, according to one aspect.

FIG. 11 is a flow diagram illustrating collecting subtle style variations among avatar, according to one aspect. A first style or style variation trend dataset is obtained 1102 and a second style or style variation trend dataset is obtained 1104. Next, fitness functions are used to evaluate output are built to reflect areas of innovation/synthesis 1106.

Next, clustering associations, and generalizations are then performed, 1108, 1112 and ML models are evaluated 1110, 1114. Fitness functions are cross compared between data 1116 and new, combined examples are generated for use 1118.

12. Appearance and Movement Identification, Generation, and Prediction

Analytics may identify a range of characteristics which are applicable to quantifying, copying, and predicting new features. Analytics driven by machine learning may be used to identify, generate, and predict avatar appearance. Styles and looks of other avatars or people may be evaluated. Polynomial information (such as scales, distances, transformations, rotations, frequencies, and ranges), as these numbers inform visual appearance, may be integrated into another avatar's time-based appearance such as movements, as gestures or as animations. For example, the movement styles such as iconic gestures, posture or combinations of specific visual details would be possible. The ability to dress up, adopt hairstyle, makeup, or fashion expression as other avatars, living people or deceased celebrities would allow an avatar to mimic their particular look and style.

Figure 5:
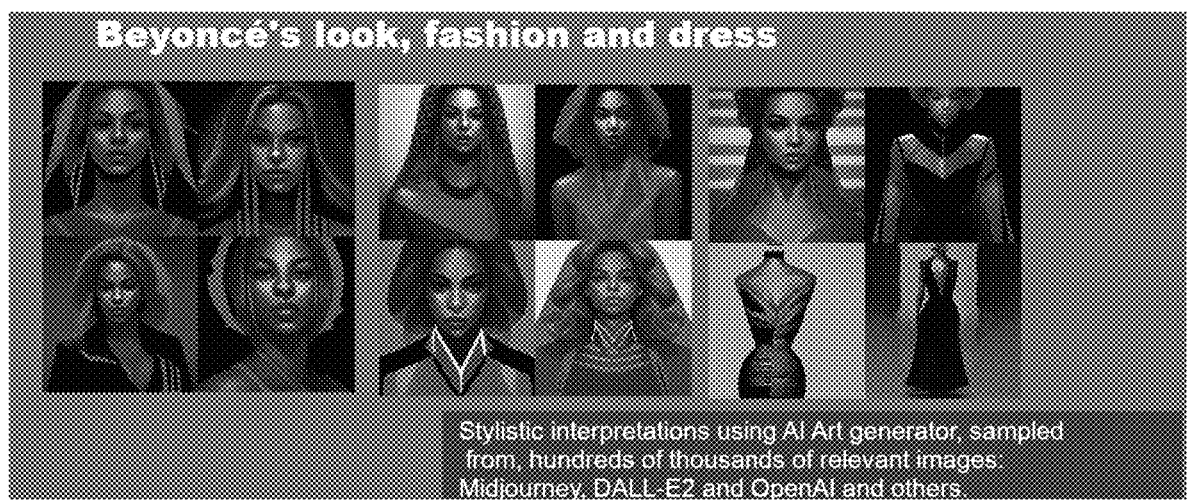
FIG. 5 illustrates an example of identifying a range of characteristics and stylistic interpretations using an artificial intelligence (AI) generator, sampled from hundreds of thousands of images.

As an example, a Beyoncé style may be identified as including a long hair, tall stature, a relaxed gait, and poised elegance, chin in the air with a serious expression. These features may be quantified and recreated in a series of avatars. Likewise, if a series of avatars exhibit similar measures. FIG. 5 illustrates an example of identifying a range of characteristics and stylistic interpretations using an artificial intelligence (AI) generator, sampled from hundreds of thousands of images. Multiple examples of an avatar style may be collected, and a training dataset is generated (supervised or unsupervised). Clustering, associations, and generalizations are then performed, and ML model is evaluated. Existing examples within vector space parameters are then identified and suggested and new examples within the vector space parameters are generated. The new examples generated are normally outside of the vector space parameters according to suggested influence or additional vector value.

FIG. 10 is a flow diagram illustrating analytics identifying a range of characteristics of an avatar system, according to one aspect. First, visual, auditory, and/or behavioral characteristics are collected 1002. Next, training sets are built to identify, generate, and predict behavior and appearance characteristics 1004. The model vector space is evaluated 1006 and clustering and associations of the characteristics occur 1008. From this, the characteristics are predicted 1010-1014.

13. Mobile UI for Generating Avatars

User-generated avatar created using a user interface on a mobile device. Manual geometry manipulation of a detailed avatar face using a mobile device, which relies on a combination of custom precise-control UI elements, user attention direction, contextual adjustment limits, a UI organization system, etc., may be utilized.

As an example, Sarah downloads and opens an app which provides her the means of generating an avatar. She may scan an image of her face or may choose to select the facial features, head and body shape, eye colors, and other details. Additional features such as fingernail polish or cut, length, clothing details, shoes, and hair styles are then selected. She selects the options she finds most attractive to her or perhaps representative of a goal image she imagined and saves the avatar.

A user may install, instance, and launch an application which contains a series of assets such as skin, hair, clothing, makeup, and accessories. The assets may be manipulated by the user and compose a range of floating values which, when combined to integers, forms a unique avatar. The application (or "app") would provide a series of menus, including but not limited to buttons, carousels, targeted sliders, and two-dimensional sliders which perform binomial (X/Y) calculations.

The sliders can adjust the relative X/Y fields of horizontal and vertical manipulation of geometry which displays adjustments proportional to the movement of the finger in real time on the screen, recording it to multiple state files in memory. When these are adjusted the user may confirm the final decision or simply leave the menu. Carousels are a display of a listed inventory which may be numerical, visual, auditory, numeric, or contain other data. Carousels may have acceleration proportional to the speed of the user's finger (or users' fingers in a group), with the carousel represented as a flat, tickertape, cylinder, sphere, or combination of these shapes in a 3D space. All interface mechanisms (sliders, buttons, carousels, and others) may be employed along vertical, horizontal, or other axis. They may be presented on a 2D screen or in a 3D space, individual user (with unique input and output) or socially for multiple users (with shared or collaborative input and output).

Additional interface input conventions may include, but are not limited to, gesture (in which a user may wave an arm or hand for input), attention (in which the eyes of the user are tracked to identify input), motion (in which some other part of a user's body is tracked to identify output), device motion (in which moving the device moves the information presented, applicable to many kinds of Augmented Reality services and content), neural, or BMI interfaces (in which neurological signals are tracked to identify input). Additional combinations of any or all the above may be included. These events are recorded, stored, and later used as ML training data.

14. Enhanced Detailing of Avatars

Contextual and high-detail inference for increased visual fidelity may be utilized. The image capture of a high detail avatar from a low detail AR scene using a mobile device, may be achieved through deferred and "desktop" grade rendering; scene-specific lighting and reflection inference; discreet substitution of low, medium, and high detail assets; etc. These details may include, but are not limited to, relighting, recoloring, retexturing, reposing, and reanimating. These events may then be recorded, stored, and later used as ML training data 15. Video to Animation Conversions A video may be used to build avatar animations. A person may apply an avatar and camera to collect time-based data such as movements, gestures, and sound. Audio, ambient light, angle of sun and other visual or auditory cues as well as data that is not evident such as timestamp, GPS, or other information in the video may be used to generate the avatar.

As an example, Colin wants to tell a story in an interesting way to a friend. Colin holds his device camera up to his face, and on his device screen, he sees a virtual representation of his face, hairstyle, body, etc. (his avatar) in the camera frame. As he moves his face, his virtual avatar's face moves in real-time, mirroring his expressions and actions. As he moves his body, the avatar reflects him as he walks, gestures with his hands, dances, etc. He presses record, tells his story, and re-watches the video that he just created. In the video, his avatar moves, speaks, and expresses emotions as he just did minutes ago. The camera can interpolate a range of other data into the avatar animation. For example, the camera could sense Colin's rapid pulse as he dances and give an accurate reading of his overall arousal, translating that information into animated sweaty palms, a flushed face, etc. Additionally, using the angle of the sun in the video (or lack thereof) and/or GPS information in the camera, the animation could reflect the time of day (animating the background of the scene to reflect Colin's actual environment or adjusting the lighting on Colin's avatar to reflect the angle of the sun). Lastly, two or more data cues can be analyzed together to create even more dynamic animated effects. For instance, the camera could detect weather conditions (snow) as well as use infrared (IR) to determine a heat map of Colin's body (showing he's much colder at his extremities). In the animated video, Colin's avatar would be set in an animated, snowy scene. Based on the IR data, the animation may automatically put gloves and a hat on Colin's avatar, even if he wasn't wearing any in real life. Later, Colin could even upload old footage of him during the events he is recalling (for dramatic storytelling effect) from his camera roll and have his physical self-translated into his animated avatar. In real-time or in post-editing, Colin could add visual effects to embellish the video animation (slo-motion, additional gestures, emotes, etc.)

Figure 29:
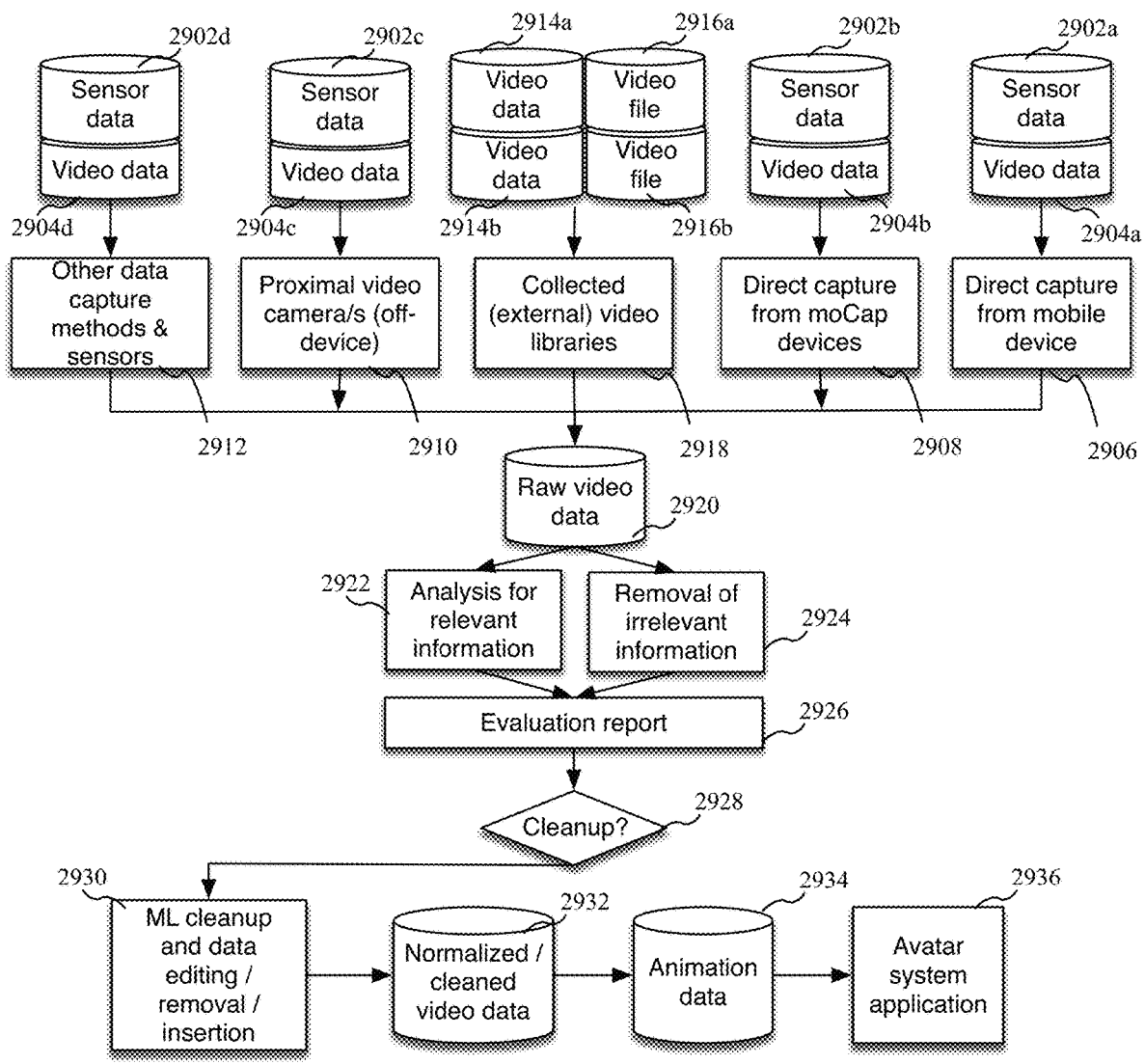
FIG. 29 is a flow diagram illustrating an exemplary method of video to animation conversions, according to one embodiment.

FIG. 29 is a flow diagram illustrating an exemplary method of video to animation conversions, according to one embodiment. As shown, sensor and video data 2902*a*-2902*d*, 2904*a*-2904*d* may be captured directly from a mobile device 2906, a motion capture (MoCap) device 2908, proximal video camera(s) (off-device) 2910, and other data capture methods and sensors known in the art 2912. Additionally, video data 2914*a*, 2914*b* and video files 2916*a*, 2916*b* are collected from an external video library 2918.

The raw video data 2920 of the sensor data 2902*a*-2902*d*, video data 2904*a*-2904*d* and 2914*a*, 2914*b*, and video files 2916*a* and 2916*b* is then analyzed for relevant information 2922 and any irrelevant information may be removed 2924 and an evaluation report is generated 2926. Based on the evaluation report, it may be determined that cleanup of the information/data may be required 2928. If cleanup is required, ML cleanup and data editing/removal/insertion occurs 2930 producing normalized/cleaned video data 2932 creating animation data 2934, and the avatar system application 2936.

When developing the avatar, physics rigging, morph targets, and other animation assets may be established to frame the level of resolution and core camera distance and angle. Animations of a library of potential movements are delivered to ML system for analysis. Additionally, image recognition API or other visual ML system (posture analysis, gesture analysis), may be implemented to detect user movement. Next, analysis of the environment may be included as part of the pre-capture process. The analyzed may include a range of sensors (such as image analysis and recognition, light types, directions, colors, etc.). Sound properties may also be analyzed (such as type of sound via sound recognition, volumes, affects, etc.). Other analyses may utilize other sensors, including, but not limited to, light (CV, Radar, Lidar, IR, etc.), sound (speech recognition, sound detection, etc.), biometrics (Fingerprint, Face, Voice, etc.), air (Quality, Weather, Temperature, Humidity, etc), time (Local, Deltas, Duration, Timers, etc.), network (Wi-Fi, Bluetooth, WAN, LAN, NFC, etc.), location (GPS, Timestamps, Geofencing, Vector, Acceleration, Speed, etc.), affect (NLP, ASR+vocal stress, CV+facial movement, etc.), and many other common hardware sensors (IMUs, Accelerometer, Barometer, Gyroscope, Compass, etc.).

Similar to motion capture, the video output of a physical person moving is mapped to the virtual and augmented avatar system. Objects, background elements and other parts of the avatar system may be included during preparation and the person's potential movements, gestures or other required outputs are mapped to the avatar animations, or animation pieces that will be triggered and interpolated. As the avatar performs actions in the virtual space that correspond to the physical space the appropriate systems are triggered and these events are recorded, stored, and later used as ML training data.

16. Emoji May be Used as an Interface

Emojis are associated with specific expressions such that a user clicks on an emoji which corresponds with a particular facial expression. For example, a particular smiling face may be accompanied with three hearts as manually associated by this emoji.

Figure 25:
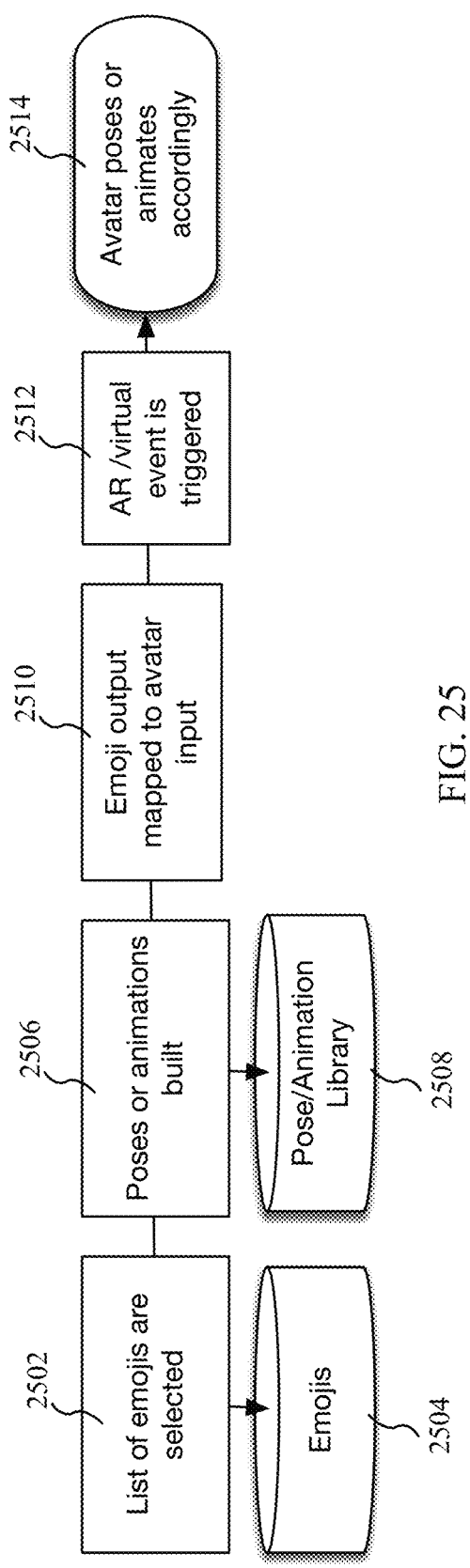
FIG. 25 is a flow diagram illustrating an exemplary method of using an emoji as an interface, according to one embodiment.

FIG. 25 is a flow diagram illustrating an exemplary method of using an emoji as an interface, according to one embodiment. First, a list of emojis is selected 2502 from a library 2504, for example, and a pose or animation is built 2506 for each of the selected emoji 2508 and stored in a library 2510 for example. Next, an emoji output signal of keystroke is mapped to avatar system input 2510 as hotkeys and emoji keystrokes trigger avatar pose or animation 2512 and the avatar poses or animates accordingly 2514.

17. Asynchronous, Local, and Future Interactions May be Accommodated

Additional to the person's avatar, the physical person may stand and interact with the avatar. An avatar may be pinned to a physical location and people, documents, interactions, and other associated data may be tagged in conjunction with it. This coordinate space may be associated with both the owners' avatars and other avatars located in that space as designated by the avatar owner. In the case of 2 or more avatars, a choice of a series of other poses may accommodate both avatars and a second avatar may be added such that the original user. An iconic gesture, such as extended arm, may be used to invite a second avatar into an interaction. A dance move may be associated with a second avatar, handshakes, and other interactions. This may also be offered in virtual space as well as a physical space. An example use case is a famous person allows a fan to pose with them/the other person's avatar may or may not be permanently pinned.)

FIGS. 12A, 12B, and 12C is a flow diagram illustrating an exemplary method of accommodating asynchronous, local, and future interactions, according to one embodiment. As shown, there may be a volumetric face capture of a person 1202 by taking a photograph 1204 using, for example, an IR depth sensor (volumetric) 1206. The ingested data is then submitted to a ML system 1208 where a comparison of differentials and congruencies occurs 1210. The ML system then generates a model that is a close approximation of the photograph 1212 which is used to synthesize avatar geometry 1214. The face type (mezzo, ecto, endo, etc.) and parameters are then estimated 1216 and submitted to the ML system 1218 which replies with corresponding body parameters 1220.

Next, a UUID is assigned to an avatar and the associated user ID is hashed 1222 using the ID, Hierarchical Level of Detail (HLOD), and detailing. This entails merging the face and body under a single hierarchy 1224, registering and assigning a mathematical model (UUID) 1226, generating a 128-bit UUID 1228, assigned the UUID, to an avatar 1230, hashing the UUID with co-reference to a person, and updating the user state and registry 1234.

Next, the scenegraph is edited 1236. In the editing process a determination is made as to which asset is to be edited 1238. If the avatar is to be edited 1240, the avatar assets are presented to a graphical user interface (GUI) 1242, the user selects the feature to edit 1244 and unique combination 1246, the user interpolation parameters are saved 1248 and the user state is updated 1250. If the environments are to be edited 1252, the environment is authored and entered as supply 1252, a 64-bit UUID is generated 1256 and assigned to the environment 1258, the environment is then presented in the GUI, the user selects the environment and assigns to the avatar, and the user state is updated with the 64 and 128-bit UUIDs. If objects are to be edited 1266, object geometry and metadata is authored and entered as supply 1268, the 64-bit UUID is generated 1270 and assigned to an object 1272, the object is presented in a GUI 1274, the user selects the object and object parameters 1276, the selected object geometry is composed into the avatar system 1278, and finally the user state is updated and associated with the 64 and 128-bit UUIDs 1280. Similar to the avatars, environments, and objects, animations and poses may also be edited 1282.

Next, the avatar is exported and placed 1284. To export and place the avatar, the output type of the avatar is determined 1286 as an image 1290, virtual reality 1292, AR/XR 1249, and print, audio, text, or other 1251. If the type is determined to be an image, a determination is made as to whether the device is sufficient to render the image in less than 10 s 1294. If the device is sufficient 1296, steganographic functions, watermarking and whitespace are registered 1298, the system bundles the assets and determines the pipeline and renders the image 1201, the image is then produced 1203, presented for local file management 1205, send to a 3$^{rd}$ party service 1207, and finally the user state is updated 1209. If the device is not sufficient 1211, an API request is rendered and sent to a server 1213, stenographic functions, watermarking and whitespace are registered 1215, the system bundles the assets and determines the pipeline and renders the image 1217, the image is then produced 1219, sent to a 3$^{rd}$ party service 1207, and finally the user state is updated 1209.

If the type is determined to be virtual reality 1292, a determination is made as to whether to export to a 3$^{rd}$ party system 1221. If avatar is not exported to a 3rd party system 1223, local media, sensors and architecture are collected 1225, style filters are presented 1227 and a 3D camera filter is added 1229. If avatar is to be exported to a 3rd party system 1231, the avatar is exported to a supported file format 1233, local media, sensors and architecture are collected 1235, automated preparation testing with new environment variables occurs 1237 and the 3D VR avatar is sent to a 3$^{rd}$ party service 1239. Next, a determination is made as to whether the tasks are complete 1241. If complete 1243, the user state is updated 1209. If not complete 1245, the process begins again 1247 by determining the output type of the avatar 1286.

If the type is determined to be AR/XR 1249, geolocation data is determined 1253, local media, sensors and architecture are collected 1255, the user places the 3D AR avatar at the physical location 1257, and the user adds additional content or avatar data 1259. If the type is determined to be print, audio, text, or other 1251, the data is exported to a supported file format 1261.

As an example of the above, an AR avatar (#1) is placed at a particular place or space either by GPS, geofencing, object reference, fiducial or other method of establishing a fixed, physical location. This file is built to include not only the appearance, animation and other data associated with one avatar, but includes variables for additional avatar systems (which may include objects and architecture). A second avatar (#2) is added to the scene by a second client-side mobile device of AR-capable computing. This second avatar file provides the information of the appearance of the second avatar and the first file provides information on their coordinated actions. The second avatar file is given appropriate permissions to read, write, or execute conditions of the first file to include exceptions and address problems such as occlusion, coincident surfaces, etc. These events are then recorded, stored, and later used as ML training data.

AVATAR.2: Physical and Augmented Realities; Location-Based Association and Interaction with Other Avatars and People.

1. Legal and Financial Representation—Shopkeeper.

The avatar may legally and financially represent the person, owner, or parties in social, economic, professional, educational and legal settings. In the highest implementation of the art, a registered national identity may be associated with an avatar's unique identification number (also registered). A transom is generated to associate these two identifications. As an example, Sarah has both associated and validated her US Driver's License and her US Passport with her avatar identity as she needs the avatar to represent her for a sales transaction. The avatar, similar to a Power of Attorney, also has access to a financial account in Sarah's name. Her avatar, which has been placed in Bleeker Park, is notified of Jojo arriving. Jojo wants to buy a green avatar hat from Sarah's avatar. Sarah's avatar is able to understand, speak, read, write, and agree to the transaction with natural language. Jojo offers Sarah's avatar money which is less than the amount that Sarah has agreed to sell for. Sarah's avatar is able to identify this discrepancy and respond with a newly negotiated number. Once accepted and confirmed by both parties Sarah's avatar finalizes the transaction, Jojo sends the money and Sarah's avatar transfers the data for the hat, closing the deal.

Figure 12:
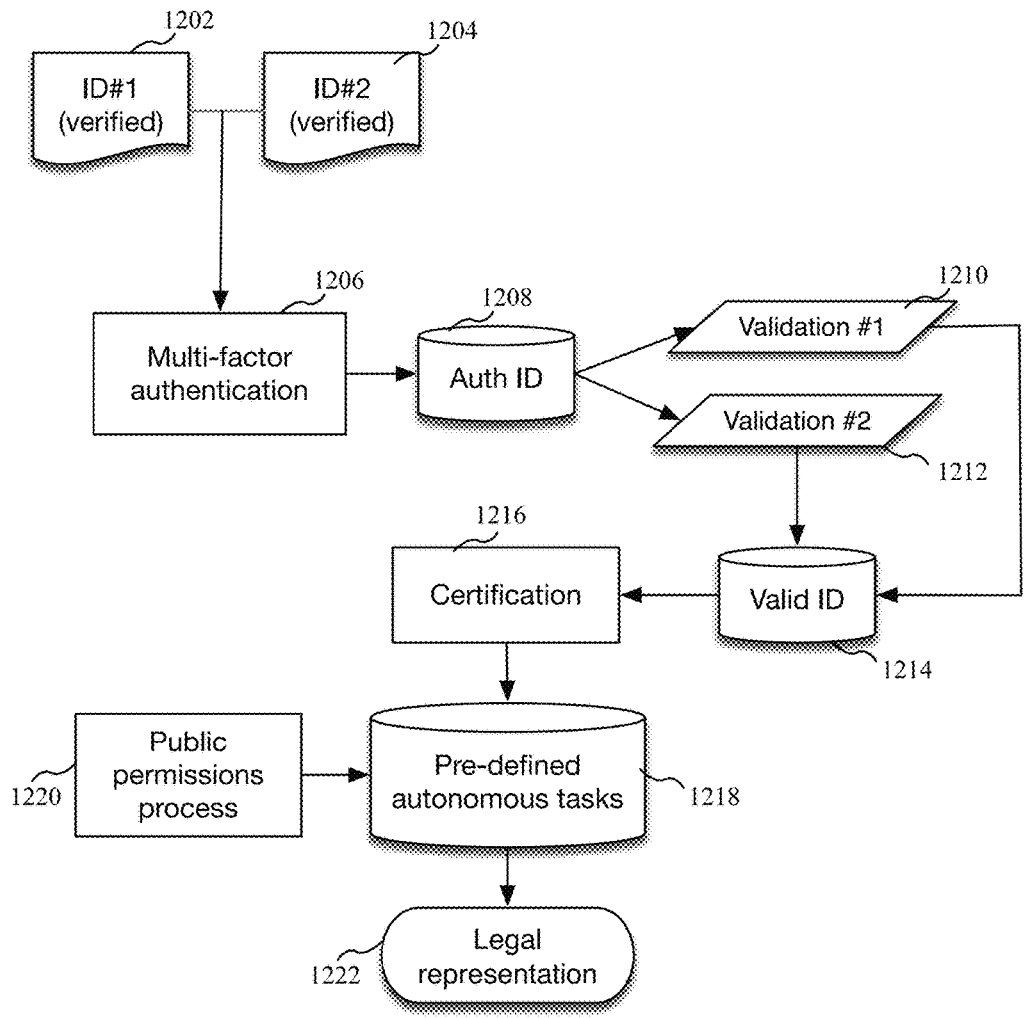
FIG. 12 is a flow diagram illustrating an exemplary method for obtaining legal representation for an avatar, according to one embodiment.

FIG. 12 is a flow diagram illustrating an exemplary method for obtaining legal representation for an avatar, according to one embodiment. For the avatar to represent the person, the person may submit two or more verified identifications 1202, 1204 (state-issues, SSI, etc.). Using the two identification, multi-factor authentication (such as 2 factor authentication) may be used for authenticating the ID 1208. At least 2 other parties 1210, 1212 legally and financially validate the ID 1214, the ID is certified 1216 by an issuing authority. The user's (avatar owner's) pre-defined autonomous tasks 1218 are concatenated, listed and specific orders are noted with sequential tags or other notations such that they may be altered without losing cause-effect threads. These may include complicated behaviors such as natural languages, counting, maths, probabilistic choice outcomes, trading, selling, buying and many other kinds of subject matter to which an expert may have access. These tasks may be separated (a single storage and transfer process), collected (multiple API or server requests), or otherwise accessed. Each task is scripted and prepared for automatic inputs and outputs and average behavior parameters are established using machine learning to improve likely outcomes which may require building custom APIs, middleware, or other interfacing adapters. An autonomous behavior of system is then implemented to perform completion of pre-defined tasks. At this point there is not an explicit visual representation of the system as it is entirely core logic.

Next, permissions are enabled to allow the avatar to perform the task in question 1220. The avatar identity may prove its identity in a Self-Sovereign ID manner and legal representation is granted. This may be allowed if provability is included in the list of available tasks, and if provided account permissions to various social media access are also provided in the admissible tasks. As the avatar successfully performs tasks ranking, evaluation, rating and other means of judging performance are presented back to the user or avatar owner. These events are recorded, stored, and later used as ML training data.

2. Learning by Example Movement—Trained Shopkeeper

An avatar may be trained to mimic the owner or other person by learning their behavior, manner of speaking, moving, gesturing and collect other components of an identity or personality. As the person moves the avatar's animations mimic the movements and appearance of the person, commonly a SME (Subject-Matter Expert). These moves may be recorded and then played back and edited later. Environmental cues or contextual aspects may influence how the avatar learns and subsequently behaves when operating in its target, or final, environment. Some instances where this would be useful are in displaying goods, demonstrations of mechanical repairs, training for dance moves, muscle memory, martial arts, oration, body language and others. Interaction with the trained avatar allows for many dimensional and temporal benefits. Dimensionally, a person may walk around the trained avatar to see a different perspective or may ask the avatar questions, engage in discussion, and answer questions, in essence mapping or recreating many standard human interactions. Temporally, the trained avatar may go backward (rewinding), fast-forward or pause, among other functions. Learning mechanisms are not limited to augmented reality and may include other media types such as text, image, video, songs or music, gesture, natural language (spoken or written), logographic script writing (such as Chinese, Korean, or Japanese). These learning methods may be combined for editing, redundant contextualization, used for contextual reinforcement (and in the case of machine learning, Reinforcement Learning models). Learning methods may also be aggregated and shared among multiple systems similarly to how visual assets (geometric mesh, texture maps, colors, etc.) may be edited, shared, published, and otherwise distributed.

As an example, Sarah has a unique and patented technique for weaving physical hats. This method of weaving defines her hats' styles and, as a piece of intellectual property, she may license the technique and teach people how to perform this task. Jojo, who is interested in having access to this information can sit next to Sarah's AR avatar and, by speaking to the avatar with natural language, learn how to stitch, sew, tie, and generally weave the hat with the same movements of wrist and fingers.

An SME may (but is not necessarily required to) submit two or more verified identifications (state-issues, SSI, etc.), authenticated (2 factor authentication, etc.), validated by at least 2 other parties and, ideally, certified by an issuing authority. The user's (avatar owner's) pre-defined tasks are concatenated, listed, and specific orders are noted with sequential tags or other notations. These tasks may be taught and collected via a broad array of methods such as digital, physical, analog, and other media (books, papers, text, image, video, webpage, broadcasts, etc.), via an observed behavior (language, movement, animation, discussion, demonstration, etc.), via other sensor data (sensors designed to detect light or color, voice or sound, frequency variants, movements or jiggling, air quality, etc.), via data correlations (in which data collected by sensors may be correlated with data fed to the system by video which may correlate to data which the system collected by observed behavior, via success criteria (in which fitness criteria are used as a determining factor for retaining information in a learning system, in which a lack of success is used as a factor for removing information from a learning system, etc.), and via other types of data transfer and informational methods not yet used for knowledge and action transfer, including but not limited to emerging sciences in quantum entanglement and other physics and sciences applicable to information technologies.

Triggers for initiating tasks may be embedded in the tasks themselves or separated by one or more steps to allow for complicated use cases and user paths or to allow for abstraction in the use of application programming interfaces (APIs) and other uses not listed here.

These tasks may include knowledge, functions, or complicated behaviors such as sequential movements, methods of speaking, listening, reading, writing, and other interactions or assignments. Mapping of knowledge, tasks and behavior-influencing information may be abstracted via a token or other semiotic signifier which refers one set of data as a translation or indicator to another kind of data. These tasks may be separated (a single storage and transfer process), collected (multiple API or server requests), or otherwise accessed.

Figure 13:
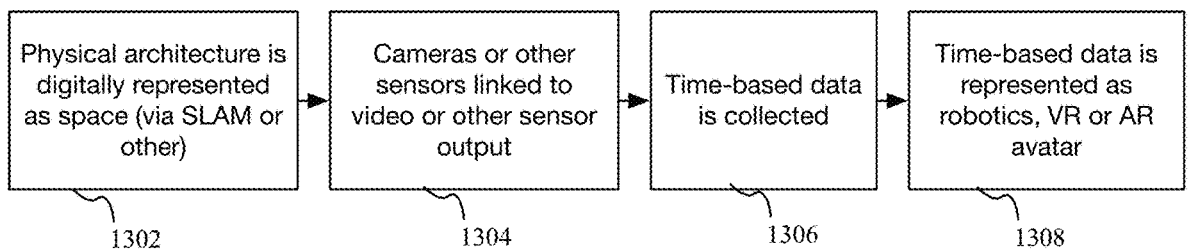
FIG. 13 is a flow diagram illustrating an exemplary method for an avatar learning movement by example, according to one embodiment.

FIG. 13 is a flow diagram illustrating an exemplary method for an avatar learning movement by example, according to one embodiment. First, physical architecture is digitally represented as space (via SLAM or other) 1302. Each task, described above, may be scripted and prepared for automatic inputs and outputs. Average behavior parameters are established via camera and other visual input, audio input, manual editing, and the use of machine learning to improve likely outcomes. Cameras or other sensors are trained to output signal recording the somatic movement of a person (motion capture via CV), collecting trajectories, gait style, intervals, speeds, and other time-based data 1304. Time-based data is collected 1306 and mapped to corresponding components of the avatar (right leg of person is mapped to right leg of avatar, etc.) and integrated as an animation with scrub-deck features/interface to be played after the person's movements are completed. The time-based data is represented as robotics, VR, or AR avatar 1308. These may require building custom APIs, middleware, or other interfacing adapters.

Autonomous behavior of system is implemented to perform completion of pre-defined tasks. At this point there is not an explicit visual representation of the system as it is entirely core logic. Permissions are enabled to allow the avatar to perform the task in question. The avatar identity may prove its identity in a Self-Sovereign ID manner. This may be allowed if provability is included in the list of available tasks, and if provided account permissions to various social media access are also provided in the admissible tasks. As the avatar successfully performs tasks ranking, evaluation, rating and other means of judging performance are presented back to the user or avatar owner. These events are recorded, stored, and later used as ML training data.

3. Persistent Physical Space+AR Placement

A person may place an AR avatar (or object or architecture) in a persistent physical space such that another person walking by that same location is able to view and interact with the avatar (or object or architecture) formerly placed in that physical location. The person walking by may be invited to take a picture with the avatar, among other examples. The first avatar may also invite the second avatar to a more complicated interaction such as posing for an avatar-avatar selfie, dancing or engaging in a conversation.

As an example, Sarah, in walking through Bleeker Station, sees Jojo's avatar, via Augmented Reality, frozen in a dancing position; chin in the air, one arm up, stepping forward. Sarah learns that the placement of the avatar in that location is an invitation for her avatar to dance so Sarah places her avatar in the same physical space and a user interface appears between the two avatars, confirming that Sarah would like to have her avatar dance with Jojo's. Accepting the invitation virtual lights appear, music plays and the two avatars are animated accordingly, dancing the waltz together. Others may or may not see and/or hear the avatar, both avatars, and the interaction.

FIG. 14 is a flow diagram illustrating an exemplary method for placing an avatar in a physical space, according to one embodiment. First, the owner of an AR avatar (Client #1) may place the avatar at a particular place or space either by GPS, geofencing, object reference, fiducial or other method of establishing a fixed, physical location 1402. A subsequent file or entry is then locally written. This file includes references to the physical location 1404 and avatar location 1406, among other variables. Representation may then be updated 1407 and Client #2 receive representation. The physical location reference is delivered to a networked server which distributes this geographic information to other AR-capable clients. Next, the data is prepared for training. A second AR avatar owner (Client #2) may then receive a notification 1408 and directions to the location of avatar #1 1410. When arriving at this location the appearance and behavior, as well as other variables, are presented to the software client of AR avatar owner #2 1412. Knowledge base preparation is implemented such that the tasks that are interactive, such as dancing, are shared from the inviting avatar to the invited avatar. The above methods may be used for various types of interaction, both with the appearance of physical or virtual. The events are then recorded, stored, and later used as ML training data.

4. Data May be Collected Via Physical Sensors Associated with the AR Avatar

Either located in physical space or virtual space, avatars may be associated with input devices (such as a camera and microphone) that are oriented to pick up and interact with contextually relevant information (such as the face and voice of a person speaking to the AR avatar). In the case of virtual placement, this same idea may be applied with associated input devices and accompanying software, network, and infrastructure. The image is analyzed for properties (such as image recognition, light types, directions, colors, etc.). Sound properties are then analyzed (such as type of sound via sound recognition, volumes, effects, etc.). Other analyses may include other sensors including, but not limited to, light (CV, Radar, Lidar, IR, etc.), sound (Speech recognition, sound detection, etc.), biometrics (Fingerprint, Face, Voice, etc.), air (Quality, Weather, Temperature, Humidity, Barometric pressure, etc.), time (Local, Deltas, Duration, Timers, etc.), network (Wi-Fi, Bluetooth, WAN, LAN, NFC, etc.), location (GPS, Timestamps, Geofencing, Vector, Acceleration, Speed, etc.), personal emotional detection and affect (NLP, ASR+vocal stress, CV+facial movement, etc.), and many other common hardware sensors (IMUs, Accelerometer, Barometer, Gyroscope, Compass, etc.), and others.

As an example, Sarah and Jojo are having a meeting, in real-time, but far away from each other, using their avatars. The avatars are moving in real-time, as the owners are moving, matching arm movements, ordinate, and cardinal orientation, etc. Sarah is sitting outside on a park bench; next to her are three shirts she bought that afternoon. Jojo is sitting in her bedroom, a single light that hangs above her desk. As Sarah and Jojo often do, they are discussing fashion and comparing knowledge and examples. Sarah's avatar is relit to indicate the local lighting of Jojo's room and Jojo's avatar is relit, so it appears outside (using relighting methods for those familiar with the art). The sounds of birds accompany Sarah's avatar. Sarah says "Oh, I just bought some really cool shirts today, let me show them to you." She (and her avatar) reach into a bag, remove a shirt and hold it up for Sarah to see. A virtual version of this object may be generated, and a virtual version of the garment passed, in real-time, to Sarah's avatar.

FIG. 16 is a flow diagram illustrating an exemplary method for collecting data via physical sensors associated with the AR avatar, according to one embodiment. First, the user is asked to rotate and take a 360° video of the surrounding area (or provide other additional sensor such as 3rd party camera, microphone, etc.) 1602. From the video, the environment is analyzed 1604. Additionally, the image is analyzed for light, depth, and dimension properties (types, directions, colors, etc.) and sound properties are analyzed (type, volumes, affects, etc.). Mapping may also be used to locate the device within a physical or virtual map where resident sensors determine, via correlation and specific locations (sensors used may include, but are not limited to Built-in GPS/GNSS, compass, Wi-Fi, Bluetooth, iBeacon micro location, proximity, and others). Alternatively, physical, or virtual architecture is mapped out via SLAMs or other means of generating a spatial representation. Other analyses may include other sensors (barometer, thermometer, ambient light sensor, timing devices, etc.)

Next, the analyzed data is contextualized 1606. The data set is prepared for training 1608. A library of examples is trained such that sensors may collect the relevant data and stimulate a response, interaction, or act as pre-scripted in the computing system. Likewise, if not pre-scripted, this response may be otherwise derived from a separate ML system and the response selected automatically. Fitness criteria 1610 may be used for clustering/calculating vectors 1612. Association link dependencies 1614 are determined as swell as dimension reduction generalization 1616. Data effects (images, sounds, light sources, shadows, etc.) may then be inserted into appropriate part of AR scenegraph 1618. These events are recorded, stored, and later used as ML training data.

5. Physical Effects Represented in the Virtual System.

Collecting physical data and presenting it in the virtual version of association would allow an avatar to become an asset in which the background or other associated data would be inferred as separate from the avatar but linked to the avatar such as background, time of day and ambient light, street activity, weather, and other variables. While environments may be authored in virtual, 3D formats and used to surround avatars, this method allows the physical space to serve as the environment. In this instance, an avatar is inserted in changing background, or changing background is presented behind the avatar (so too with objects and architecture, environment, etc.). These objects or images may be photographed and may be extrapolated to a model then automatically rendered within the scene. Another instance would be a change in the lighting on the avatar's face if the time of day or position of the sun were to change. As well as specularity, shadows and direct effects other elements may be included such as reflections of other objects in the physical space. Sounds, such as echos, reverbs, and other effects may be represented as well as other included secondary effects such as replies to a song, words spoken, or actions to real-world events such as clapping in applause, bowing or other action the avatar may carry out.

As an example, Jojo would like to send Sarah a happy birthday message and happens to be at Ocean Beach on Long Island, watching the sun set. Jojo initiates a function in the app that includes environmental representation and records her message, singing Happy Birthday. When Sarah receives the message Sarah sees not only Jojo's avatar singing the song, sun light illuminating the side of the face but behind the avatar is a photo of the beach, water, and framing environment that was around Jojo when the message was recorded. The sand and water, modeled mesh, is animated, and renders the reflective properties of the ocean and sky.

Figure 17:
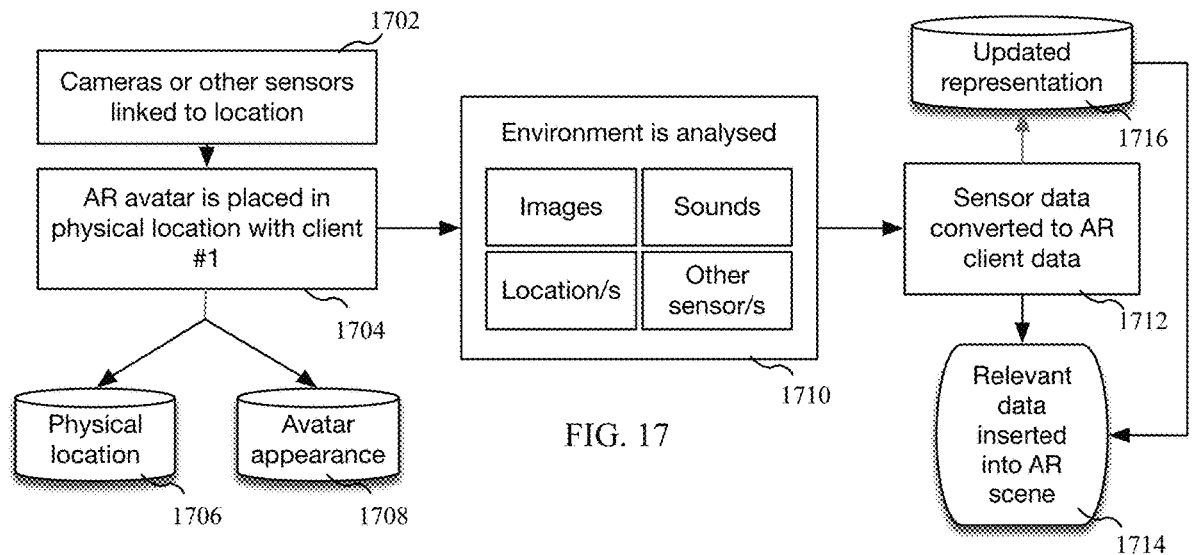
FIG. 17 is a flow diagram illustrating an exemplary method for representing physical effects in a virtual system, according to one embodiment.

FIG. 17 is a flow diagram illustrating an exemplary method for representing physical effects in a virtual system, according to one embodiment. Cameras or other sensors are linked to a physical location 1702 as well as server data that manages AR avatar scene data for system clients. The avatar is placed in a physical location 1704 and the physical location 1706 is mapped and recorded along with the avatar system appearance 1708 and then the environment is analyzed 1710. The image is analyzed for light, depth, and dimension properties (types, directions, colors, etc.). The sound properties are also analyzed (type, volumes, affects, etc.). Mapping may also be used to locate the device within a physical or virtual map. Resident sensors determine, via correlation, specific locations (sensors used may include, but are not limited to Built-in GPS/GNSS, compass, Wi-Fi, Bluetooth, iBeacon micro location, proximity, and others). Alternatively, physical, or virtual architecture is mapped out via SLAMs or other means of generating a spatial representation. Object recognition models are applied for any data that is not already categorized and objects and other elements to be modeled may be converted to a 3D mesh and applied to the overall scenegraph. Other analyses may include other sensors (barometer, thermometer, ambient light sensor, timing devices, etc.)

Sensor data may then be converted to AR client data 1712 to support updated representation of avatar system which is applicable to AR, VR, print and other output and placement. Relevant data may then be inserted into AR scene 1714. These events are recorded, stored, and later used as ML training data. Avatar representation is also updated.

6. Virtual Effects Represented in the Physical Environment.

Exported systems, such as game environments or interactive VR, AR and other virtual environments that are not physically geo-cached may influence and trigger physical systems around them. As an example, Jojo wants to present a special video to Sarah via AR avatar. Jojo prepares the video and allows permissions to their smart office settings that are related to geofenced and time-based properties. When Sarah receives a DM it reads, "Hey Sarah! I'm here, follow me." Sarah opens her app and sees Jojo's AR avatar standing in front of her. The avatar points down the hallway towards the conference room and the avatar begins to play a walk-cycle in that specific direction. Sarah follows the avatar and as the avatar comes to the automatic door to the conference room the door slides open, the lights dim, and the avatar turns to face Sarah. "Here's some ideas for this presentation, check it out," at which point Jojo's avatar turns, waves at the monitor behind her and the monitor turns on and starts to play the video. When the video is done Jojo's avatar says, "Get back to me with what you think, okay?" and the avatar disappears, the monitor turns off and the lights return to default brightness.

Figure 18:
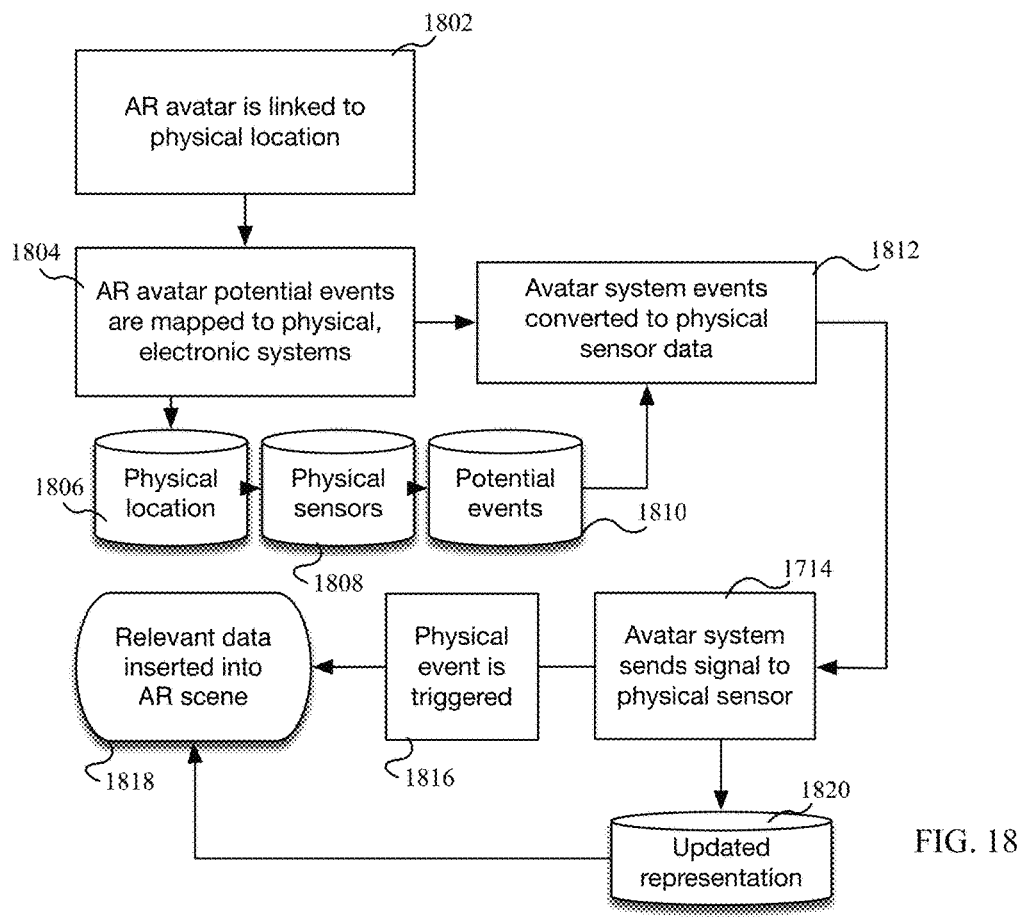
FIG. 18 is a flow diagram illustrating an exemplary method for virtual effects represented in a physical system, according to one embodiment.

FIG. 18 is a flow diagram illustrating an exemplary method for virtual effects represented in a physical system, according to one embodiment. With regard to virtual effects represented in the physical environment, the AR avatar system is associated to a physical location 1802 with networked features. Input from the AR avatar system, such as physical location data 1804, physical sensor data 1806, and potential events 1810, may provide output to the physical environment and vice-versa. The avatar system events are then converted to physical sensor data 1812 and the avatar system sends signals to physical sensors 1814. Specific features and functionality are delineated (such as on a map) and state or behavioral changes are determined for respective input and output. State and behavioral changes are then assigned triggers (such as the avatar being within a predefined range) the physical as well as server data that manages AR avatar scene data for the automated system clients the avatar will trigger. The AR avatar's potential locations, gestures or other required outputs are mapped to the physical system/s that may be triggered. As the avatar performs actions in the virtual space that correspond to the physical space the appropriate systems are triggered 1816 and the relevant data is inserted into the AR scene 1818. These events are recorded, stored, and later used as ML training data and representation of the avatar is updated 1820.

7. Virtual Presence.

With the appropriate floorplans, avatars may operate within physical architecture. An AR avatar make real-time appearances in a physical location such that an avatar may accompany a person. An avatar may represent an owner in a direct sense such that a virtual architecture may be the proportional equivalent of a physical architecture and the avatar moves in real-time within that architecture at the same time that the owner moves within the physical architecture. Useful for performative arts, lectures, demonstrations, and other real-time presentations in architectural, physical space. As an example, Jojo oversees security at a factory. There are 3 guards that work throughout both the day and night. Jojo has implemented an AR avatar system to help the security guards on-duty. The AR avatar, whenever one of the guards approaches, is prepared with a report of the last 24 hours. The avatar is always at that location yet is updated with new (24 hours' new) information.

FIG. 15 is a flow diagram illustrating an exemplary method for associating an avatar to a physical location (virtual presence), according to one embodiment. With regard to virtual presence, the AR avatar system is associated to a physical location with networked features such that input from the AR avatar system may provide output to the physical environment and vice-versa. The physical architecture is digitally represented as space (via SLAM or other) 1502. Specific features and functionality are delineated (such as on a map) and state or behavioral changes are determined for respective input and output. State and behavioral changes are assigned triggers (such as the avatar being within a predefined range) the physical as well as server data that manages AR avatar scene data for the automated system clients the avatar will trigger. The AR avatar's potential locations, gestures or other required outputs are mapped to the physical system/s that may be triggered 1504. As the avatar performs actions in the virtual space that correspond to the physical space the appropriate systems are triggered and the avatar animations in virtual space updates the avatar location in virtual space 1506. These events are recorded, stored, and later used as ML training data. The updated representation is shown via an AR system client 1508.

8. Automation of Location-Based Interactions.

An AR avatar may respond contextually and affectively to a person in physical space. Contextual interaction between a location-persistent avatar and a user-controlled avatar may be automatically enabled by a collection of concurrent or correlated data from multiple sensors. This contextual interaction may be reflective of common human interactions and may be fine-tuned to an individual based on collected and derived data of the individual. The system may be available for art, media education, healthcare, providing examples of virtual goods and services for sale, providing information on places to travel and visit, therapy and personal information, interactions both relevant to the specific location and person when preferred as well as others not listed here.

The AR avatar system may be associated to a physical location with networked features such that input from the physical environment may provide output to the AR avatar system and vice-versa. Specific features and functionality may be delineated, and state or behavioral changes are determined for respective input and output. People's identities may be registered and recalled with improved contextual references and conversational topics across a range of both automatically generated and pre-scripted subjects may be engaged. In addition, as people's identities are stored and recalled the shared past conversations may be used to improve contextual relations.

An ability to maintain a contextual atmosphere by altering or including media components: appearance, sounds, timing, and narrative. About appearance, a change in appearance and accessories such as clothing, objects, decor, or virtual background so as to maintain a visual context. About sound, a change in tone, sounds, pitch, frequency, music and other auditory cues to maintain an auditory context. About timing, a change in speed of movement, coordination of gestures and words, and other concerted or orchestrated elements to maintain a rhythmic context. About narrative, a change in total scale of scene or switching cameras (whip-pans, cuts and other directorial content) to maintain a cinematic context.

State and behavioral changes are assigned triggers (such as the avatar being within a predefined range) the physical as well as server data that manages AR avatar scene data for the automated system clients the avatar will trigger. The AR avatar's potential locations, gestures or other required outputs are mapped to the physical system/s that may be triggered. As the avatar performs actions in the virtual space that correspond to the physical space the appropriate systems are triggered. These events are recorded, stored, and later used as ML training data.

AVATAR.3: Autonomy, Recording, Mirroring, and Predicting

1. Operate Software Autonomously.

An avatar may operate 3rd-party software on behalf of the owner or human operator. The system may be equipped with various extensions to provide intelligence and the ability to operate 3rd-party software, technologies, and interfaces to digital or electronic systems. Many of these interactions may include natural language, common and repetitive actions on behalf of the person, and decision-making that would commonly require a person. Autonomous interaction on behalf of the person may conduct limited steps such as a telephone answering machine might today. These would include pre-scripted steps some of which may be inferred.

As an example, Colin works as a docent, or tour guide, in a museum. The museum offers guided AR tours that complement the displays with added information. Visitors use a mobile device, such as a tablet, for additional information on the displays (both locally and remotely). Colin would like to build an AR avatar that does his job when he is not available. Most of his work involves talking with people; however, he also needs to answer some emails, hold video conferences, send DMs, and check an app every hour to monitor gift shop inventory and sales transactions. Colin connects his avatar to an autonomous functionality provided in the app. This GUI provides a series of options which he selects and may later edit and improve. He associates his email account, his video conferencing software, his DMs (or the various apps he uses to send and receive DMs) and other software permissions. Finally, so that he can check the museum's gift shop inventory, he associates the sales and inventory management system via a software layer (such as API middleware) that manages API endpoints and access permissions. That night, while he is home after work, his avatar replies to his emails on his behalf, signed as him, similar to an email vacation messaging system. On an hourly basis, the gift shop inventory systems are checked, sales transactions are analyzed and sales or inventory incongruencies are reported as necessary. In the morning, when Colin arrives late, he's glad to check an activity log and see that his avatar has managed the conversations with early visitors. The physical visitors were able to talk naturally with Colin's avatar via the museum's existing AR output methods. The virtual visitors that had questions via video conferencing calls were also replied to, coincidentally at the same time, as were those that visited the museum via the provided AR interfaces. All sales transactions are verified against the inventory with a single redundancy flagged for Colin's later review. In this example API endpoints that are exposed may include cloud services such as Speech-to-Text (STT), Text-to-Speech (TTS), Natural Language Processing (NLP), decision trees from conversational logic and conversation flows (Bot Flows), pre-populated instructions, required assets, phoneme animations, viseme animations and other data that facilitate the avatar's responses.

FIG. 21 is a flow diagram illustrating an exemplary method of an avatar operating 3rd-party software on behalf of the owner or human operator, according to one embodiment. To operate the software autonomously, an avatar system (System #1) is connected to a second networked computer system (an API middleware layer, gateway, or system of APIs capable of performing the required tasks) which is also connected to a third-party software system (System #3) supporting only interactions with the API operational layer (System #2) 2102. The avatar owner, avatar systems administrator, or other person populates a list of actions or services which define an input, a triggered variable or other data that may accompany the response, and an output. That is, mapping of a potential user to avatar functions occurs 2104. A variable may be defined, and definitions of a variable could include the time of an output, the location of an output, a manner of delivering the input or output or many other variables that are defined by the content, assets, methods of interaction. Shortcuts and tokenized references may be included to simplify authoring and overall task completion by both the avatar and the person or people involved in constructing the services. The variables and other references may be updated, automatically or otherwise, according to API specifications.

The avatar system (System #1) sends data to the API Gateway (System #2) 2106 and input events from the avatar system (System #1) are converted to the functional requirements for the API Gateway (System #2) 2108. During the public permissions process 2109, the data of both systems and potential events may be stored for later creation, editing, improvement and reference 2110-2116. The data is used for pre-defined tasks 2118 and updated representation 2120. The API call or request (from System #2) is sent to the third-party service (System #3) and the response from the third-party service (System #3) is delivered to the gateway or API layer (System #2) which then continues the interaction, delivering data to the avatar system (System #1). Variables or other data that are concatenated or otherwise combined with the output are applied. This may include simple associations, such as a flag in a simple single-digit response or complicated associations such as accented inflections and iconic gestures embedded within natural language vollies and the avatar system (System #1) delivers the output as previously defined and the avatar may operate remote System #2 2122

2. Historic Doppelgänger.

Avatars may operate as historic doppelgängers to record data. In this instance, a person wears appropriate sensors, fiducial markers, or other mechanisms which may collect and store data. As the physical person moves, the avatar's movements are recorded such that data may be associated and later compared for analysis. The person may talk, pick up objects and otherwise interact in both physical and virtual space. The avatar may collect this information as a recording and replay mechanism for later data integration, review, analysis, machine learning applications, and other uses.

FIG. 22 is a flow diagram illustrating an exemplary method of an avatar operating as a historic doppelganger to record data, according to one embodiment. The AR avatar system may be associated with a person or persons in a specific physical location with networked features such that input from sensors such as cameras, lidar, or other data including but not limited to sound recordings may provide input to the avatar system/virtual environment 2202. These sensors, such as cameras or microphones, are trained to collect data that records the behavior and movement of a person or persons. The cameras/other sensors output converted data which is linked to the avatar system 2204. Other entities such as animals, robots, or moving objects may be included. This amounts to a motion capture via CV, fiducials, collecting trajectories, gait style, intervals, speeds, and any other time-based data which is sensed or otherwise collected. The time-based data is recorded 2206, and the time-based data is represented as a time-based avatar 2208. Correlational data may then be determined and prioritized, specifically for later, base-truth ML training methods. Specific features and functionality are delineated (such as identifying hotspots on a map) and state or behavioral changes are determined for respective input (recording) and output (playback). State and behavioral changes are assigned as triggers (such as the person walking within a predefined area triggers a recording of the image or a transcription of the voice). As the person performs actions in the physical space that correspond to the virtual space the appropriate systems are triggered. The physical person's movements, locations, gestures, movements, or other information is mapped to the virtual system/s that may be shown as a virtual, or AR, equivalent. Later editing is facilitated such that collected animations, sounds, and other data may be presented via a user interface with scrub-deck features/interface which may be played, altered, and stored after the person's movements are completed. These events are recorded, stored, and later used as ML training data.

3. Realtime Doppelgänger.

Avatars may operate as real-time doppelgängers to interact and collect data. In the best implementation of this method, a user (Person A) may puppet an avatar, via augmented reality, from one physical location (the Projected Location) to a separate physical location (the Target Location). This puppeting may include, but is not limited to, speaking, moving, and interacting with objects, environments, and other people or entities. Most commonly, the Projected Location and the Target Location will be different physical locations (but in virtual implementations both the projected and target location may be the same location). In an exemplary implementation, the information collected from Person A would require little more than simple visual input (such as a video camera) and audio input (such as a microphone). In a less excellent implementation, Person A may wear a suit of motion-capture sensors, fiducial markers, microphones, light detection systems, LIDAR input devices, depth perception sensors, or other mechanisms with which AR may interoperate. In a similar manner, the physical architecture or nearby physical objects may be included in this process of mapping physical and virtual data. Similarly, the collected data may be represented via the networked avatar systems to the other location. Person A may also interact with other people who are reciprocally broadcasting, or puppeting, in the opposite direction via this method (allowing for such things as real-time conversations).

As an example, Colin works in an Amsterdam Museum as a docent, and he will be giving an XR tour with some visitors coming from Amsterdam, the partner museum in Madrid and also some students from a school in New York. Since Colin's app is already connected to the needed audio and video sensors (which are part of his phone), he activates the appropriate function (such as "Realtime doppelganger" or other) and looks through the virtual window into a room where he sees the two Amsterdam visitors already standing in front of him Additionally, behind them he sees two other groups, waiting for him to lead them on his tour. Beyond the two physical visitors in Amsterdam, he sees the avatars of three people in Madrid and behind them, in a slightly different presentation, he sees the four students from New York. While Colin can see a difference in the avatars from Madrid and New York, totaling seven, such differences are not clear to the visitors themselves. In New York the students can see Colin as his avatar and meanwhile the avatars of the people from Madrid may be from three different locations (or IP locations, ports, streams, or other connection methods). Colin says "Hello." The audio data (which may be altered in real-time) is sent to his AR avatar, the avatar says "Hello," and the tour begins. Colin may own this data and the Museum may have rights to use. Just as a DJ might mix tracks, starting and stopping loops with a software interface, Colin is able to control his avatar's behavior for interspersed periods of time which he is able to control. He starts a walking loop and is able to guide his avatar as it walks through the sister museum in Madrid, at the Target Location. Mixing in an iconic gesture his avatar throws a thumbs up to the people following. As soon as that ends, Colin mixes in another iconic gesture, and his avatar, from the view of the people following, turns around, stops, and looks at the people following him. Colin turns his head, and his avatar does the same. The avatar is driven, like a car, in which some components are autonomous, and others are immediately tied to his physical input. As Colin raises his chin and smiles (making his AR avatar in the Madrid Target Location also raise its chin and smile), an avatar from the students in New York also gives Colin a thumbs-up from over the heads of the avatars in front of him because, just as the visitors in Madrid see Colin's avatar, the experience is the same for those in New York.

FIG. 23 is a flow diagram illustrating an exemplary method of an avatar operating as real-time doppelgängers, according to one embodiment. With real-time doppelgängers, environment or other relevant data is mapped and used to represent in real-time equivalent digital representation. That is, the environment is digitally represented as space via SLAM, for example 2302. In an exemplary implementation, two identical architectural layouts would be used to show the real-time interactions. The AR avatar system is associated to a person or persons in a specific physical location with networked features such that input from sensors such as cameras, lidar or other data including but not limited to sound recordings may provide input to the avatar system/ virtual environment. These sensors, such as cameras or microphones, are trained to collect data that records the behavior and movement of a person or persons. The cameras/other sensors convert the collect data and link the converted data to the avatar system 2304. Other entities such as animals, robots, or moving objects may be included. This amounts to a motion capture via CV, fiducials, collecting trajectories, gait style, intervals, speeds, and any other time-based data which is sensed or otherwise collected.

Figure 20:
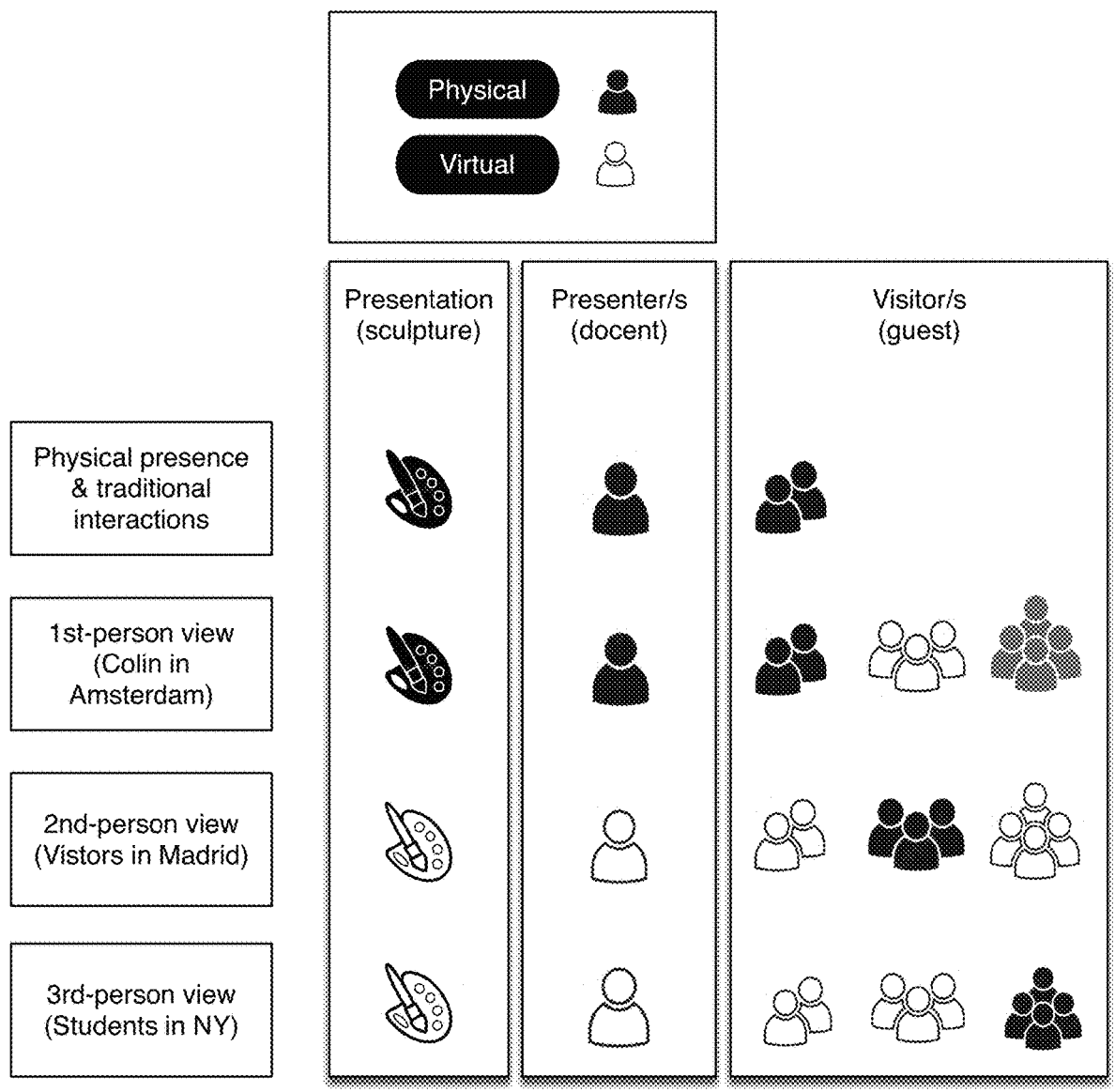
FIG. 20 illustrates an example of a real time doppelganger, according to one embodiment.

Correlational data is determined and prioritized, specifically for later, base-truth ML training methods. Specific features and functionality are delineated (such as identifying hotspots on a map) and state or behavioral changes are determined for respective input (recording) and output (playback). State and behavioral changes are assigned as triggers (such as the person walking within a predefined area triggers a recording of the image or a transcription of the voice). As the person performs actions in the physical space that correspond to the virtual space the appropriate systems are triggered. The physical person's movements, locations, gestures, movements, or other information is mapped to the virtual system/s that may be shown as a virtual, or AR, equivalent Immediate playback is facilitated by the transmittal of the collected data and subsequent interpretation, animation, and presentation on a system capable of relaying the data in real-time 2306. The time-based data may be represented as a real-time avatar 2308. A terminal, with a screen which is connected to the internet, for example. Similar to live event broadcast today on television or radio, a delayed editing of a matter of seconds may be enabled. This function would be facilitated such that collected animations, sounds and other data may be presented via a user interface with scrub-deck features/interface which may be played, altered, and stored after the person's movements are completed. These events are recorded, stored, and later used as ML training data. FIG. 20 illustrates an example of a real time doppelganger, according to one embodiment.

4. Future Doppelgängers.

Avatars may operate as future doppelgängers to collect data and build predictive models of users. This may also include multiple people or entities, objects and other items of interaction or time. As an example, for over five years, Colin has worked in Amsterdam as a museum docent. With so much practice, he often gives repetitive tours which means his actions this week will probably be much the same as those of next week. His avatar system records his activities and often helps him (as noted above, Realtime doppelgängers). Colin can use this to his advantage not only for his autonomous avatar but to build avatar data he can share with other museum workers that have noted his graceful gestures and well-timed presentations. Colin is a shining example and embodiment of the ideal docent. He is able to present in multiple languages, dress in immaculate fashion, answer questions with the grace, refinement and ideal articulation of the very best of docents in the industry. The museum he works for has noted his extraordinary abilities and has been able, with Colin's permission, to license his very behavior. Of course, Colin is able to benefit from this arrangement and he receives royalties when the models of his behavior are used for future benefits of the museum, partner museums, and even the other docents that rely on this modeled data.

As another example, since Colin's avatar system app has already collected the needed data for predicting his most likely behavior, he activates the appropriate function (such as "Future Doppelganger" or other). All of Colin's past tours have been collected and analyzed, so this data includes the location of the tour in the museum architecture, proximity to objects being presented, speed of his walking, angles of his looking, amplitudes and speeds of his gestures, words he has spoken, manners of speaking, traits, peculiarities, and other measurable information which Colin contributed via his normal and natural behaviors. Colin may own this data and the Museum may have rights to use. This may apply to the creation of new avatars that might be just as good as Colin's own efforts. A "Future Doppelganger" is generated, and Colin is able to determine which parts of the system he wishes to exchange, sell or trade. The museum has a fashion and social channel which also may be used for distribution of these assets.

FIG. 14 is a flow diagram illustrating an exemplary method of an avatar operating as a future doppelganger, according to one embodiment. When operating avatars as future doppelgängers, environment or other relevant data is mapped and used to record equivalent digital representation. That is, the environment is digitally represented as space via SLAM, for example 1402. Sensors, such as cameras or microphones, are trained to output a signal that records the behavior and movement of a person. The cameras/other sensors convert the collect data and link the converted data to the avatar system 1404. This amounts to a motion capture via CV, collecting trajectories, gait style, intervals, speeds, and any other time-based data which is sensed. The time-based data is recorded 1406. Collected data is mapped to corresponding components of the avatar (right leg of person is mapped to right leg of avatar, etc.) and integrated as an animation with scrub-deck or HUD features/interface to be played after the person's movements are completed. Behavioral patterns and interaction patterns are identified, and future behavior is predicted 1408 and mapped to training data so that an ML system may build a model and future behavior may be predicted. The time-based data may be represented as a real-time avatar 1410.

Exchanges and Economies

People, avatars, groups, parties, companies, and other entities may establish an economy by which goods are traded, sold, and licensed as only three examples of many economic and trade-based interactions. These economic exchanges may be managed automatically or manually. Participating entities may include operations that are individual-to-individual, individual-to-group, group-to-group. Time, moments, and occasions may include synchronous (operations happening immediately, in real-time) and asynchronous (operations happening with a period of delay between interactions of exchange). Predictive models, based on both past behavior and machine learning mechanisms may influence the economic and pecuniary interactions as well as their subsequent models of communication, such as interfaces and exchange records.

ECON.1: Buying and Selling

Multiple parties may work together to establish economic models within which services and goods are traded, sold, licensed and otherwise exchanged. These may include many models of economic interactions including, but not limited to, the exchange of data, service or good for a representation of value.

The data, service or good may include, but is not limited to, avatars, avatar assets, objects, environments, functionality, or other associated information that is visible, auditory, functional or otherwise relevant to avatar behavior and interactions in both solo and social uses and those not listed here. Services and goods may likewise include the efforts, means, services and goods similarly associated with avatars, objects, environment and associated functions and behaviors.

The value may include but is not limited to fiat currencies (dollars, euros, rupees, and others), cryptocurrencies (Bitcoin, Ethereum and other cryptocurrencies), credits, points demarcations of exchange that are divisible, sub divisible, fungible, sharded and otherwise applicable to digital transactions. Physical value may be included such that direct trade for real world goods and services, or objects of value (gold, silver and precious metals or jewelry or other items.

1. Trade Agreements.

Figure 26:
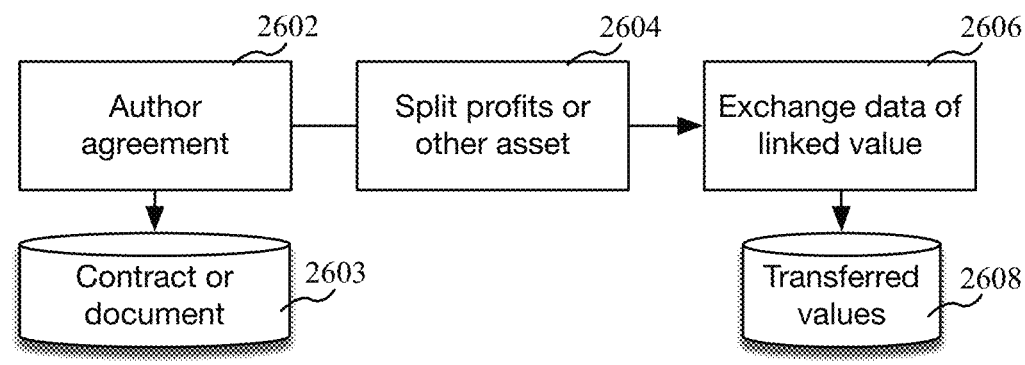
FIG. 26 is a flow diagram illustrating an exemplary method of using trade agreements, according to one embodiment.

FIG. 26 is a flow diagram illustrating an exemplary method of using trade agreements, according to one embodiment. Trade agreements may be developed in advance, in real time or based on past interactions. This includes an agreement that is authored 2602 to create, trade, license and buy virtual goods. The agreement may be a contract or other document 2603. A profit split 2604 with the brand, cabal, group or individual creator/s; and an exchange of data 2606 comprising of measurements and statistics of brand recognition, impressions, trends, costs, associated perceptions, and social acceptance. Once there is an exchange of data of linked value, the values are transferred 2608.

2. Economic Motivators May be Analyzed.

Figure 27:
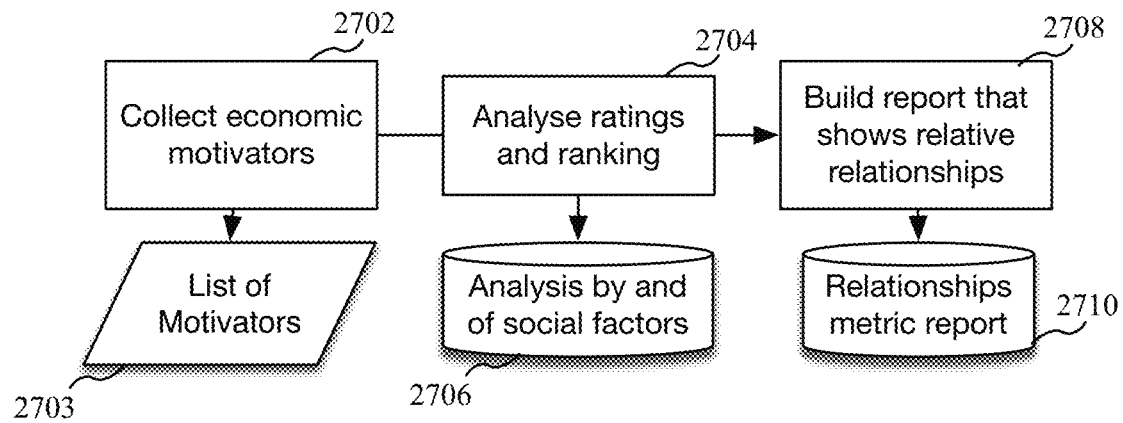
FIG. 27 is a flow diagram illustrating an exemplary method of analyzing economic motivators, according to one embodiment.

FIG. 27 is a flow diagram illustrating an exemplary method of analyzing economic motivators, according to one embodiment. First, economic motivators, such as an influence of a sale, celebrities or otherwise known individuals promoting the physical form of the virtual good are collected 2702 from a list of motivators 2703. The economic motivators are then analyzed, taken in form of ratings and rankings 2704. The analysis is by and of social factors 2706. The analysis informs clients (virtual goods providers) of their influence, place, or relationship to modern culture within context of a digital space inherently connected by social pretenses. Next, a report 2708 is created that allows action where the virtual goods will be a linked to other parties, in which a relationship similar to client and retailer is formed but extending into consensual user metric observation and remaining in a digital space 2710.

3. Economic Interactions May be Analyzed.

Collect economic interactions, such as the relationship of virtual goods with the virtual avatar's photo and daily wear actions, the combinations of different clothing brands, frequency, or photo setting. Analyze them using algorithms to predict fashion trends, looking at permutations of brand pairings, the photo context (i.e., happy, sad, meme, serious). Next, a report that allows action and informs the demand of physical goods based on virtual good's sales and relationship to users, other brands, and context is created.

4. Multiple Currencies May Interoperate

National, government-issued, fiat currencies (such as the Euro, Rupee, Dollar, etc.) Currencies will be used when the user purchases digital goods or services. Digital goods or services will not be promises or legally tied to their representation of real life, physical goods. Digital goods or services will be purchased for the sole use of the avatar in the virtual and augmented reality world.

5. Centralized or Privately Issued Cryptographic Currencies

Centralized or privately issued cryptographic currencies may be issued by the administrators of the economy (such as monetary value or other asset such as those used in games and shared virtual worlds). A stand-in (or representative issuance) to currencies mentioned above may be a reward, special event token, or substitute to be traded for only virtual goods or services within the mobile application. The stand-in currency will not convert to other forms of currencies. The stand-in currency can equate to or replace other forms of currencies but is not the equivalent of user compensation or reimbursement.

6. A Publicly Issued Cryptocurrency

A publicly issued cryptocurrency may be represented as the currency for AR/XR avatars in a fashion-based application (such as Ethereum and ERC20 issuances). An economic model of the cryptocurrency is drafted and distributed to enumerate value for stakeholders. This includes governance, token structure, fungibility, capped or uncapped features, distribution plans and other elements. The currency will be privatized and cryptographically encoded to prevent replication, theft, or other digital trickery. The currency is issued to a publicly declared set of stakeholders to encourage participation and initiate circulation. The currency may take form of a cryptocurrency as a form of monetary democratization and community wide alliance. The crypto economy may fluctuate due to natural cases of supply and demand and may be regulated or counterbalanced by governance, collaboration, trade agreements, deflation, interest and, among other methods, a selection of publicly-declared global algorithms 7. The Currency May Emerge from any Datatype The currency may emerge for any datatype that is sharable and emerge as a traded good among users. The datatype is identified, and governance determines future integration or use with existing infrastructures and payments. Cryptography, distributed ledger technologies, and other technologies may be used as a means of securing data transfers. Bartering with various datatypes may emerge, determined by governance decisions. Ex. One user is a registered designer and has an avatar with their favorite brands. Another registered designer wants to make a trade. This may count as a valid form of currency. Ex. Another user wants to switch up their virtual closet. The need may arise for virtual thrift stores, user led secondhand stores, etc., for limited edition pieces, "out of season" fashions, etc.

ECON.2: Reputation and Ranking

1. Ratings

Selection of 1-5 stars. Ratings allow a rapid understanding of how previous users perceived or experienced the system. This is facilitated by providing previous users a choice in which multiple choices of icons represent a relative, non-detailed rating. A high rating is tested against a virtual good's frequency of use to deduce a virtual good's need for physical materialization. Highly rated items will be algorithmically sorted against other factors to determine high priority items for client production in the physical world. Other factors may include the context they are worn in, paired brands, etc. The brand supplier can decide based of the supplied data.

2. Rankings 3-parts indicate best practice (Likeness, quality, serviceability). In the interest of ensuring ratings are applicable to virtual goods providers, there will also be rankings factored in to allow the user to decide three aspects of the virtual good: Likeness, or the replication and resemblance to a real product offered by a fashion brand or client. Quality, or the detail of the virtual good and its ability to retain its integrity in an AR space, in different virtual avatar poses, or occasionally, when layered with different clothing. Serviceability, or the need, desire, and ability of a virtual good to be updated with a different version, whether due to transient cultural trends or otherwise determined reductive value of provided virtual good—including quality and likeness.

3. Reviews

Prosaic opinions. Authored by verified or authentic users, reviews will allow insight into ratings or rankings of virtual goods as well as the app standing. Ratings, rankings, and reviews provide an opportunity for growth and insight into the user market. Reviews help determine the user's need for properly creating and embodying their virtual avatar and strengthen a relationship between Idoru and other parties providing virtual goods.

ECON.3: Markets
  1. Market Control
  Market control may be influenced by introduction and reduction of assets. Monetary economic policies, consumer surplus formulae and the regulation of supplies and demands may all be measured, monitored, influenced, and regulated. Both free resources (or commonly available commodities) and scarcity may simultaneously be introduced via multiple mechanisms. Mechanisms may vary and may have the opportunity to be influenced by the partnered brands or users. Metrics are evaluated.
  2. Commodity Control
  Commodity control may be influenced in a variety of methods that include scarcity and availability. Scarcity in the economy may be both naturally generated and introduced. If scarcity is introduced it may be by limiting an amount or quantity of the good or service that may be available, increasing the amount of attention (thereby generating a paucity of time). Alternatively, scarcity might be affected inversely by increasing the number of instances offered and decreasing the amount of attention. A new measurement of economic indicators may then be used to evaluate effectiveness and success.
  4. Control of Commodity-Time Ratios.
  The following ratio mechanisms are both commodity and time based. First, mechanisms are often Time-based: (1) Purchase Countdown (time-based): drives a rush to make purchases before time runs out. For example, a virtual good of cowboy boots that were recently featured in a music video is available during the album's release day. (2) Sale Price Countdown (time-based): creates a sense of loss aversion to encourage consumers to make the purchase immediately. For example, a virtual good of a designer hat is on sale before its appearance in New York Fashion week, encouraging users to match their favorite models. (3) Seasonal Offers (time-based): Seasonal offers are used to create scarcity and encourage sales because seasons and holidays don't last that long and encourage consumers to go all-in. For example, fashion events may be seen as a holiday where users can create their own versions for these events. This might be according to cultural moments, airing of media events, etc. Alternatively, regular National Holidays could serve as a bridge between culture conscious brands that respectfully provide holiday relevant looks to their users.
  These mechanism examples are commodity-based: (1) Limited stocks or limited editions (commodity-based): to drive sales and encourage buyers to make purchases because scarcity causes items to appear popular. (2) Differentiation (commodity-based): signed copies are one example in which individual items of a series are identified as increasingly valuable. (3) Customization (commodity-based): registered designers may offer a limited service of customizing designs to encourage brand awareness, user outreach, and user generated content.
DATA Management
  The use of data and instances of application may be considered as core to identity, self-expression, and personal health, psychologic, physical, mental, and otherwise. Additionally, means of optimizing energy usage are outlined for more sustainable approaches.
DATA.1: Inclusion and Data Management
  1. Re-Biasing and Curation for Self-Expression.
  ML libraries may be broadened to minimize or otherwise influence existing bias and learning parameters for recursive machine learning models, for audio/voice recognition, vision/facial recognition and for broader machine learning technologies to better represent a more inclusive user base. Ethnicity, gender, and emerging components of identity may be introduced to include a broad range of representation. This may specifically address a very broad, diverse audience with a wide variety of measurable features and parameters. Additionally, a broad array of facial dimensions may be used to cross-check and recursively improve other datasets. In this model there is decreased weighting, and proportionally increased recursive learning passes.
  As an example, Jojo begins to scan their face with the app and while the avatar's face looks similar in appearance Jojo sees dissimilarities that are not quite right. Jojo has very almond-shaped eyes and their superior lid crease is only 2 mm above the upper lid margin. Jojo then interacts with the app and begins to scroll through examples that are listed. Jojo finds one that is close, but still not quite right, so Jojo begins to edit and alter the details of the avatar's eyelids. When the task is completed, this data is used by someone else, and Jojo receives some compensation.
  Hand-crafted curation and specialized preparation of training data. A training dataset, prepared for machine learning, is flagged, or otherwise parameterized with weights in which recursive learning—supervised, adversarial, or otherwise—is trained to select and value these individual entries (or tokens or entities or other data equivalent for those knowledgeable in the art) more than others. These noted entities are outliers or instances of prioritized data that are not as common as the unflagged or flagged differently ranked or rated or otherwise valued individual entities. While this innovative approach to hand-curated data may also be extended to include objects, environments and other visual systems that are used in the avatar system the application of the practice may include but not be limited to also auditory, behavioral, tactile, olfactory, and other means of somatic and intellectual perception.
  As the parameters or flags impact the learning process the system becomes tuned to draw generalizations and the training model emphasizes less-common entities according to user input. As well as influencing asset features and behaviors the method presents an additional benefit for the experience of the user through multiple mechanisms: By building upon a current asset library the user may more clearly self-express by allowing the user to specifically determine, edit or otherwise influence the behavior of animations, gestures, postures, non-verbal language expressions and other expressions which may be numerically measured or otherwise quantified. By allowing the user to specifically determine, edit or otherwise influence the secondary and tertiary results of previously combined animations, gestures, postures, non-verbal language expressions and other expressions which may be numerically measured or otherwise quantified. Secondary and tertiary data effects included here may be extended to include all outcomes from previous data combinations and recombinations, filtered, trained, and otherwise manipulated. This user experience is further improved with the building and editing or otherwise influencing improved predictive models by beginning with a rudimentary avatar and accompanying avatar behaviors. The initial avatar (or environment or object) instance may be a very conservative avatar which forms a numeric basis (such as an average) of the available population data (such as the mesh parameters) as ranked and explained above. The initial avatar behaviors (or environment or object behaviors) also follow a process from starting as very primitive, or rigid, and gradually becoming more expressive. The variants, in some cases user-generated, may be plotted along a trajectory allowing for users to more easily discover deviations which the user may or may not select. In final Model Evaluation the flagged, minority entities represent an equal weight to those of an unflagged, majority set of entities. The model is retrained and tested with the new weightings. A model of compensation may be included so as to improve data curation processes. In this method a data contributor is remunerated proportional to the frequency with which their data is used. The editing, influencing, or re-biasing of data represents a value to another user and that value corresponds to, but not limited by, a monetary value (which may be a fiat, cryptocurrency, or other demarcation of value).

2. A Person's Health May be Evaluated.

As an avatar may be an expression of a person, the appearance, behavior, and application of an avatar may be monitored by a wellness, psychologist or psychiatric professional and the health of the person responsible for the decisions, such as the avatar owner, editor, or author, may be evaluated. In some cases, this evaluation may be enhanced with the use of machine learning and analytics mechanisms, potentially trained by the same monitoring care provider or subject-matter expert. Similarly, data may be retroactively analyzed to improve predictive capabilities so as to diminish confusion of causation and correlation.

As an example, Sarah has been limping because her left knee was broken three years ago and now that it is winter the cold is causing it to act up. She now uses a cane but it does not help her limp. It does help her walk and, though unbeknownst to her, it helps her express herself. When her knee hurts enough she violently taps the cane on the ground as an expression of frustration. Her healthcare specialist reviews this and is able to determine that not only is Sarah not using her cane correctly, but the expression of frustration is also more linked to being cold than to being injured. She confirms this with a psychology expert who is able to provide data correlations that outline other ways in which Sarah is frustrated. In some cases, these are specific buildings in New York City, in other cases it is during a time of day when she is hungry. These two professionals individually consult Sarah who is more aware of her mental and physical health.

A professional healthcare provider may offer a base truth data set where the base truth data may allow for goals, trends, and exceptions to be noted. As a person moves through their house their movements and behaviors may be recorded. This monitoring of a person's movement and behavior is collected for later playback and analysis. Include other information collected via SLAM, CV, sound detection, NLP. etc. A dashboard of the playback may be offered to the healthcare provider, or other interested party, with a scrub-deck type of interface which also references a map and a clock showing place and time with additional sets of data included. This dashboard also notes trends, patterns, exceptions, and behavioral, positional, temporal and other coincidences. This dashboard also notes exceptions and other coincidences. Exceptions may be derived from the previously contributed base truth dataset and from outlying instances of numeric expressions.

This form of expression could be evaluated by a qualified individual such as a wellness, psychologist or psychiatric professional with existing experience in behavioral patterns related to physical and mental well-being. Since this form of expression is by its nature expressible as classified and ordered, the usage of machine learning algorithms to find patterns and aid a human evaluator is simplified.

3. Peer-to-Peer (p2p) Sharing

Peer-to-peer (p2p) sharing of avatar data may produce cryptographically secure, sustainable energy practices. Emerging forms of consumption and collection may be adopted by blockchain practices and both administrators and users such that minimum electricity and computing resources will be expended on the generation, storage, processing, and transmission of digital assets. One familiar with the art may use links, peer-to-peer distribution, and co-referential links rather than the digital asset in question which may be many gigabytes or even terabytes in size. This is facilitated via a previous download of a canonical or template model which is transformed locally on the client or mobile computing platform. With regards to blockchains and distributed ledger technologies, one knowledgeable of the art may use blockchains, sharded blockchains or other transfer-registry data systems (centralized or otherwise) to reduce computing resources required. Additional sustainability may update ledgers on a daily, weekly, or monthly basis. For each element present in the avatar system, a canonical special purpose version that can be subject to transformations is stored centrally. This special purpose version of the element can be obtained by any avatar system endpoint. An endpoint that needs to send a specific instance of this element customized to fit a specific purpose can instead send only a set automatically generated set of instructions to manipulate the canonical version into becoming the desired result. This set of instruction can be encoded into a short message that both indicates the base element and the set of transformations that need to be applied to it to obtain the desired result. This short message is encoded in a way that is appropriate to be included in a distributed ledger or sent through other text broadcasting mechanisms.

4. Container Systems

Container systems, both hierarchical and otherwise, to those knowledgeable in the art, may allow improved management of data in that the input, storage, processing, transmission, and output of data is minimized. The avatar system is associated with containers that represent a structure of data. These structures may be a collection of other objects. These groups of objects may be related data, such as a collection of a sound (i.e., an individual dog barking) or a collection of a group of sounds or abstraction (i.e., a collection of various dogs barking in various behaviors). This allows references and simple access rules to both simplify data management and facilitate the production of content without affecting the target asset (i.e., a barking dog) a. Standard forked hierarchy but for AR avatar software. b. Multiple temporal factors or timestamps are integrated. c. Network use, branching of code and fork differences are included.

5. Physical Therapy

Physical and pain therapy and other forms of muscular coordination may be analyzed and improved. The medical fields currently using VR/AR to better manage pain may directly benefit via an AR avatar. These practices may be enhanced with the use of the avatar facing the owner and engaging in hand eye coordination, martial arts, dance, stretching, practiced therapy, walking and similar physical and body-centric movements. An avatar that captures the body composition and likeness of an individual serves as the base for presenting appearance and behavior information applied to clinical therapy to the user and clinician. The avatar, having the same body shape as the user is used an example.

6. Evaluation of Customs and Dress Practice Avatar

AR may be used as a training tool where steps are played on the real world for subject to learn to dress using cultural- or industry-specific styles in which customary folds, pleats or dressing steps might be performed by subjects' avatar. As an example, Jojo's mother comes from a long line of Tamil saree manufacturers. Jojo's mother would like to include the traditional Southern Indian saree folding methods from the last 500 years. Jojo's mother records her physical pleating, folding and pinning of the quintessential Kanjeevaram saree as it is to be worn for both formal weddings or festivals. After the AR recording is completed Jojo's mother posts the movements. Jojo, with the avatar of her mother folding the saree, is able to recreate the steps and receive guidance and feedback.

CONTENT Collection and Management

Methods of data input are needed to generate a 3D model or digitally capture the shape of a seen object without touching the object, person, or space. These methods of data collection may include measurements of light, such as photogrammetry, lidar, bifocal photography and other methods. Likewise, the measurements of audio (such as echolocation and sonar), and measurements of other dimensional data such as, but not limited to infrared, audio graphs, heat graphs, IR, etc. Additionally, the various types of content may be combined from various media types (eyes from one photo, mouth from another, etc.). Machine learning may be used to alleviate production loads and increase output while simultaneously discovering and categorizing new styles and working processes.

CONTENT.1: Collection, Scanning and Exporting to Other Media

Users and entities may collect, use, export, and exchange Avatar System data.

1. Borrow Features

A person may scan particular parts of their face or body, or the face or body of someone else or a photo or other sources and may then integrate this data into their avatar model. As an example, Sarah really likes George Clooney's eyes and wants to use them on her avatar. She takes a photo, from her mobile application, of George Clooney. Sarah circles the eyes in her app UI and is prompted for a name for this asset. She names it "George's Peepers," and examines them, making small alterations to the color. The following day, when she opens the menu for editing the eyes, she finds the asset she just named "George's Peepers." She selects them, assigns them to her avatar and saves the new combination. She is able, as per usual use of the app, to take a picture of her avatar with the new eyes and send that picture to a 3rd-party social media system, Instagram.

The steps for borrowing features includes performing an initial facial scan and then scanning the alternate face. Alternatively, the avatar mesh may be built based on photographic interpretation via ML models. Using the ML system and an associated library, a query based on a characteristic to receive data is made. The entity is extracted and used to deform base scan. Next, the assets are integrated into existing mesh via app a user interface. New data of new avatar with borrowed features is then stored.

2. Edit Features

A person may manipulate the scale, size, position, rotation, and other placement characteristics of facial features (such as nose, eyes, accessories, objects, environments and characteristics of items, material appearance, proportions, and behavior). First, key data features are collected, and the features are mapped to a canonical mesh or canonical IDs. Deformation, based on canonical IDs and group data, is then performed.

3. Manually Export Avatar to a Different System

The avatar is manually exported to a different system, such as a Social Media Platform or AR presentation may be accomplished via a video or photograph of the avatar which is then manually posted to the new system or, in the case of AR, placed in its desired location. In a similar method other media type including, but not limited to, point clouds, nurbs, voxels, video, 3D printing and others.

As an example, Sarah would like to show her avatar off on Instagram so after she has completed building the face, dressing the avatar and adjusting other details including but not limited to pose and background, she moves to a new part of the app. This portion of the UI allows Sarah to generate a photograph which is saved to her mobile device's camera roll. She uploads the photo to Instagram which is associated and accessible via her Avatar System. Base representation from on-device mesh by converting internal mesh format to intermediary format (i.e., USD/Z, Unreal). Send intermediary format (such as USD/Z) to networked server with additional characteristics related to the look/feeling and setting the user prefers. Create desired output format, e.g., PNG, USD/Z or other format or capture onscreen image, convert to PNG or target format.

4. Automatically Export Avatar to a Different System

Automatically export the avatar to a different system, target system, with 3D graphics, such as a videogame, may be possible via an Application Programming Interface (API) which evaluates the specific shapes, surface characteristics and colors and many other features. These are then interpolated to the new system's technical requirements such that the avatar, associated with a specific ID, is optimized for the new environment and compatible with the system specifications.

As an example, Jojo is a hardcore gamer and she likes her avatar. She built the avatar in Idoru's app and wants to use it in Fortnite. Going into the Export function of Idoru's app she finds a list of platforms available for exporting. She finds Fortnite and, allowing the app access to her account, exports the avatar. Jojo is provided with a preview since, in some cases (MineCraft, Roblox or others) the resulting avatar would be so different that Jojo might not want to continue with the process. She then logs into Fortnite and finds that her avatar, with some small changes specific to the 3rd-party platform have been made. Accepting (or not) these changes she then has full control of the same avatar on the 3rd-party platform (in this case Fortnite).

CONTENT.2: Generation Automation and Machine Learning

Automation and Machine Learning (ML and/or GANs) may be used in a variety of ways to build technically compatible and assets for avatars, objects, environments, behaviors of these sets of data and others.

1. Application of ML to Alleviate Production Load.

By using machine learning libraries in multiple instances, vectorsets are established and blended so that the hand-authored data influences the machine-authored data by gradual steps until a blended dataset, acceptable to the authoring artists, may be completed. First, the base truth (or "ground truth") vectorset of hand authored or built data is established. The data is prepared for training and to those knowledgeable in the art, bias and variance are the two main measurements of error to be avoided. A high degree of bias can prevent the ML model from predicting a training set. A high bias can be reduced or eliminated by adding in additional or, better, different data parameters or different features. A high degree of variance can often be avoided by adding additional sets of data, essentially more rows in the spreadsheet. As a base truth is established and approved by a reviewing expert it is used as data set #1 (Built Data). The base-truth (or "ground truth") vectorset of the second vectorset is found or collected data. Collected data may be manually gathered such that image data (absolute) is identified as separate from process (relative) data. Image data gathered by the ML team may help optimize and train the neural network on pass/fail determinations. Much of this process includes determining the appropriate variables in the data (image resolution, real and virtual lighting or coloring, etc.). Groups of workers must consistently and reliably label and document faults, defects, or other spurious data.

Fake or intentionally introduced defects must be avoided to reduce statistical anomalies (bias and variance). Technical specifications and varying end-goal product features may be tracked and integrated into the process on an ongoing basis. Emergent changes must be independently measured and clearly defined. An ongoing process must be defined to capture changing variables on a consistent basis.

Figure 19:
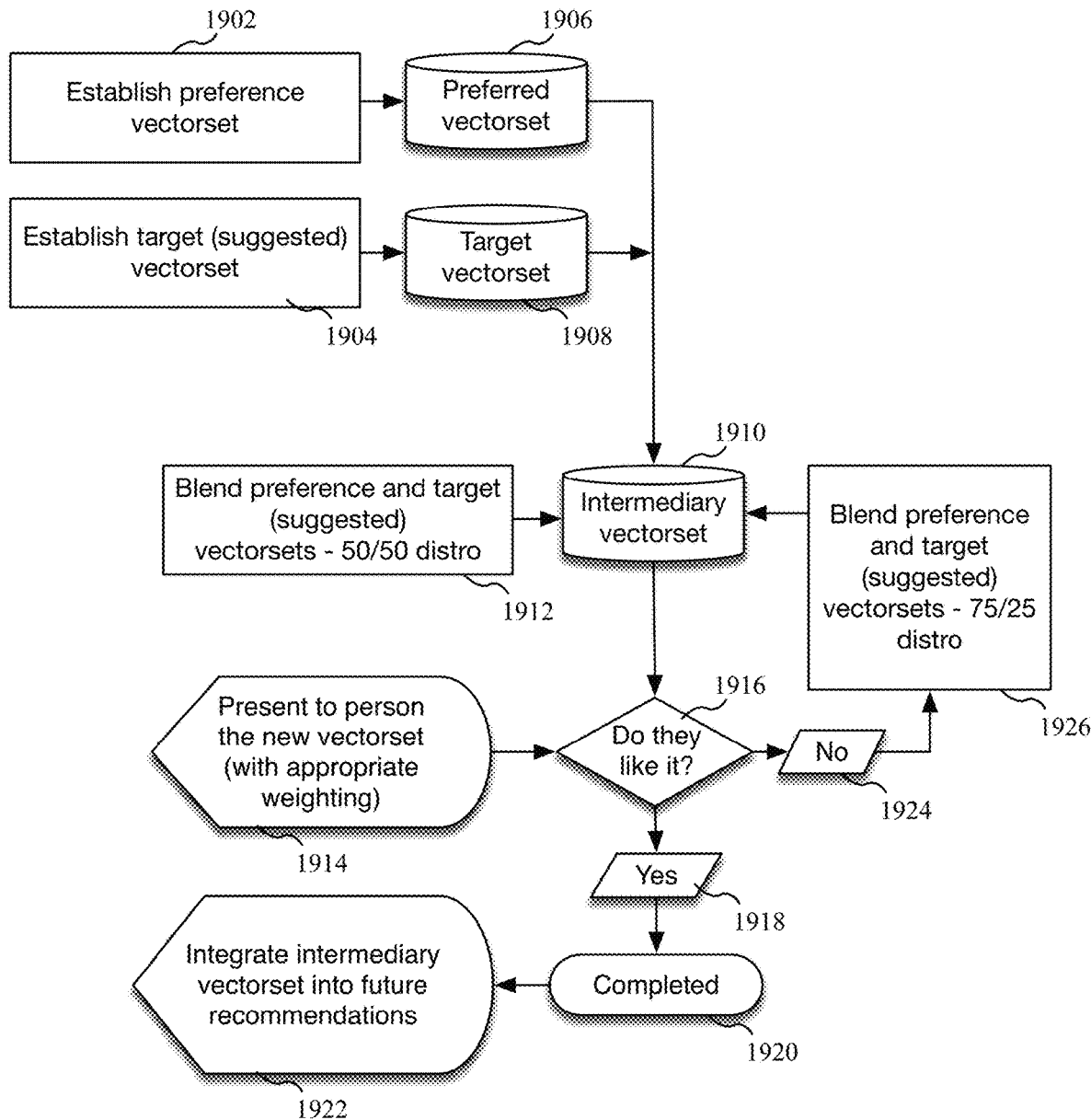
FIG. 19 is a flow diagram illustrating application of machine learning to alleviate production load, according to one embodiment.

FIG. 19 is a flow diagram illustrating application of machine learning to alleviate production load, according to one embodiment. First, a preference vectorset is established 1902 as well as a base truth or target vectorset (#2) is established 1904 and approved by a reviewing expert it is used as data set #2 (Collected Data). The preferred vectorset (#1) 1906 and the collected/target vectorset (#2) 1908 are then blended into an intermediary set 1910. Initial efforts may be initiated via an even distribution of 50/50 1912. Next, present the intermediary vectorset (again, paying special attention to both bias and variance) and establish acceptance criteria from within the available ranges 1914. A determination is made if acceptable 916, if 50/50 is acceptable 1918, then process is completed 1920 and the intermediary vectorset is integrated into future recommendations 1922.

If 50/50 is not acceptable 1924, then reduce even distribution by weighting the preferred vectorset (#1) over the target vectorset (#2) (for example 75% #1 hand-authored, 25% #2 collected) 1926. Mix, repeat and sample to personal taste. Present new (suggested) data for review and measurement of success. In an exemplary implementation, the suggested output from the model may be reviewed by various different methods before final approval. This amounts to a process by which a qualitative acceptance criterion for later model learning may be determined.

SME evaluation. A review model of subject-knowledge experts, for example those people that have built the set of hand-authored data (data set #1) may review final outcomes and determine the approval basis.

End-User evaluation. Final product end-users' satisfaction and interest may be measured and quantified. Technical compatibility. Final product interoperability with other systems may be a means of determining the approval basis. Equivalent, external data. If coincidental associations or concurrent examples are found after the generation of new combined data are found this may be a measured success. An example is one in which the green dress with 12 tassels and a belt is found in a fashion store in a country that had no influence or previously noted presence within the collected data set (#2). Measure quantitative output to determine efficiency increase proportions. i. The time spent generating the model vs the time spent generating an equal number of (accepted) output examples. Measure qualitative output to determine standards of excellence. The talent, innovation, duplication and iterations spent generating the model vs the equal number of (accepted) output examples representative of caliber, character, worth, repetition and variety. This subject measurement may also be passed through surveys, conversations, tests, and other social data collection methods. This may then be applied to an increased range of collected data. The specifics of the model are saved and recorded for later reference and ongoing improvements.

2. ML & GA Output Aimed to Evolve Designs.

Figure 3:
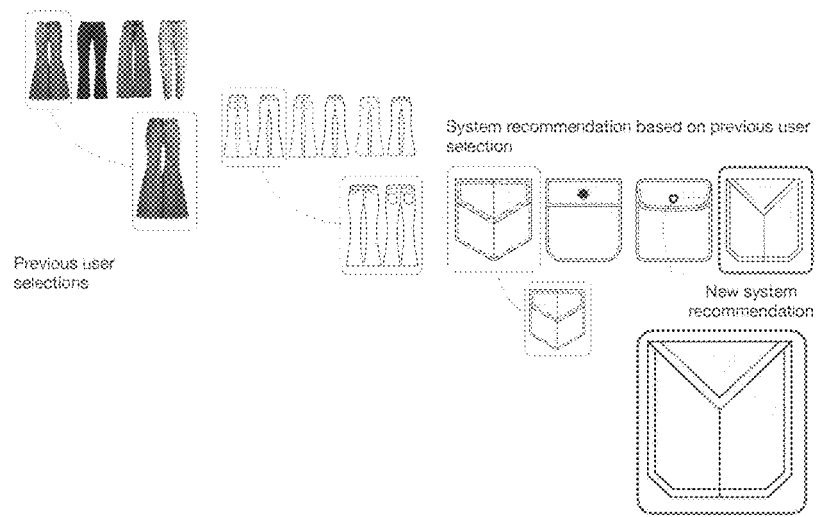
FIGS. 3 and 4 illustrate an evolution of the design of blue jeans.
Figure 4:
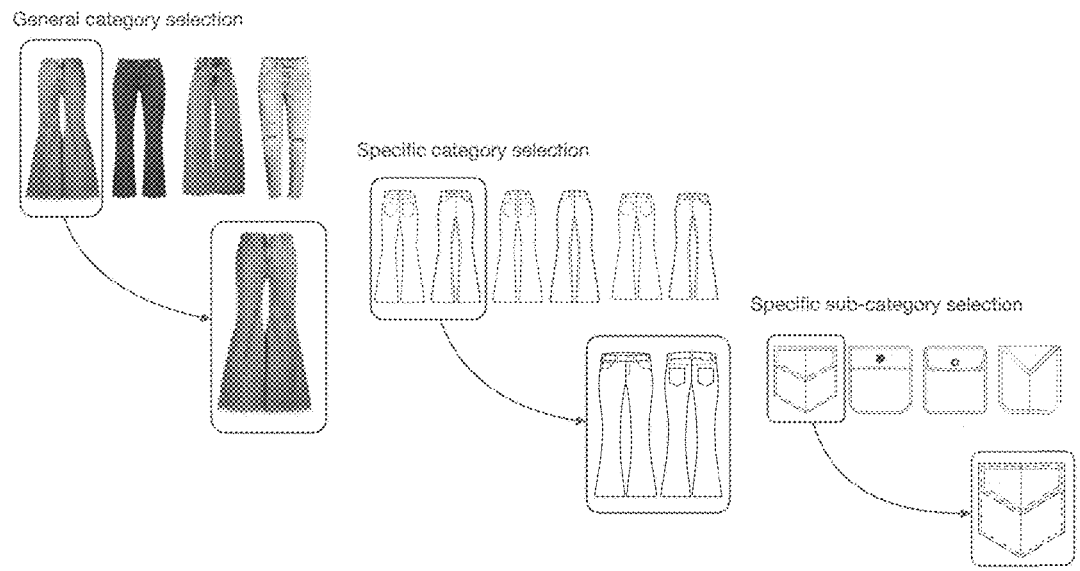

The combination of genetic algorithms and machine learning provide new means of collecting the best ideas and iterating on them in order to generate repetitive yet varied designs that are based on a common core concept. For example, when applied to clothing and pants in particular, a new model of blue jean may be discovered when the characteristics and features of all blue jeans across the years, from French De Nimes, to the latest, torn Gucci. By building datasets that are first determined via ML processes to identify recurring features a selection of the best examples is made. These comply with "fitness criteria" which are the parameters of style (blue and jeans, for example). FIGS. 3 and 4 illustrate an evolution of the design of blue jeans.

GEP or MEP (Genetic or Multi-Expression Programming, but not both) methods are then applied to iterate off of these parent examples and innovative models derived. Finally passed back through the hands of human reviewers (or, alternatively, automated evaluation processes) the best examples are chosen to move forward. The following steps then occur: (1) determine fitness criteria of all data (color, size, material, etc.); (2) establish base truth vectorset of (#1) of hand-authored data; (2) establish base-truth vectorset of (#2) collected data; (3) select the fittest individual entries for reproduction (from vectorset #1); (4) iterate new individuals through crossover and mutation operations via GEP or MEP (Genetic or Multi-Expression Programming) methods; (5) replace the least-fit individuals of the population with new individuals; (6) present new (iterated) data selections; (7) review and determine acceptability for use as vectorset #2; and (7) apply formerly-listed GAN practices.

CONTENT.3: Core Editing of Multiple Mediatypes

Various methods of filtering and otherwise editing Avatar System assets may be applied to improve the creation, editing and placing via interactions with other types of media to fine-tune the final, desired results of media and information created.

1. Visual Filters

Visual filters applied to AR avatar and the assets of an Avatar System may be executed before outputting the final image in AR, VR, video or moving images. A generalized stylistic filter, such as vignette, disco lights, alterations, colors, patterns and other effect may be applied to the final interactive and AR image as it is being processed (whether real-time, post-processed or stored for later use as an overlay for still imagery). First, derive and register the core algorithm for end-goal filter effects with the networked computer. Next, provide the algorithm (and ideally an example of final effect) in UI or other datasets for later or future selection, storage, or use. A filter is then applied to view the image in the client system with the option for the user to apply part of the image (such as foreground, mid-ground, or background), the whole image, or discard the image.

2. Avatar System Application

The avatar systems application may be used for importing, editing, and exporting using a software interface. AR & VR fashion avatar systems may enable, within the app, the editing of shape and surface materials. This resident editing process may also allow importing, placing, and editing objects, architecture, and features of a scene (such as light, environment effects, sound, animation, and other features). A person may engage with the software application and, via the user interface, engage in the editing process via buttons, levers, switches, carousels, and other software interface conventions. To those knowledgeable in the art, the complete scenegraph of the avatar system may be altered, added, subtracted, copied, and otherwise altered as chosen by the user or operator (which may include automated systems).

Interface componentry allows for editing and exporting integrated into avatar mesh and avatar system. The core assets and mesh geometry may be registered with networked computer and the network computer may provide RESTful APIs, presentation and security layers, user management, logic and reports stored as datasets. The address export capabilities and format requirements are provided by hierarchical levels of detail.

3. Editing Modules

Editing modules to allow output of AR avatars and Avatar Systems assets may occur. AR and VR fashion avatar systems may enable style and edited stylistic or material changes that are output to other media via filtering and editing. An avatar may be stylistically edited to include a range of objects, environments and appearance of the face and body. Filter may be applied when a person's avatar is exported to a still image, 3D rendering process, motion picture or video format, game, or other media type. This is done through a suite of tools for these media classifications.

Still imagery editing may include the appearance, objects and environment surrounding the avatar, all of which may be affected by filters, additions or subtractions of imagery, post-processing effects targeted at a part of the image or targeted at the entire image (vignette, for example). Other processes related to still imagery may include transformations of flipping or rotating, resizing, scaling, cropping, merging other imagery into the source image. Selection tools for the filters of the AR avatar would include painting, adding text, selections for editing, selective coloring, and an array of filters (including but not limited to blurring, enhancing, distorting, lights, shadows, noise, edge detection and enhancements, artistic filters, decor filters, map filters and methods for managing the rendering process. Scripting may be included for those familiar with the art command-line or source-code editing may be used.

The 3D rendering process may encompass both real-time and still imagery. These rendering processes include: surface transformations such as scaling, rotating, or changing the surface and appearance of a 3D model. surface shading algorithms, reflection and specularity, lighting shading and refractions, public projections and surface stitching for buildings, lighting, etc.

Video editing processes may be applied not only to animation, poses and other time-based material that is produced directly by the avatar system, but composition and post-production tools may also be used for editing. This toolset may include a timeline interface which references video recording clips. The clips may be edited, sequentially ordered, and reviewed to compose a larger video track. Functions may include reproducing trimming, splitting, inserting, and arranging clips across the timeline. After editing is complete the files of the avatar system may be exported to movies in a variety of formats according to the requirements of contemporary software.

Audio editing, likewise, may include filters and tools for editing tempo, pitch, tone, recording, mixing, and integrating with other mediatypes. Functions may include reproducing trimming, splitting, inserting, and arranging audio clips across the timeline. After editing is complete the files of the avatar system may be exported to audio files in a variety of formats according to the requirements of contemporary software.

Administrative Technologies

As well as allowing user interface applications for importing, editing and exporting avatar data, AR data, ML data and other procedures, the administrative technologies provide access to backend user account data and the details they contain. The administrative system may be used to remotely orchestrate or otherwise control the appearance, behavior and actions of the avatar with or without the owner's or other stakeholder's participation or knowledge. (ADMIN.1) The administrative system may group, categorize, rank and present results. The administrative system may allow individuals, owners or parties to insert, edit or remove individual avatars or groups of avatars. The administrative system allows adding and removing additional components of the avatar system such as objects, architecture, appearance, functionality, interfaces with other software systems and a range of multi-party operations. The administrative system may be used for avatar system maintenance, analytics and user interfaces including those that offer visual groupings and scenario predictions. (ADMIN.2) The administrative system may predict, provide results and offer multiple scenarios regarding the behaviors of individuals, assets, data, trends, fashions and other events. (ADMIN.3) The administrative system allows management of identity and various security features including the identification, authentication, verification, validation of the user, timestamps, blocking, obfuscation, regulatory compliance and other functions.

ADMINISTRATIVE TECHNOLOGIES.1: Maintenance, System Analytics and UIs

The Avatar System may contain various means of maintaining large sets of data to collect, group, separate, and alter information such that the collected aggregates of data as well as the individual components may be more easily used by the entire system, individual avatars, individual users and associated functionalities and information.

1. Grouping and Categorizing

The administrative system may group, categorize, rank and present results. Additionally, the system allows for defining groups either by explicit listing of every member of such group or by defining shared characteristics which every member of the group should have; in which case the grouped items are selected automatically by the system. These groups may be assigned new characteristics or categories which leads to every member of said group to be assigned those characteristics or category as well. Some of the characteristics assigned to groups or individual items may be directly comparable and may be ordered allowing the establishment hierarchies and differences. This characteristic can be used to establish a rank of groups or individual items. The administrative system allows these individual items and groups to be displayed along with the properties and value defined for each individual or group. These may include flags, comments, and other data useful to grouping or separating.

2. Editing and Deleting

The administrative system may allow individuals, owners, or parties to insert edit or remove individual avatars or groups of avatars, objects, architectures, and other items as part of the avatar system. The system separates different authorized users according to allowed usage privilege. User with sufficient privilege is allowed to add any number of new elements to the avatar system, be the assets the avatar they themselves own or components such as objects, architecture or other assets and functions within the avatar system. The user can select any number of entities in the avatar system to make alterations to existing elements of the avatar system: avatars and their properties, objects, architecture, and accompanying metadata.

3. Physical Context and Usage

Sensor data collection and input may be related to physical environment. The administrative system may provide real-time information on the use, location, and surrounding data that is acquired by augmented reality including surrounding objects, people, environment, and nearby devices which have appropriate and compatible sensors. ML methods (Computer Vision, Object Recognition, Sound recognition, Audio processing, natural language processing, etc.) may be used as means of classifying. The administrative system may keep the internal aggregate geolocated information on the physical usage of the avatar system.

The avatar system information may be updated by applying data points received from edge computing endpoints (such as nearby sensors) and endpoints and sensors acquire relevant information (such as surrounding objects, people, and environment) including but not limited to camera, GPS locator, accelerometer, and Bluetooth antenna along with computer vision techniques.

The administrative system allows approved users to consult this constantly updating store of information interactively, filter, query for details and stop and start particular processes of data throughput. The administrative system also allows approved users to edit or alter, via write-access permissions.

4. Virtual Context and Usage.

User data collection, input, and interaction with virtual environment. The administrative system may provide real-time information on the use, operation, time spent, and behavioral data that is acquired by augmented reality and the app itself including behavior, choices, intended or evident preferences, and other. ML methods may be applied for clustering, grouping, and predicting.

The administrative system keeps internal aggregate information on the virtual usage of the avatar system and the internal information is constantly updated by applying data points received from edge computing endpoints. Edge computing end points acquire relevant information such as generated and edited objects, avatars, and other parts of avatar system. Amount of time a mesh or other object is viewed and processed, the operation of the application and user interface, the duration of time spent and other factors. The administrative system also allows approved users to consult this constantly updating store of information interactively, filter, query for details and stop and start particular processes of data throughput.

5. Comparisons of Physical and Virtual Data May Generate Overviews.

The interaction of virtual input/output and physical input/output may be used to generate overviews. For example, what time someone looked at an object, where, for how long, and what they were doing prior to that period may show, in proper circumstances, the effect or impact an environment had on the choices a user makes.

Virtual and physical data may be collected. The virtual input includes user choices, collected and edited assets, avatar features, traits, etc. while the virtual output includes AR representations of the avatar, environment, movements, audio, and associated time-based data such as tracked trends and behaviors.

Physical input may include sensor-derived information such as location, planar surfaces and derived fiducials, light direction, color and intensity, sound, temperature, etc. and physical output may include physical presentation on mobile device of virtual output (screen pixels that are light, speakers that are used to generate sound, etc.)

The virtual and physical data is compared, and the processing and redundancy qualifications are assessed. Once completed, the final query data with correlations and differences expressed is displayed.

6. Revision Controls.

Changes may be stored on an individual mobile app or on a shared server in a cloud-based architecture. These changes may be accepted when a person exports an avatar, object, or architecture to a target system such as a 3rd-party AR environment, social media, video, AR, VR, or game world. These 3rd party systems may be for education, entertainment, business, or many other application purposes requiring a graphical presentation. If a change is undesired, the person may return outside of the target system and one of the features may be disconnected before re-entering the target system.

Content may be prepared for the revision control system. The source data is identified, measured, and stored (taken from any part or aggregate of the avatar system). Next, the target features are measured and identified and then edited. Finally, the updated avatar is displayed in the client.

7. Hierarchical Clusters of Data

Hierarchical clusters of data may be presented as spatial distances in a user interface. The administrative system may present the relationships of objects, accessories, avatars, environments and other data (such as interactions) as spatial distances between nodes that are expressed numerically. The value may reference stylistic differences, frequency of use, time spent interacting, and other variables expressed as quantities. The correlational data represents similarities, differences, and other information relevant to groups of avatars, objects and environments when measured in pair, triple or more. These clusters of data may be moved within the interface upwards or sideways, zooming into and back from the point of interest, or focus point. When the person reviewing this data determines a new point of interest, such as an individual node they may select that node by clicking on it. This action would reveal lines which indicate the other points of data determining its position in the hierarchical cluster. For example, a 3d navigation interface may allow a user of the computer program to virtually navigate through a constellation of digital stars. Each star is a data point which are clustered in ontological fashion, such that pants are in one region together, then blue jeans in a subset of that region, then bell-bottom blue-jeans in a similar, smaller subset, then embroidered bell-bottom blue-jeans in yet another. The ontologies may be dynamic and the sorting automated, by one familiar in the art, with nearest neighbor sorting. A particular pant style, when clicked on, shows a series of lines that radiate out and backwards in the 3D virtual space (AR, VR, or MR). Following one of the lines back the other direction the user might see big-hair avatars, and in a subgroup there's avatars with afro hairstyles, and in a subgroup the user finds avatars with rainbow colored, afro hairstyle, and so on. This allows the user to search for particular fashion accessories, find out what other brands people are interested in, and how popular the embroidered bell-bottom blue-jeans are compared to others.

The administrative system allows selecting a data property of elements in the avatar system and generate clusters of elements for which the data respects a given constraint such as value being near each other to within a certain threshold. This may be based on nearest neighbor, k-means, or other methods. The difference in values for this particular property among each cluster can be used to calculate a distance between cluster by taking the numerical difference and mapping it to a spatial length. The administrative system lays out interface elements to the user by using values of a) to determine the size of elements that represent a given cluster and b) to determine the distance between the elements that represent a cluster. Administrative system draws connections between clusters according to the relationship expressed. The Resulting composition allows user to visually (or in another implementation, aurally, by listening) determine numerical relationships between items as part of an amorphously defined group.

8. User Interface

A user interface for prediction and scenario modeling may be presented for user interaction. A system administration user interface may show trend-lines and predicted vectors of specific data based on selected criteria. These assets may be tracked, analysed, and reviewed based on revision history or other information. 64-bit identifiers may be used to identify specific assets such as a shirt (or other object), or house (or other environment). The revision history of these assets may be tracked, separated, edited, and otherwise managed as necessary.

A dataset containing all 64-bit strings and referenced assets from an avatar system is managed and accessible. Target features may be measured and identified, changed, and otherwise altered. The history and any predicted (emergent) use are displayed. The administrative system allows selecting a data property of elements in the avatar system and generate clusters of elements for which the data respects a given constraint such as value being near each other to within a certain threshold. This may be based on nearest neighbor, k-means, or other methods. The difference in values for this particular property among each cluster can be used to calculate a distance between cluster by taking the numerical difference and mapping it to a spatial length. The administrative system lays out interface elements to the user by using values of (a) to determine the size of elements that represent a given cluster and (b) to determine the distance between the elements that represent a cluster. Administrative system draws connections between clusters according to the relationship expressed. The resulting composition allows user to visually (or in another implementation, aurally, by listening) determine numerical relationships between items as part of an amorphously defined group ADMINISTRATIVE TECHNOLOGIES.2: Predictive and Autonomous Functionality The administrative collection, editing and separate of data may be analyzed and used such that trends, correlations and autonomous functionality may be applied both manually and automatically.

1. Behavioral Prediction

Behavioral prediction of avatars or people may be based on historic data. The administrative system may provide inferred information about the future behavior of both an individual avatar and an individual person (or entity as the owner, author, or editor of the avatar). This method may be applied to both individual avatars as well as group identities. These IDs may be anonymous, pseudonymous, or registered with other public or private, closed, open or distributed—they may or may not be verified, authenticated, validated or otherwise proven.

As an example, if Sarah arrives at Bleeker Street Station, NY, on Monday at 3 pm, then returns at the same time on Tuesday a physical pattern of behavior may be identified for subsequent confirmation. If, additionally, Sarah uses the app and changes a hat on her avatar during this same period (approximately 3 pm), over the same two days (Monday and Tuesday), a virtual pattern of behavior may be identified, also for subsequent confirmation. Correspondingly, it may be predicted that at 3 pm on Wednesday Sarah will return to Bleeker Street Station and change her avatar's hat. If this prediction is confirmed a base-truth token assignment may be generated and used for comparison to other users and groups with similarly predictable (but increasingly precise) behaviors.

Administrative system or administrator may select the identity or group and collect any previous navigation and preference selections made by the user. Any additional core data is collected by methods previously described. Also collected are physical context and information, virtual context and information, and virtual and physical context and information by methods previously described. Having processed the physical usage and virtual usage, if any, and having co-referenced behavior of the user or group of users, recurring steps over a timestamped period are identified. Timestamped data becomes a post-processed training data set with clustering and parameters categorized with the end-goal of filtering a specific set of variables based on predetermined requirements. For example, Timestamped data (the Tuesday and Wednesday when Susan was at Bleeker) parameterized with the clusters of 3 PM and the predetermined requirements of using her app. This filters the use of the avatar's hat.

Other recurring behavior may be automatically identified. This may include very general recurring use of the app, recurring specific actions within the app, recurring visits to a location, recurring traversals across a city, recurring views of a specific content asset, group of assets, sequence of group, or other recurring events. This unstructured data is searched for features which are extracted and built into a training dataset. These features may be named 13 (beta) and A (delta).

If pre-processed feature extractions are not possible via automated or algorithmic methods a notification is sent to the administration dashboard with a request for manual feature extraction. These features will be named 13 (beta) and A (delta). Training datasets of both 13 (beta) and A (delta) recurrences is built according to ML model specifications, evaluated and model loss predictions are extracted.

Having processed the previous sets of data, the administrative functions, and specifically adversarial network, will compare the two sets of training data to build a training data superset. This may be used with a second, adversarial, discriminative network to evaluate additional patterns or generate spurious data that an adversarial network (in some cases a BiGAN, or Bidirectional General Adversarial Network) will accept as unprocessed variables remapped from the latent space. The result of the comparison of other users' preferences and paths will be used by the administrative system to send user suggestions of avatar customization and following steps on user navigation.

The superset provides a final predictive ML model which may be secondarily processed with additional features, such as E (epsilon), being extracted and recursively added to the ML dataset in order to improve the predictive functionality. Weighting of outlying data may be performed to improve model loss predictions. A predictive report may be issued framing the time-based past behavior and predicted behavior.

2. Behavioral Prediction of Assets

Behavioral prediction of assets or data may, separately however similar to the prediction of individual ID behavior, also be based on historic data. This may include any part of the avatar system (avatar, object, architecture, functionality, or other identified and trackable asset). For example, a dance animation has been used by over 50 M avatars and in each case that dace includes a black cane and top hat. As the following 2 M dances are generated the presence of the cane and top hat are noted and in these new 2 M animations the can has been changed to grey and the hat to an even lighter grey. The Avatar System indicates that the next 2 M animations may, with a probability spread indicated based on other variables, alter the cane and hat to a yet lighter grey or even white.

An administrative system or administrator may select the identity or group and collects any previous navigation and preference selections made by the user. Next, additional, core data is collected along with physical context and information and virtual context and information. Next, the virtual and physical context and information are compared by methods previously discussed.

Having processed the physical usage and virtual usage, if any, and having co-referenced behavior of the user or group of users, recurring steps over a timestamped period are identified. Timestamped data becomes a post-processed training data set with clustering and parameters categorized with the end-goal of filtering a specific set of variables based on predetermined requirements. For example, timestamped data (the Tuesday and Wednesday when Susan was at Bleeker) parameterized with the clusters of 3 PM and the predetermined requirements of using her app. This filters the use of the avatar's hat.

Other recurring behavior may be automatically identified. This may include very general recurring use of the app, recurring specific actions within the app, recurring visits to a location, recurring traversals across a city, recurring views of a specific content asset, group of assets, sequence of group, or other recurring events. This unstructured data is searched for features which are extracted and built into a training dataset. These features will be named 13 (beta) and A (delta).

If pre-processed feature extractions are not possible via automated or algorithmic methods a notification is sent to the administration dashboard with a request for manual feature extraction. These features will be named 13 (beta) and A (delta).

Training datasets of both (3 (beta) and A (delta) recurrences is built according to ML model specifications, evaluated and model loss predictions are extracted Having processed the previous sets of data, the administrative functions will compare the two sets of training data to build a training data superset. The result of the comparison of other users preferences and paths will be used by the administrative system to send user suggestions of avatar customization and following steps on user navigation.

The superset provides a final predictive ML model which may be secondarily processed with additional features, such as E (epsilon), being extracted and recursively added to the ML dataset in order to improve the predictive functionality. Weighting of outlying data may be performed to improve model loss predictions. A predictive report may then be issued framing the time-based past behavior and time-based future behavior. If no temporal data was collected other correlations are reported.

3. Trend and Fashion Prediction Models

Trend and fashion prediction models may be founded based on correlations of identity data (avatar or person ID) and asset historic data may be enhanced or generated with ensemble approximations via GANs or BiGans. As predictive models are generated the resulting latent space provides a set of potential results. But this is only a set of results for a small group of people, or a person (such as Susan) and we are seeking to solve for a larger set of predictions that are regionally and temporally based. A problem might be expressed as, If Susan were to make these same predicted decisions but we were to change her location and time, what might her new set of decisions look like?" We may use weather prediction models in which a combination of supervised and unsupervised learning is employed. At the highest level this method is supervised because human administrators may determine both the features of the latent space and the target to be predicted. The results of the calculation are an array of second-order predictions which then must be narrowed down via search filters.

For example, let us consider this method as a means of predicting what kind of hat, in an array, those in Susan's neighborhood of New York will choose for their avatars in the coming six months. Our system has collected information indicating that on each day of the workweek, at approximately 3 PM, Susan will choose a hat for her avatar. We have annual trend indicators showing that Susan has gradually moved from head-tight, brimless hats to loose-fitting, brimmed hats with gradually larger brims. Last January she was all over the beige cap look, by the summer she was choosing deep colored hats with mid-sized brims such as navy-blue ball-caps, and now that it is autumn, she is choosing the full-brimmed beige headwear. The causes for this overall trend are less clear, even, than the trend correlations themselves so our method needs to be able to accommodate such vagaries as would influence Susan's choice, both consciously and subconsciously. These causes may include popular fashion, advertising's influence, the seasons' temperatures, influences of Susan's peer group (via social media, in virtual worlds, and in physical person) cultural expression, signaling her identity and many, many others. In summary we may combine deep learning as used for weather systems and guide the results with the latent space predictive models employed by adversarial networks.

Linear trend estimation evaluates a series of measurements of a process. This framework may be established with the following components: A vector-based package (Python, PyTorch or other) for processing arrays; a related system for dividing the data for training and testing purposes; associated vector packages for regression and classification of the data at training time; basic complex state prediction system operations should follow the core, common steps: (1) determine the desired prediction question (provided via a drop-down list of known or available variables); (2) determine and acquire the prerequisite data, identify and correct missing data; (3) establish baseline model—a NN class that takes input to build a functional model; (4) train the model on provided training data; (5) make predictions with test data; (6) compare predictions to the known test set targets and calculate performance metrics; (7) if performance is not satisfactory, adjust the model, acquire more data, or try a different modelling technique; and (8) interpret model and report array results with both visual and numeric notation.

These results, above, may be applied to both make and justify observations and tendencies in the data, by evaluating the time, location, or other correlations. This approach may then describe the behavior of the data, without explaining either the source or causes (which both protects user identity, intellectual property, or other valuable data). Projection, forecasting, scenario-building, and polling may all be applied to inform trends that are fashion-related, behavior related, etc.

DLWP (Deep Learning Weather Prediction) factor examples: Ensemble approximations are intended to estimate the bulk effect of media and fashion processes too small, brief, complex or poorly understood to be explicitly represented by equations and numerical models. Ensemble approximations may include, but are not limited to, factors related to the item Purchaser, Item purchased, Environmental factors, Behavioral Factors and others not included in this list of examples:

Examples of Purchaser and Item Factors that influence purchasing decisions. Each factor would be accompanied by a confidence estimate expressed as a percent.

PurchaserAge: the age of the person buying the good
PurchaserLocation: Where the purchaser passes a function of time
ItemQualityRange: The perceived quality of the purchased good
ItemPriceRange: The perceived price of the purchased good
ItemCost: The perceived price of the purchased good
PurchaserIncomeRange: The annual income of the purchaser Examples of Environmental Factors that influence purchasing decisions. Each factor would be accompanied by a confidence estimate expressed as a percent.

EconomicInterestRates: The current average economic status of the Purchaser region
TemperatureLocal: The average temperature of the local Purchaser region
TemperatureSeasonal: The average seasonal temperature Others may include, but are not limited to, a desire to separate or be included in a group, peer inclusion or trend following, such as looking like a particular star (via social media, in virtual worlds, and in physical person) cultural expression, signaling identity and many, many others. Examples of Behavioral Factors that influence purchasing decisions. Each factor would be accompanied by a confidence estimate expressed as a percent:

DisposalMethod: How the item is discarded
DisposalTime: When the item is discarded
UseageMethod: How an item is used
UsageTimeOrigin: When an item was first used
UsageTimeDuration: Overall time period the item was used
UsageTimeFreq: The recurrence or incidence of the item use
UsagePlace: Where the item was used (as well as local/global)
PuchaseMethod: How the item was purchased
PurchaseTime: When the item was purchased
PurchasePrice: What the item cost when purchased In most implementations ML predictions map the variables at one time to the entire state of the atmosphere at the next available time. The prediction is then built by feeding the model's predicted state back in as inputs, producing the defined number of forecasts. However automatically iterating through the data and optimizer may influence the importance of effects in the environment.

4. Search Models

Search models may be implemented such that a large array of predictions, based on past behaviors, may be presented, and understood by an end user within a visual context. These may include, but are not limited to, examples of items with specific dimensions, shapes, textures, colors, behaviors, and other characteristics. Similarly, media examples may be submitted to the system via the interface. These may include assets such as photographs, illustrations, video, natural language explanations, and other information that may be used for a range of functions. These may include other examples of establishing, expanding, or narrowing search filter criteria.

For example, Sarah would like to find a particular fit of bell-bottom, or flare, blue jeans which both have tight in-knee lines and have chevron stitching on the back pockets. She is able to review a set of blue jeans, select the bell-bottoms of general interest. A new selection of bell-bottoms is offered for her choice and she is then able to select the specific cut. From there other choices may be followed, such as determining the stitching on the pocket. Because the system has learned that chevron patterns are commonly used a chevron design is offered among the back pocket stitching offers. Sarah is able to determine the individual pattern (chevron A) which is then available for later recombination into the larger design of bell-bottom jeans. This information is saved for later analysis and use both for Sarah and other users.

A graphical user interface to interpret the prediction model would include a timeline along the bottom may be used. Factors may include: Previous users' existing or past decisions; Influencers' decisions and their past measured behavior and choices; Additional trend data may be added via interface; A fan-based array of new prediction models (hats, skirts, gloves, etc.); Included environmental variables may be included from weather-based models; and the user may choose from these prediction models to generate a search filter using a GAN-based latent space.

5. Influencing User Behavior, Preferences and Purchasing Decisions

As a person sees and interacts with a particular set of data, and as the correlations and similarities of that data are extracted, a vector of preference may be established based on those past correlations. This knowledge of the feature vector-set that is liked may be integrated with a separate feature vector-set that is dissimilar but, if the feature-sets are blended the person may appreciate or prefer the second, target set.

For example, the system knows that Sarah likes bell-bottom blue jeans with chevron stitching on the back pocket and that there are multiple different forms of stitching that may be considered. Since last time Sarah selected chevron A this time the system is able to offer an alternative stitching in chevron B (see diagram below). The next time Sarah is browsing through various options the system is able to make this offering, keeping track of Sarah's choice and beginning to build a model or mathematically available proportions, angles and other information to more closely gauge appropriate likes and interests.

The data may be prepared for training. By use of ML libraries in multiple instances, vectorsets are established and blended. Next, establish base truth vectorset of (#1) preference and base-truth vectorset of (#2) target (suggested) data. Next, the preferred vectorset and target (suggested) vectorset are blended into intermediary set (1+2) with even distribution. Next, intermediary vectorset is presented to establish acceptance of person's inclined acceptance. If liked, then continue (if not then reduce even distribution with weight on preferred vectorset over target vectorset, for example 75% on preferred, 25% on target). The new (suggested) data is then presented, and the acceptance and strength of influence is measured.

ADMINISTRATIVE TECHNOLOGIES.3: Identity & Security

1. Control of Appearance and Behavior

The administrative system may be used to remotely orchestrate or otherwise control the appearance, behavior, actions, or other data of the avatar system with or without the owner's participation or knowledge. The Administrative system, either automatically or manually, identifies the asset (avatar, object, architecture, function, or other system component) by UUID, visual selection or other means. Change and editing system identifies the target state (or set of characteristics) as a numeric comparison to current state. Timespan for state change is determined by start time, end time and any other timestamps of increased or decreased change. Timespan and changes to be made are saved for use.

2. Multi-Factor Authentication

Authentication may be used by the Administrator to identify the owner of an avatar including using biometric methods. This may include common methods such as password, numeric code sent via a separate channel (email or text message, etc.) and biometrics that include facial proportions, body proportions, and behaviors such as the time of day that the user is at a specific, physical world location (address, GPS, etc.). Data is collected at the enrollment phase and compared at matching phase. A person (or persons) is enrolled or registered with the biometric system and this data collection method is stored for later comparison. The person then identifies themselves to the administration system with associated secure key and the administration system asks the person for proof and authentication of identity in two or more of the following methods: (1) Password or Passphrase: A string of ANSII (or other standardized) characters; (2) Face scan: Measurements of features of a face that give coefficient or overlapping values are identified, recorded, and compared. Physical attributes may include shapes, sizes, geometries, proportions, colors, positions, etc.; (3) Iris scan: A high-resolution image of the color patterns around the pupil of the eyes; (4) Retinal scan: Surface capillary details of one or more eyes; (5) Voice scan: The overall tone, tenor, pitch and cadence of a voice when it speaks a particular phrase understood by the system (may be preprogrammed or trained to learn others); (6) Speaker scan: Undetectable details in the manners of an individual person speaking and articulating; (7) Fingerprint scan: Details in the front, top, and sides of one or more fingers; (8) Hand and finger geometry or vein mapping: This method includes tridimensional maps of such geometries as knuckle distance, palm width, finger length, etc. This may also include vein patterns and recognition of unique sizes of veins and locations; (9) Behavioral scan: Algorithmic identification, having been trained over a period of time, analyses and assesses unique aspects of a person's behavior; (10) DNA Scan. Encoding of GNAC and orders of encoding in RNA; (11) Engagement patterns may include repeated features of use such as location, device type/s used and other overlapping items that require physical presence; and (12) navigation, keystroke or user dynamics: A recording and training of a machine learning system as to the specific differences in how a person interfaces with the system (such as speed and delay between particular tasks, order of events, etc.). The identifying data is then recorded and compared from time of enrollment.

3. Data May be Assessed by the Administrative System

The administrator may analyze individuals or multiple entity information. This may include innovating within an economic system such that they build, collaborate, distribute, collect, or otherwise express uniquely high (or low) metrics within the system. For example, a group of people collaborating to build a uniquely popular line of fashion or, a group of four people composing a four-piece composition in which one person is drawing the first piece, a second person drawing a second piece, and when complete is presented in a shared manner. When the four-piece composition is identified, the four people may be also be identified as the time and other data relevant to their interaction at that time shows their participation.

The administrative system, either automatically or manually, may identify the activity, behavior, change or other asset (avatar, object, architecture, function, or other system component) by UUID, visual selection, timestamp, or other means. The change and editing system may then identify the target state (or set of characteristics) as a numeric comparison to current state. Finally, a recommendation is offered by system to administrator.

4. Time Stamps

Time stamps may be associated with event orders. The system may save the data of all interactions allowing a rewinding of events to show the specific choices that an individual user selected during a period of time as well as the changes that were made to the avatar, object or environment. All activities, state/s, and assets are identified with time-stamped hash or other feature that orders events occurring in time and, if closer than n time (millisecond, for example) a simultaneous flag is offered. The change and editing system may then identify the target state (or set of characteristics) as a temporal comparison to current state. A scrub-deck or other interface represents linear causes, effects and/or sequences. Controls and interface to the software allow relevant access and control over all available causes, effects, sequences, assets, state/s and activities.

5. The Ability to Bar or Block Data

The administration may bar an entity, avatar, asset, function, or other data from acting or interacting. A digital protection order this is issued under specific request and with specific highest security practices available. The automation of this, based on recurrent and verified patterns of behavior may be possible, under identical security circumstances. The administrator or administrative system identifies the data (avatar, object, architecture, function, or other system component) by UUID, visual selection, timestamp, metric behavior, system location or other means.

The administrator (or trained system) identifies the interaction and, if necessary, entity to be blocked. This may include a scripted group function, a person, the distribution of an asset, an entry in a dataset or other entity. The entity, asset or action type is blocked, and any ongoing actions or changes are logged to a separate, quarantined file which is intended for deletion (in best practice, deleted immediately). If not deleted, these blocking actions may also be undone, and all saved state or time-based data is preserved.

6. Data May be Obfuscated

The administrative system may blur, hide, or otherwise disguise specific sets of data. This may be done based on specific UID numbers. This may include a person, entity, avatar, asset, environment, function, or other data). This also may apply to all inherited data, objects and environments, or actions, owned by an avatar or group. This may also apply to virtual and physical data. As an example, Jojo has information that must be shared with multiple government agencies, but their avatar data may not be revealed so that Jojo's personal information may not be revealed. This process may obscure Jojo's voice, face, appearance, or operation of their avatar so that the avatar itself remains anonymous.

The administrator or administrative system identifies the data (avatar, object, architecture, function, or other system component) by UUID, visual selection, timestamp, metric behavior, system location or other means. Next, the administrator (or trained system) identifies the interaction and, if necessary, entity to be obfuscated. This may include a scripted group function, a person, the distribution of an asset, an entry in a dataset or other entity. The entity, asset or action type is obfuscated, and any ongoing actions or changes are logged to a separate, quarantined file which is intended for deletion (in best practice, deleted immediately). If not deleted, these obfuscated actions may also be undone, and all saved state or time-based data is preserved.

7. Regulatory Compliancy May be Reported

Problematic behavior, as legally decreed, may be directly reported to the parent, guardian, or other entity responsible for guardianship and oversight. Identification of required compliancy and notification behaviors are configured. The desired output is defined by which entities will receive the notification and automatic triggering of system sends the notification. A log is written, and a subsequent reminder is delivered at defined date.

8. Intrusion Detection Via Anomalous Actions

Uncommon activities are analyzed and acted upon. A series of events in the system that are not commonly recorded or logged—or a series of events in the system that are commonly recorded or logged—indicate behavior that is undesirable and may indicate a system attack or malware presence. Ongoing logs, user practices and other administrative data is identified. The administrative data indicates (either by manual or automated practices) that an anomaly has occurred. The anomaly or defect is investigated, and source causes are located. Intention, actors, causes, and correlations are listed. Malice, malpractice, or other intent are identified, and actions determined based on the outcome of these analyses.

9. Prediction Models

Prediction models may provide users fashion and trend suggestions to the user while they are interacting with the application. These may include apparel suggestions provided to the user during avatar customization, scene, backdrop, and pose suggestions during content creation, and others. For example, via nearest-neighbor methods and analysis of Jojo's pervious choices, which have been blue of various shades, Jojo is authoring a new pair of shoes. They are red. The Avatar System notes that this choice deviates from Jojo's previous decisions and a note is offered to Jojo so that they may confirm to continue with the choice of red or change to a more common choice of blue, should they choose.

IDENTITY Ownership

The unique ownership of the Avatar System assets may be provided to an individual, to a group, or to another entity. These methods allow for the creation, verification, authentication, and other validation methods not only for avatars but other information in the Avatar System including objects, architectures, and functional elements of information. Methods for removing and managing are included.

IDENTITY.1—User-Avatar (Objects and Architecture) Identity

Identity creation, verification, and privacy options. Validation, verification, authentication, and subsequent actions. These may be optional, certification may be applied to an avatar, object, architecture, or other information within an avatar system. This may include self-sovereign identities (SSI) such as used in blockchain functions and communities. This may also include, but is not limited to, centralized systems of identity registry, whitelists, blacklists, and other means extended to this particular application.

Users are issued a set of credentials, stored either publicly (as on a blockchain), privately, or both. The credentials are later submitted by the original user or retrieved from a registry at the request of the original user. Credentials are verified. In the case of SSI, the user must interact with multiple parties to verify the identity, recording these interactions in a public storage. Notice of the accepted credentials, or notice of a problem with verification, is then reported back to the user. Identity may be established or verified with biometrics. An avatar, object or architecture may be built with specific non-digital assets. These assets may include, but not limited to, such methods as a still or video camera, audio recording device, fingerprint identification, genetic or RNA or DNA information, gait and movement analysis and other methods of identifying a unique and differentiated identity or uniqueness.

The User submits pre-required biometric, appropriate information to avatar system via approved and credentialed input models (which may include distributed systems). The user provides information on shared visibility of identification (anonymous, pseudonymous, or public). Data is stored, or otherwise managed, as appropriate for privacy concerns. Users are issued a set of credentials, stored either publicly (as on a blockchain), privately, or both. The credentials are later submitted by the original user or retrieved from a registry at the request of the original user. Credentials are verified. In the case of SSI, the user must interact with multiple parties to verify the identity, recording these interactions in a public storage. Notice of the accepted credentials, or notice of a problem with verification, is then reported back to the user.

Identity data may be preserved with encrypted keys. Avatar, object, architecture, or other identity may be referenced or co-referenced via secret keys. Steganographic signatures, digital watermarks, whitespace markers and (or) others may, together in combination or separately, be used to validate and authenticate people, avatars, objects, environments, timestamps, and other important data connected to avatar system identity and ownership. These may be sorted and stored in distributed registries both open (public/blockchain) and closed or centralized (private/legacy). A virtual equivalent to biometric authentication may be applied to verify a second layer of secured identity in which peculiarities in the software and features of software of the avatar.

Steganographic signatures, digital watermarks, and whitespace markers are, together in combination or separately, applied to any content prior to its display or distribution. The content is later submitted, either by the original creator or by somebody else. The content is then processed such that any steganographic signatures, digital watermarks, and whitespace markers are identified. These identifying features are then checked against either a public registry (blockchain), a private registry (legacy), or both. All matches, or just a subset of all matches, are reported back to the user conducting the search/verification so that the source code may be validated and verified. These identifying features are then registered, either publicly (blockchain), privately, or both.

4. Reverse-Lookups May be Used to Validate Data.

The identity of an avatar, object, or other data may be searched in reverse. An avatar, video, animation or other time-based media type may be linked to its originating file. In this example we may consider a video version of TinEye. Similarly, some indicators of emerging methods may be applied from existing systems such as Snopes, Break-the-Chain, vMyths, Virus Busters. Manually or automatically flagging recurring data such as identity or the many parts that compose an avatar, object or architecture may be applied, normalized, and integrated into machine learning models for improved identification, analysis, and retrieval.

Avatars, animations, videos, and other content are embedded with identifying features prior to display or other distribution. These features may include time-based variations to the underlying content, made either conspicuously or inconspicuously. That avatar, animation, video, or other content is later submitted to this validation system, either by the original creator of said content or by somebody else. That content is then processed, identifying features are scanned, checked, and then organized. Identifying features are then checked against public and/or private registries. Matches are identified, and then categorized. All matches, or just a subset of all matches, are reported back to the user conducting the search/verification.

5. ID Data May be Salted

Unrelated data may be added to ensure protection. and facial scans or other identifying algorithms may be subverted (ensuring the avatar may or may not be mistaken for a person), by placing points or salting data that detracts from algorithmic understanding, avoiding deepfakes or other nefarious uses of identity subversion. The intent is to prevent someone from hashing a piece of content (or password) correctly. Additionally, this may be used to reduce the accuracy of automated or algorithmic categorization systems. Finalized content, in the form of an image, video, text description, behavioral data, original authoring data or other information is created entirely, elsewhere, prior to its submission to this system with the intent of de-associating searches, both automated and manual. That content is then altered, conspicuously or inconspicuously, such that any future attempts to process the content, algorithmically or otherwise, are subverted. These alterations may include distortions applied to either content itself, to any of its metadata. A male avatar might be labeled as female, or a color hair listed as a different color. in hashing functions, such as SHA-256, a random string may be added to keys. The content, including any alterations, is then displayed to the user, or otherwise distributed.

6. ID Data as a Toxic Asset

Analytics may treat training data as an undesirable asset. Performance, demographic, or any other data collected from users, avatars, or any other source may be processed, in a manner maintaining both that data's security and its usefulness, such that that data remains encrypted, deleted, or otherwise unreadable, to reduce security risks. This data may also be stored for a very short period of time, never stored, or immediately deleted. Incoming analytic, performance, demographic, or other data is decrypted. Data is decrypted and treated as a potentially toxic asset. If the data is personal or the input data may relate two individuals (birds of a feather, k-nearest neighbor, etc.), it is decrypted immediately to be used then deleted. If the data is of a less personal nature and may identify an individual only by 2nd-order, or greater. associations (underfit data, with regards to k-Nearest), it may be stored. Unencrypted data is then processed. Training values are extracted. Extracted values are used to train ML model, support any other system, or otherwise consumed in the same place it was decrypted. All data is permanently discarded immediately after its use. Users are informed as to how analytics, performance trends, demographic data, or any other data is being used. Specific notice is made if any data must be retained for any significant amount of time in any form.

Method of Authoring and Managing an Avatar System

Figure 28:
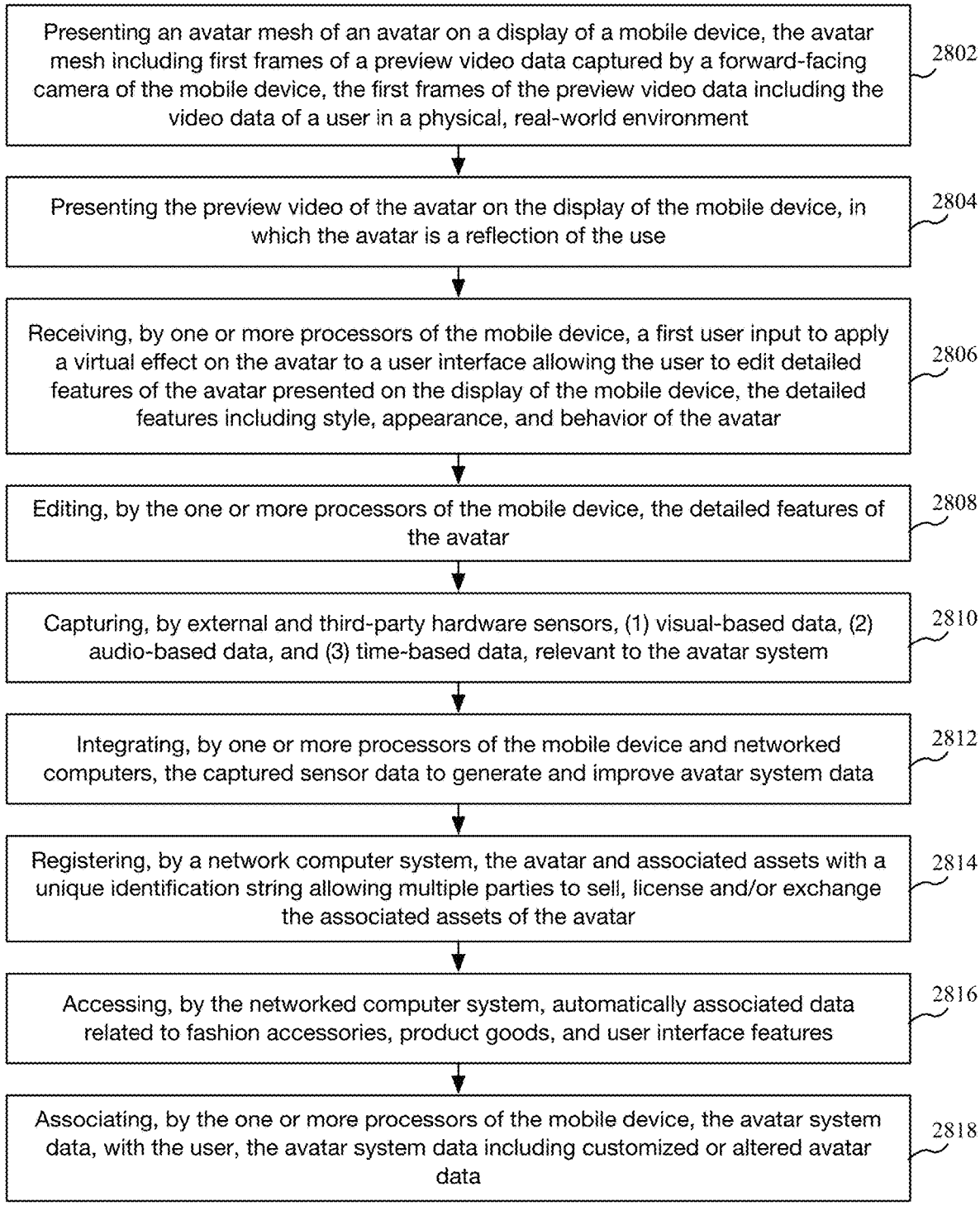
FIG. 28 is a flow diagram illustrating an exemplary method of authoring and managing an avatar system, according to one embodiment.

FIG. 28 is a flow diagram illustrating an exemplary method of authoring and managing an avatar system, according to one embodiment. First, an avatar mesh of an avatar is presented on a display of a mobile device, the avatar mesh including first frames of a preview video data captured by a forward-facing camera of the mobile device, the first frames of the preview video data including the video data of a user in a physical, real-world environment 2802. The preview video of the avatar is presented on the display of the mobile device, in which the avatar is a reflection of the user 2804. Next, receiving, by one or more processors of the mobile device, a first user input to apply a virtual effect on the avatar to a user interface allowing the user to edit detailed features of the avatar presented on the display of the mobile device, the detailed features including style, appearance, and behavior of the avatar 2806. Next, editing, by the one or more processors of the mobile device, the detailed features of the avatar 2808. Next, capturing, by external and third-party hardware sensors, (1) visual-based data, (2) audio-based data, and (3) time-based data, relevant to the avatar system 2810. Next, integrating, by one or more processors of the mobile device and networked computers, the captured sensor data to generate and improve avatar system data 2812. Next, registering, by a network computer system, the avatar and associated assets with a unique identification string allowing multiple parties to sell, license and/or exchange the associated assets of the avatar 2814. Next, accessing, by the networked computer system, automatically associated data related to fashion accessories, product goods, and user interface features 2816. Finally, associating, by the one or more processors of the mobile device, the avatar system data, with the user, the avatar system data including customized or altered avatar data 2818.

Conclusion

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage, or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure. The terms "at least one" and "one or more" may be used interchangeably herein.

Within the present disclosure, use of the construct "A and/or B" may mean "A or B or A and B" and may alternatively be expressed as "A, B, or a combination thereof" or "A, B, or both". Within the present disclosure, use of the construct "A, B, and/or C" may mean "A or B or C, or any combination thereof" and may alternatively be expressed as "A, B, C, or any combination thereof".

One or more of the components, steps, features and/or functions illustrated herein may be rearranged and/or combined into a single component, step, feature, or function or embodied in several components, steps, or functions. Additional elements, components, steps, and/or functions may also be added without departing from novel features disclosed herein. The apparatus, devices, and/or components illustrated herein may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of:" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(1) unless the element is expressly recited using the phrase "means for" or, in the case of a method claim, the element is recited using the phrase "step for."

As used herein, the term "determining" encompasses a wide variety of actions. For example, "determining" may include calculating, computing, processing, deriving, investigating, looking up (e.g., looking up in a table, a database, or another data structure), ascertaining, and the like. Also, "determining" may include receiving (e.g., receiving information), accessing (e.g., accessing data in a memory), and the like. Also, "determining" may include resolving, selecting, choosing, establishing, and the like.

While the foregoing disclosure shows illustrative aspects, it should be noted that various changes and modifications could be made herein without departing from the scope of the appended claims. The functions, steps or actions of the method claims in accordance with aspects described herein need not be performed in any particular order unless expressly stated otherwise. Furthermore, although elements may be described or claimed in the singular, the plural is contemplated unless limitation to the singular is explicitly stated.

What is claimed is:

1. A method for authoring and managing an avatar system, comprising:
   presenting an avatar mesh of an avatar on a display of a mobile device, the avatar mesh including first frames of a preview video data captured by a forward-facing camera of the mobile device, the first frames of the preview video data including the video data of a user in a physical, real-world environment;
   presenting the preview video of the avatar on the display of the mobile device, in which the avatar is a reflection of the user;
   receiving, by one or more processors of the mobile device, a first user input to apply a virtual effect on the avatar to a user interface allowing the user to edit detailed features of the avatar presented on the display of the mobile device, the detailed features including style, appearance, and behavior of the avatar;
   editing, by the one or more processors of the mobile device, the detailed features of the avatar;
   capturing, by external and third-party hardware sensors, (1) visual-based data, (2) audio-based data, and (3) time-based data, relevant to the avatar system;
   integrating, by one or more processors of the mobile device and networked computers, the captured sensor data to generate and improve avatar system data;
   registering, by a network computer system, the avatar and associated assets with a unique identification string allowing multiple parties to sell, license and/or exchange the associated assets of the avatar;
   accessing, by the networked computer system, automatically associated data related to fashion accessories, product goods, and user interface features; and
   associating, by the one or more processors of the mobile device, the avatar system data, with the user, the avatar system data including customized or altered avatar data.

2. The method of claim 1, wherein the identification string allows the multiple parties to author, edit and identify the avatar and author(s) while the data assets may also be redistributed and subdivided.

3. The method of claim 1, further comprising:
   capturing, by the external and third-party hardware sensors and the one or more processors of the mobile device, user appearance, and sounds.

4. The method of claim 1, further comprising:
   automating the avatar's ability to learn from examples and tagged references, by the one or more processors of the mobile device and one or more processors of the networked computer system, provided by the user in both physical and virtual spaces; and
   representing the user behavior such that the avatar may operate autonomously, by the one or more processors of the mobile device and the external and third-party hardware sensors connected by the one or more processors of the networked computer system.

5. The method of claim 1, further comprising:
   representing the user allowing the avatar to record, replay, and predict the user behavior to a high level of precision to include certification procedures.

6. The method of claim 5, wherein the avatar records the behavioral data collected via the mobile device and the external and third-party hardware sensors.

7. The method of claim 6, further comprising:
   evaluating the avatar data and analyzing the user behavior data with a medical professional by utilizing the one or more and processors of the mobile device and the external and third-party hardware sensors.

8. The method of claim 5, wherein the avatar system replays historic data, mirrors real time data, and predict future user behavior data, using the one or more processors of the mobile device and the external and third-party hardware sensors.

9. The method of claim 1, further comprising:
building an economic model, the economic model comprises:
allowing agreements of sale and licensing as conducted via a networked computer system.

10. The method of claim 9, wherein the unique identification string is used for a for reputational rating and ranking; and wherein the unique identification string controls and monitors an avatar-driven economy via the one or more processors of the mobile device and the one or more processors of the networked computer system.

11. The method of claim 1, further comprising:
collecting economic indicators of individuals and groups using the one or more processors of the mobile device and the external and third-party hardware sensors;
analyzing and predicting probable outcomes using the networked computer system; operating with multiple currencies;
predicting economic trends, analyzing, and predicting probable outcomes, processing the data via a networked computer system; and
displaying results on the mobile device.

12. The method of claim 11, wherein the multiple currencies are selected from fiat, decentralized, and blockchain systems; and wherein the multiple currencies are both private and public and accessed by the networked computer system.

13. The method of claim 1, further comprising:
generating data for new content;
extracting the new content from existing content both manually and automatically; and
applying filters and stylistic effects, by a user interface on the mobile device, using the one or more processors of the mobile device and the external and third-party hardware sensors which are networked with additional sensors and processors.

14. The method of claim 1, further comprising:
managing the avatar system and associated data at an administrative level for users, objects, and environments using the one or more processors of the mobile device and the external and third-party hardware sensors which are networked with additional sensors and processors;
collecting user behavior and data asset functionality based on unique identifiers, using the one or more processors of the mobile device and the external and third-party hardware sensors which are networked with additional sensors and processors;
predicting both user behavior and data asset functions based upon past behaviors with a unique identifier; and
managing identity security to obfuscate, bar, block, and migrate the avatars, objects and environments, using the one or more processors of the mobile device and the external and third-party hardware sensors which are networked with additional sensors and processors.

15. The method of claim 1, further comprising:
conducting, via the avatar system administrative layer, means of using salted data, watermarking, whitespace data, reverse lookups and other methods may be used to avoid deepfakes and phishing attacks, man-in-the-middle and other identity attacks, each of which may utilize the one or more sensors and processors of the mobile device which is networked with additional sensors and processors.

\* \* \* \* \*